(12) United States Patent
Takeuchi et al.

(10) Patent No.: US 11,753,531 B2
(45) Date of Patent: Sep. 12, 2023

(54) SEALANT FILM FOR PACKAGING LIQUID CONTENTS, LAMINATE INCLUDING SAME, PACKAGING MATERIAL FOR LIQUID CONTENTS, AND PACKAGE FOR LIQUID CONTENTS

(71) Applicant: DAI NIPPON PRINTING CO., LTD., Tokyo (JP)

(72) Inventors: Naoya Takeuchi, Tokyo (JP); Shin Yamada, Tokyo (JP); Yoshihiko Suzuki, Tokyo (JP); Tomohiro Yonemoto, Tokyo (JP)

( * ) Notice: Subject to any disclaimer, the term of this patent is extended or adjusted under 35 U.S.C. 154(b) by 265 days.

(21) Appl. No.: 16/651,820

(22) PCT Filed: Sep. 28, 2018

(86) PCT No.: PCT/JP2018/036181
§ 371 (c)(1),
(2) Date: Jul. 15, 2020

(87) PCT Pub. No.: WO2019/065938
PCT Pub. Date: Apr. 4, 2019

(65) Prior Publication Data
US 2020/0354550 A1    Nov. 12, 2020

(30) Foreign Application Priority Data

Sep. 29, 2017  (JP) .................................. 2017-190465
Sep. 29, 2017  (JP) .................................. 2017-190466
(Continued)

(51) Int. Cl.
*C08L 23/06*       (2006.01)
*B32B 27/04*       (2006.01)
(Continued)

(52) U.S. Cl.
CPC .............. *C08L 23/06* (2013.01); *B32B 27/04* (2013.01); *B32B 27/32* (2013.01); *B65D 35/40* (2013.01);
(Continued)

(58) Field of Classification Search
None
See application file for complete search history.

(56) References Cited

U.S. PATENT DOCUMENTS 5,492,741 A * 2/1996 Akao ..................... B32B 27/32
                                                                428/218
5,882,789 A * 3/1999 Jones .................... B65D 33/20
                                                                428/521
(Continued)

FOREIGN PATENT DOCUMENTS

CN       101050148       10/2007
CN       103112158        5/2013
(Continued)

OTHER PUBLICATIONS

Takeuchi—JP 2014-233887 A—ISR D6—MT—medicine packing—absorbent—2014 (Year: 2014).*
(Continued)

*Primary Examiner* — John Vincent Lawler

(57) ABSTRACT

The present invention provides: a sealant film for packaging liquid contents, which is excellent in manufacture suitability, exhibits the effect of being highly adsorptive against an eluting organic substance that a packaging material inherently contains, and odors generated by decomposition of a package-constituting resin and the like, at the time of sterilization/disinfection treatment, and is excellent in resistance to an odor-taste change for the liquid contents; and a package for liquid contents, produced using the sealant film. A sealant film for packaging liquid contents includes at least an odor adsorption layer, wherein the sealant film is formed
(Continued)

from a resin composition containing low-elution polyethylene, the odor adsorption layer is formed from a resin composition containing the low-elution polyethylene and an odor adsorbent, a concentration of eluting TOC contained in a film formed from the low-elution polyethylene is 1.5 ppm or higher and 250 ppm or lower, and the odor adsorbent is an inorganic porous material carrying a chemical adsorbent thereon; and a packaging material for liquid contents and a package for liquid contents are produced using the sealant film.

11 Claims, 10 Drawing Sheets

(30) Foreign Application Priority Data

| | | | |
|---|---|---|---|
| Sep. 29, 2017 | (JP) | | 2017-190467 |
| Sep. 29, 2017 | (JP) | | 2017-190468 |
| Sep. 29, 2017 | (JP) | | 2017-190469 |
| Sep. 29, 2017 | (JP) | | 2017-190470 |
| Aug. 31, 2018 | (JP) | | 2018-162369 |

(51) Int. Cl.
 *B32B 27/32* (2006.01)
 *B65D 35/40* (2006.01)
 *B65D 35/42* (2006.01)

(52) U.S. Cl.
 CPC ........ *B65D 35/42* (2013.01); *B32B 2260/046* (2013.01); *C08L 2203/162* (2013.01); *C08L 2207/066* (2013.01)

(56) References Cited

U.S. PATENT DOCUMENTS

| | | | | |
|---|---|---|---|---|
| 6,391,407 | B1* | 5/2002 | Kashiba | B32B 27/18 428/35.9 |
| 6,686,006 | B1* | 2/2004 | Becraft | B32B 7/12 426/240 |
| 2001/0008662 | A1* | 7/2001 | Blinka | C08G 83/007 428/35.8 |
| 2004/0134923 | A1* | 7/2004 | Aquino | B65F 7/00 99/467 |
| 2008/0090042 | A1* | 4/2008 | Kitahara | B32B 27/18 428/36.6 |
| 2016/0090225 | A1 | 3/2016 | Schnabel | |
| 2016/0114974 | A1* | 4/2016 | Kurihara | B32B 27/20 383/71 |

FOREIGN PATENT DOCUMENTS

| | | |
|---|---|---|
| CN | 104194134 | 12/2014 |
| CN | 105153333 | 12/2015 |
| CN | 105307854 | 2/2016 |
| CN | 105628562 | 6/2016 |
| JP | 2538487 | 9/1996 |
| JP | H10-114037 | 5/1998 |
| JP | 2001-114909 | 4/2001 |
| JP | 2006-273694 | 10/2006 |
| JP | 2008-031377 | 2/2008 |
| JP | 2008031377 A * | 2/2008 ........... B32B 15/085 |
| JP | 2008-080506 | 4/2008 |
| JP | 2008-254758 | 10/2008 |
| JP | 2014-233408 | 12/2014 |
| JP | 2014-233887 | 12/2014 |
| JP | 2014/233887 * | 12/2014 ................ A61J 1/05 |
| JP | 2014233887 A * | 12/2014 ................ A61J 1/05 |
| JP | 2015-107617 | 6/2015 |
| JP | 2015-112720 | 6/2015 |
| JP | 2015/112720 * | 6/2015 ............. B32B 27/32 |
| JP | 2015-113124 | 6/2015 |
| JP | 2015112720 A * | 6/2015 ........... B32B 15/085 |
| JP | 2017-013305 | 1/2017 |
| JP | 2017-013485 | 1/2017 |
| TW | 200840708 | 10/2008 |

OTHER PUBLICATIONS

Suzuki—JP 2008-031377 A—IDS—MT—liquid packaging film w PE-alpha-olefin—2008 (Year: 2008).*
Takeuchi—JP 2014-233887 A—ISR D6+Ch.Rej.D2—MT—medicine packing—absorbent—2014 (Year: 2014).*
Okumura—JP 2015-112720 A—ISR D2—MT—low-adsorp sealant film—2015 (Year: 2015).*
Ali—Evaluation of Storage Tank LLDPE—J.AWWA—Apr. 2016 (Year: 2016).*
Polyexcel—LLDPE vs LDPE vs HDPE—LLDPE density—Dec. 2019 (Year: 2019).*
D&M Plastics—Polyethylene—LLDPE composition & density—2022 (Year: 2022).*
Office Action issued in Japanese Patent Application No. JP2017-190470, dated Jan. 25, 2022, and corresponding machine translation (5 pages).
International Search Report of PCT/JP2018/036181, dated Dec. 18, 2018, 11 pages including English translation.
Yu Jiankun, "Introduction to containers for storage and transportation of high purity aqueous hydrogen peroxide solutions," Chemical Propellants and Polymeric Materials, vol. 11, No. 1, 2013, 25 pages including partial translation.
Zhu Rong et al., "Research on low odor packaging films," Shanghai Packaging Packaging Materials, 2016, 6 pages including partial translation.
Office Action issued for the counterpart Chinese Patent Application No. 201880063021.4, dated Jun. 25, 2021, 45 pages including machine translation.
"(661.1) Plastic Materials of Construction," The United States Pharmacopeial Convention, May 17, 2017, 19 pages.
Chinese Office Action issued for Chinese Patent Application No. 201880063021.4, dated Dec. 3, 2021, 41 pages including machine translation.
Office Action issued for Japanese Patent Application No. 2018-162369, dated Nov. 1, 2022, 3 pages including English translation.

* cited by examiner

[Fig.1]
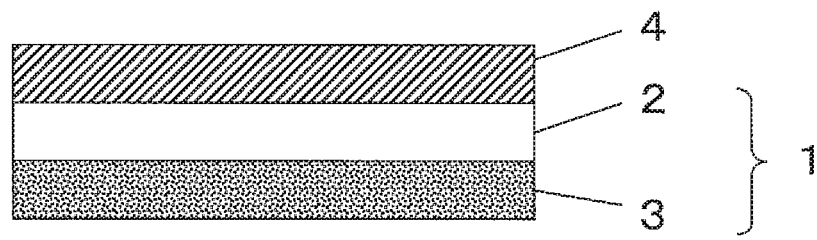
[Fig.2]
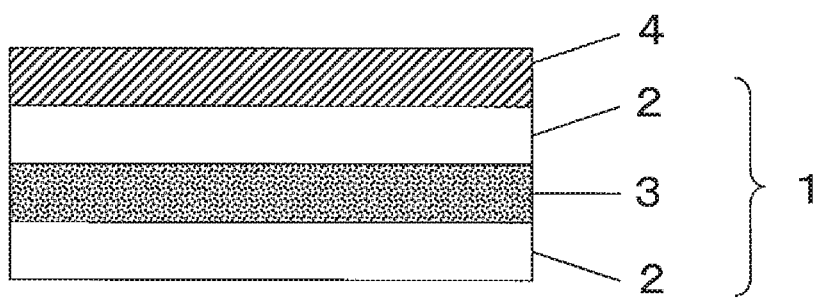
[Fig.3]
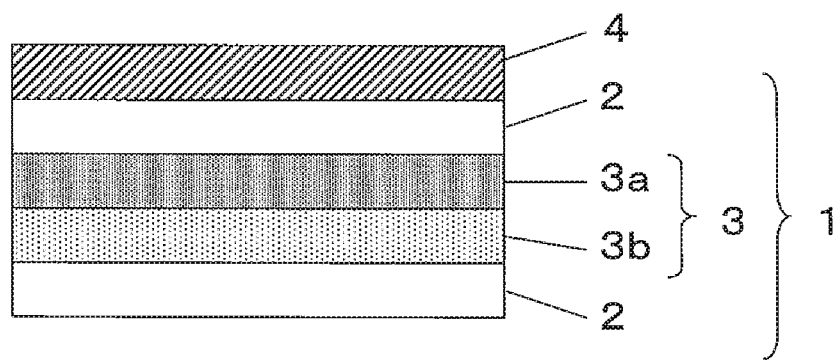

[Fig.4]
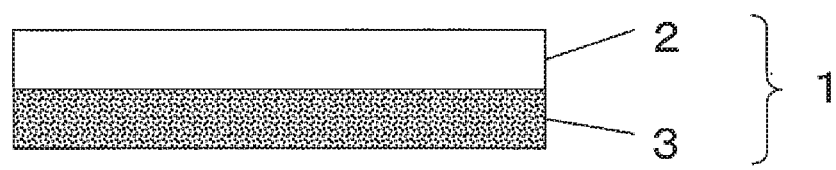
[Fig.5]
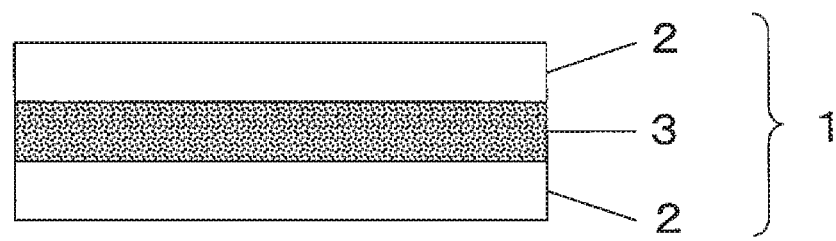
[Fig.6]
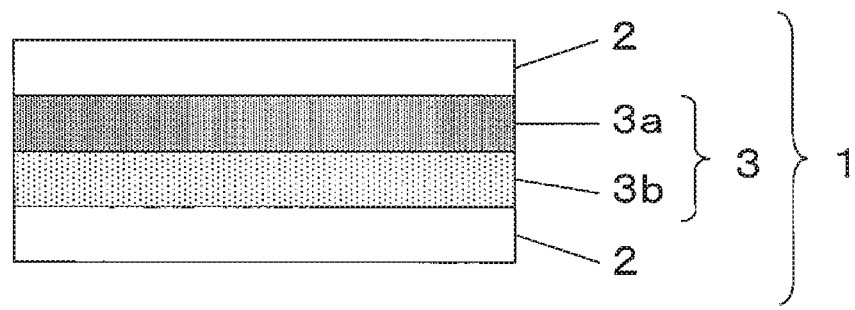

[Fig.7]
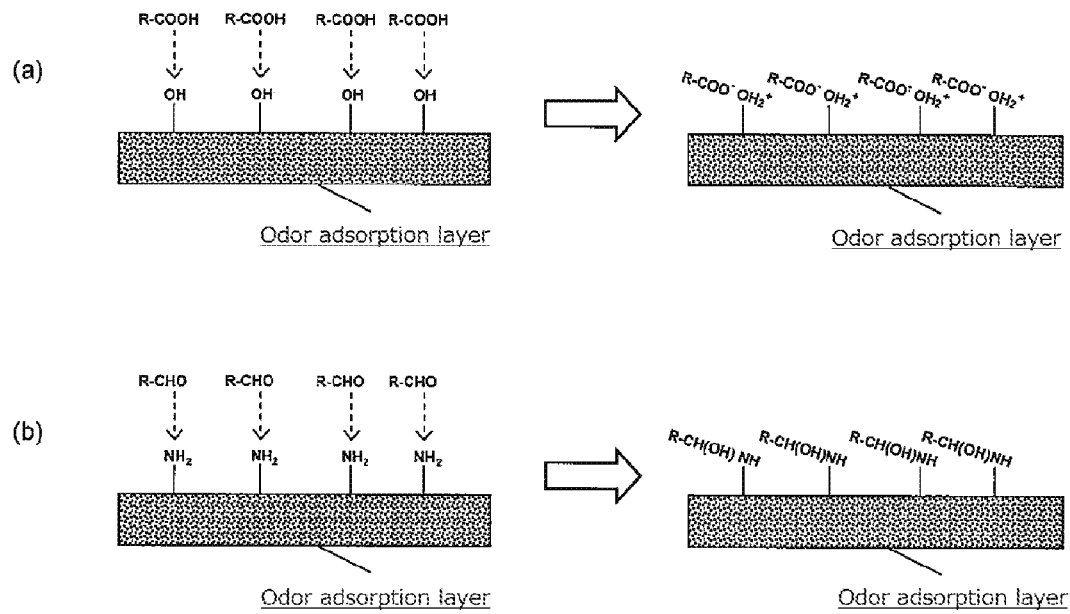
[Fig.8]
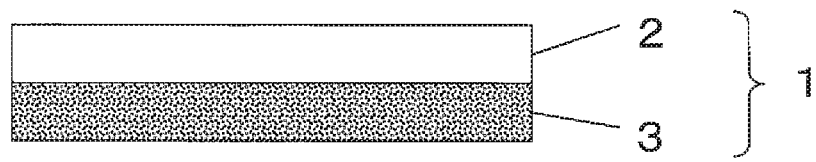
[Fig.9]
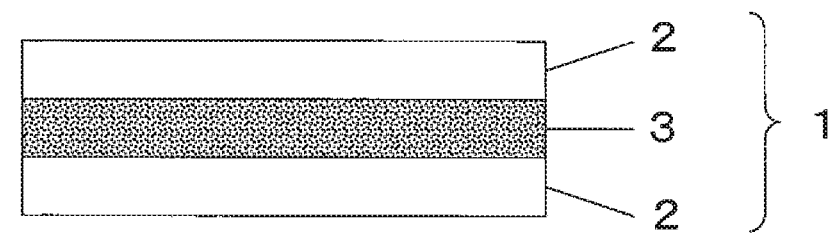

[Fig.10]
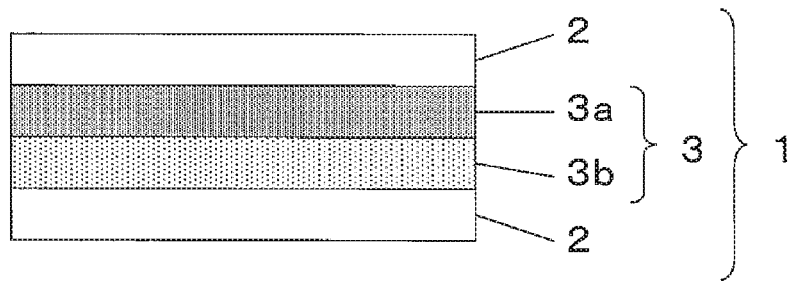
[Fig.11]
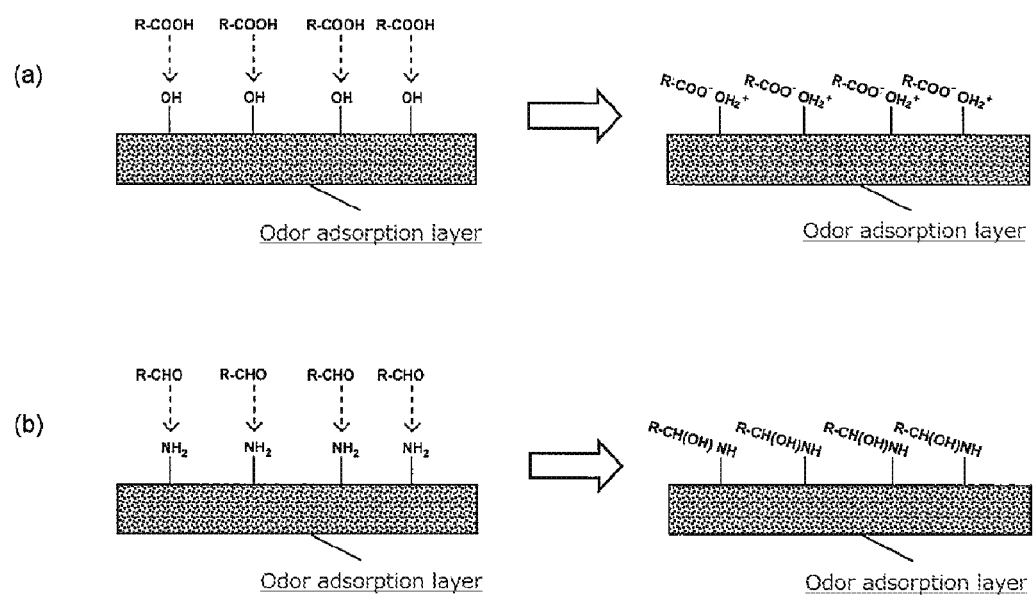
[Fig.12]
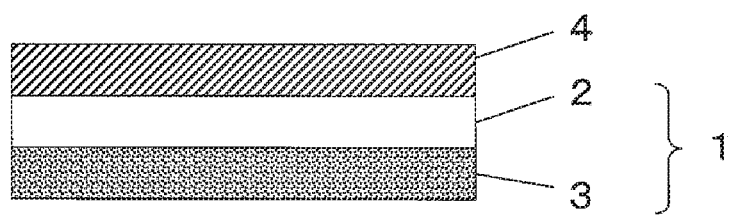

[Fig.13]
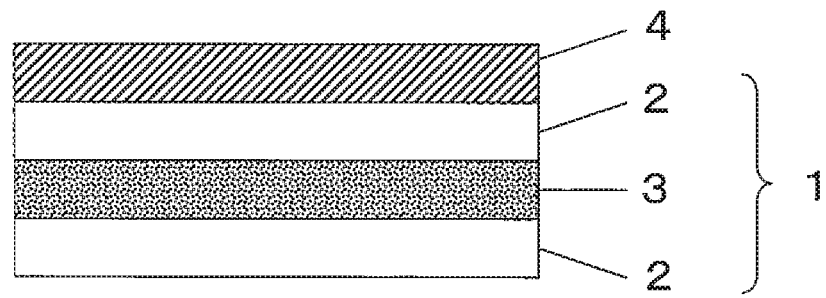
[Fig.14]
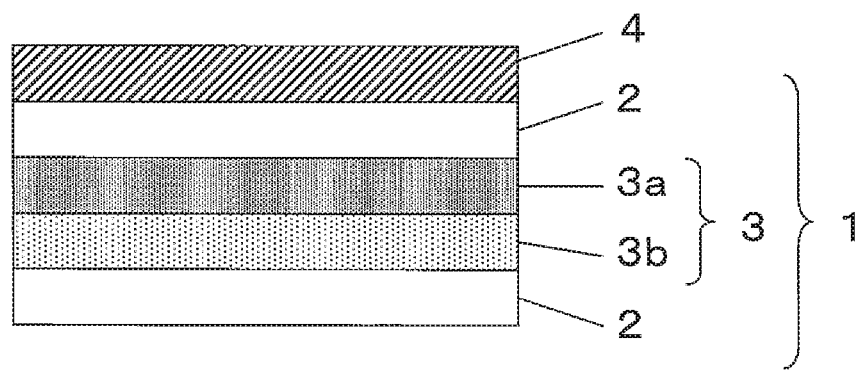
[Fig.15]
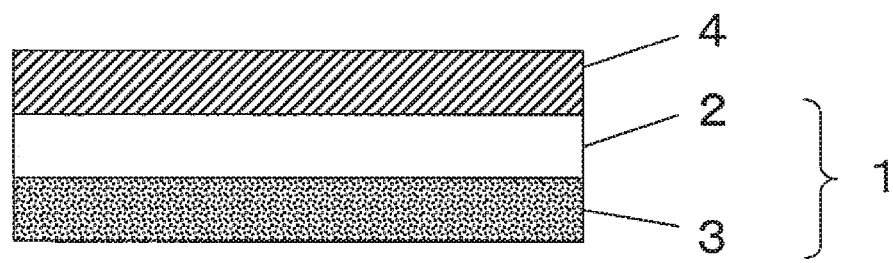

[Fig.16]
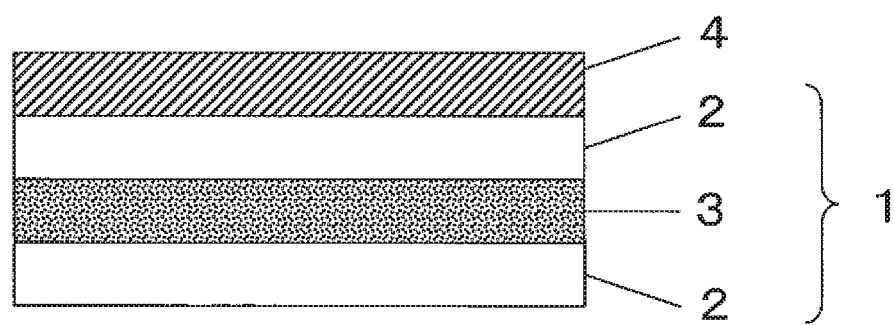
[Fig.17]
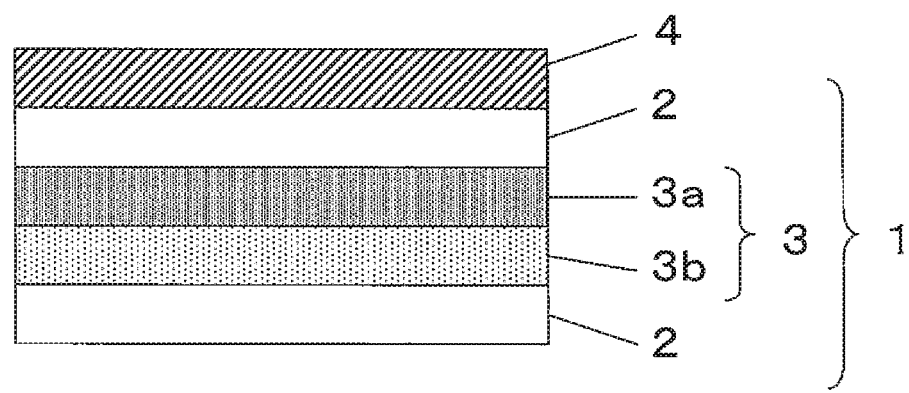

[Fig.18]
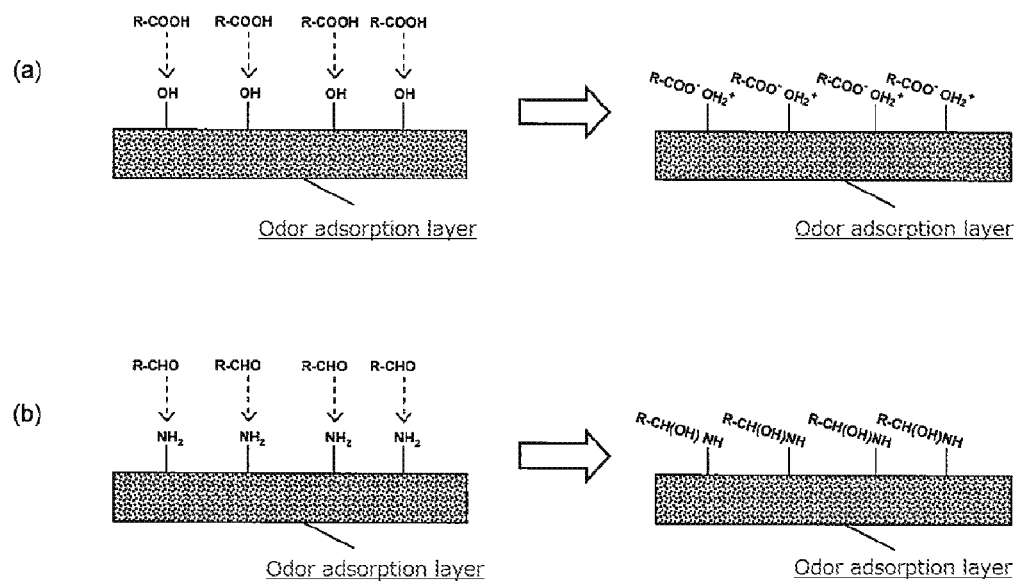
[Fig.19]
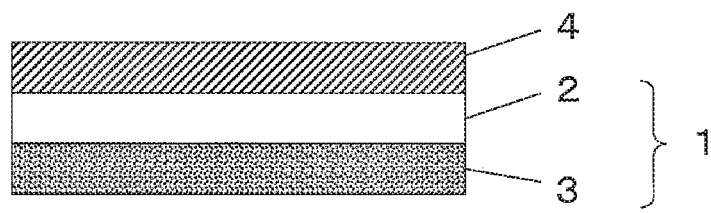
[Fig.20]
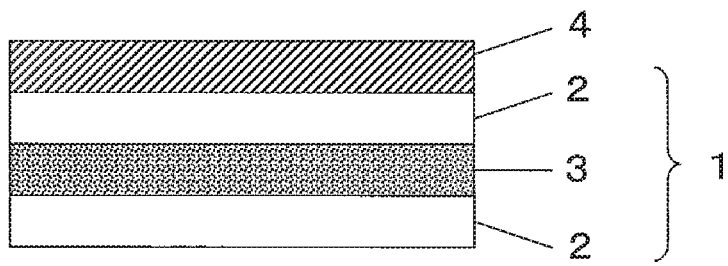

[Fig.21]
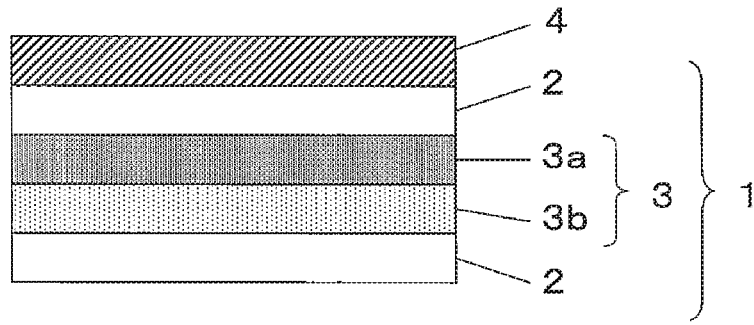
[Fig.22]
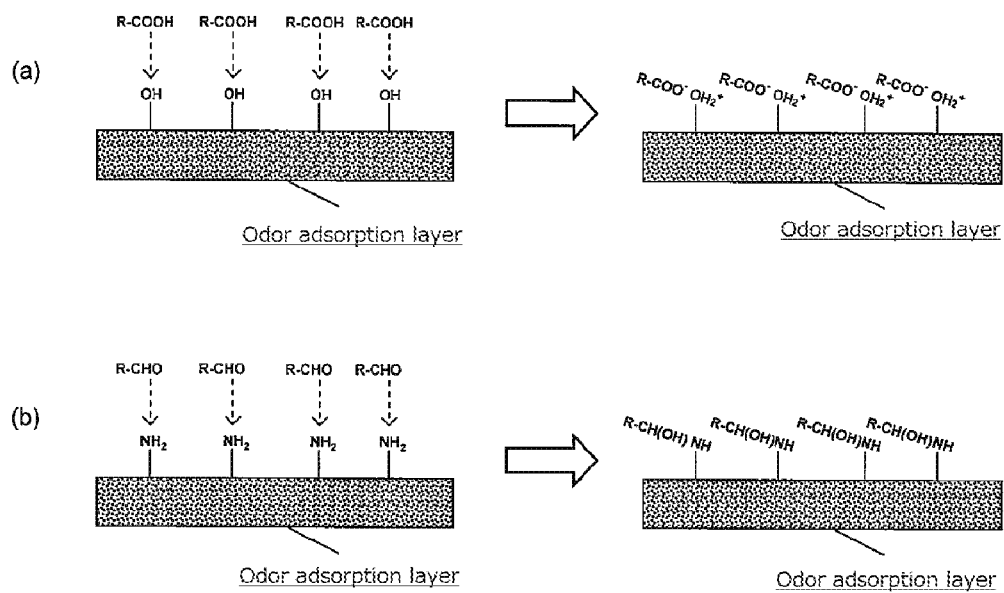
[Fig.23]
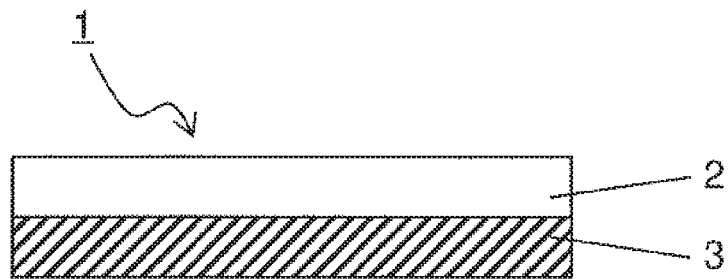

[Fig.24]
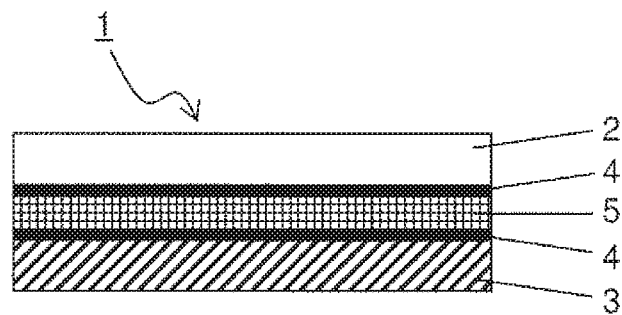
[Fig.25]
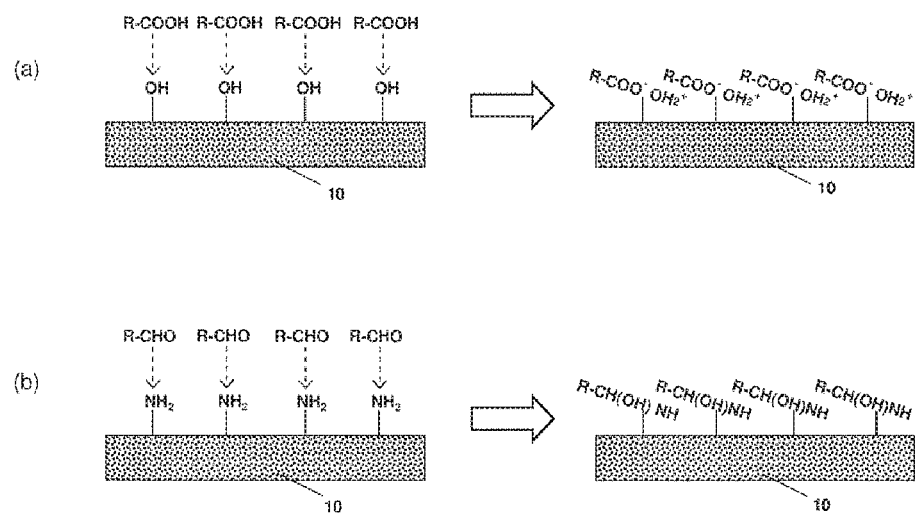
[Fig.26]
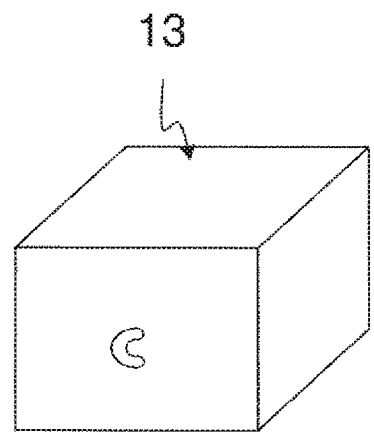

[Fig.27]
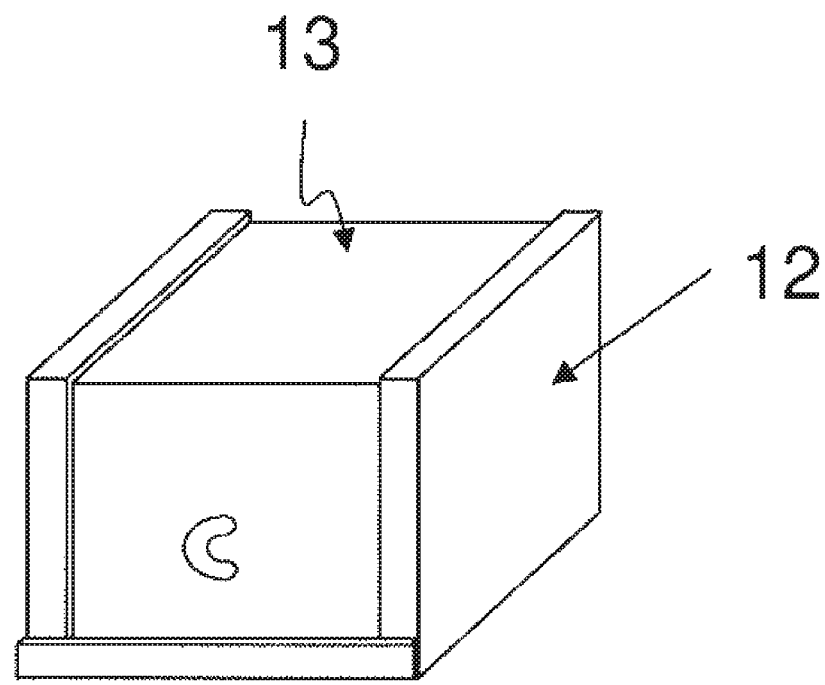
[Fig.28]
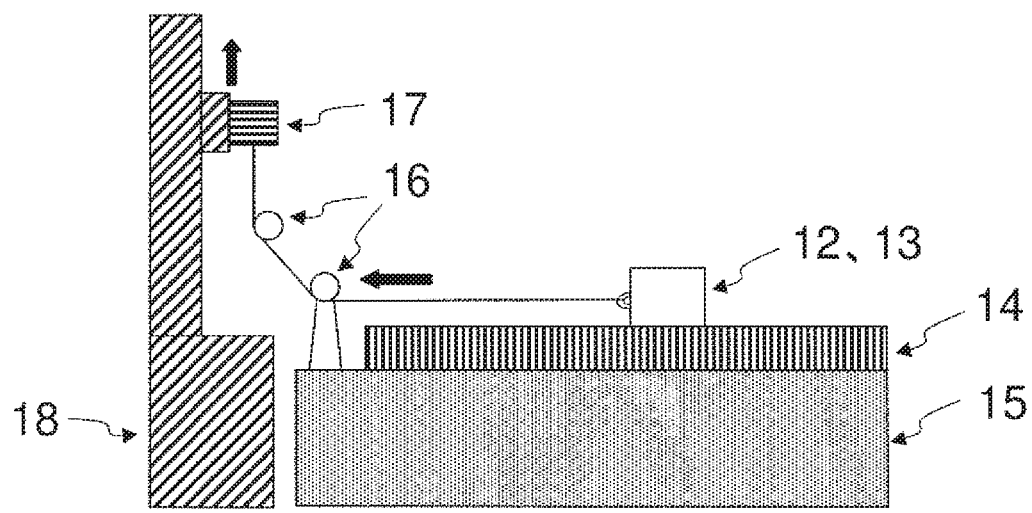

SEALANT FILM FOR PACKAGING LIQUID CONTENTS, LAMINATE INCLUDING SAME, PACKAGING MATERIAL FOR LIQUID CONTENTS, AND PACKAGE FOR LIQUID CONTENTS

TECHNICAL FIELD

The present invention relates to a sealant film for packaging liquid contents, and a laminate including the same, which prevent an eluting organic substance inherently contained in a packaging material and an odor component generated from the packaging material at the time of sterilization/disinfection treatment from migrating to the liquid contents in a package and giving a strange taste and/or a strange odor to the contents, and are consequently excellent in resistance to an odor-taste change; and a packaging material for liquid contents, and a package for liquid contents, which are produced using the laminate.

BACKGROUND ART

As for a packaging material, a packaging material has been proposed which contains an odor adsorbent that adsorbs odors (Patent Document 1). In such a packaging material, an odor adsorbent such as synthetic zeolite or activated carbon is kneaded in a resin material.

However, such a packaging material has the problems of adsorbing not only odors but also moisture in the atmosphere, and also desorbing odors which the material has once adsorbed, and does not provide a sufficient effect of adsorbing odors.

A packaging material is also known which contains an odor adsorbent comprising a chemical adsorbent supported on an inorganic porous body (Patent Document 2), but the odor adsorbent adsorbs only an odor component having a particular functional group, which is a main adsorption target; and cannot sufficiently adsorb the odor component, because in a situation in which a resin material is not selected, it is not possible to control the amount of an organic substance having no functional group to be generated.

CITATION LIST

Patent Literature

Patent Literature 1: Japanese Patent No. 2538487
Patent Literature 2: Japanese Patent Laid-Open No. 2014-233408

SUMMARY OF INVENTION

Technical Problem

The present invention solves the above problems; is excellent in manufacture suitability; exhibits the effect of being highly adsorptive against an eluting organic substance which the packaging material inherently contains, and odors generated by decomposition of a package-constituting resin and the like, at the time of sterilization/disinfection treatment by UV irradiation, hot pack, boil, γ-ray irradiation, EB irradiation and the like; and deodorizes the organic substances and the odors.

Furthermore, the present invention is directed to providing: a sealant film for packaging liquid contents, and a laminate including the sealant film, which do not decrease an odor adsorption capability and exhibit the effect of being highly adsorptive over a long period of time because of being capable of efficiently adsorbing odors without desorbing odors that are once adsorbed, are excellent in resistance to an odor-taste change of the liquid contents, and are excellent in film-forming properties, sealing strength, piercing strength and pinhole resistance; and a packaging material for liquid contents, and a package for liquid contents, which are produced using the laminate.

Solution to Problem

The present inventors have made various studies, and as a result, have found that the followings achieve the above objects: a sealant film for packaging liquid contents, including a sealant film and the same, which includes a substrate layer and a sealant layer, wherein the sealant layer is a laminate that has an odor adsorption layer which contains a particular low-elution polyethylene and a particular odor adsorbent; a packaging material for liquid contents, which has been produced using the laminate; and a package for liquid contents, which has been the packaging material for liquid contents.

The present invention has the following features.

(Sealant Film for Packaging Liquid Contents, in Aspect 1)

1. A sealant film for packaging liquid contents, including at least a low-elution polyethylene-containing layer, the low-elution polyethylene-containing layer is formed from a resin composition containing low-elution polyethylene, and a concentration of eluting TOC contained in a film formed from the low-elution polyethylene is 1.5 ppm or higher and 250 ppm or lower.

2. The sealant film for packaging liquid contents according to the above item 1, wherein a density of the low-elution polyethylene is 0.90 g/cm$^3$ or higher and 0.94 g/cm$^3$ or lower.

3. The sealant film for packaging liquid contents according to the above item 1 or 2, wherein the low-elution polyethylene is LLDPE.

4. The sealant film for packaging liquid contents according to any one of the above items 1 to 3, wherein the low-elution polyethylene is one or two or more selected from the group consisting of C4-LLDPE, C6-LLDPE and C8-LLDPE.

5. The sealant film for packaging liquid contents according to any one of the above items 1 to 4, wherein in a film formed from a simple body of the low-elution polyethylene and having a thickness of 50 μm, the number of pinholes generated after 5000 times of Gelbo Flex at 23° C. is zero, or one or more and 160 or less.

6. A packaging material for liquid contents, produced using the sealant film for packaging liquid contents according to any one of the above items 1 to 5.

7. A package for liquid contents, formed from the packaging material for liquid contents according to the above item 6.

(Sealant Film for Packaging Liquid Contents, in Aspect 2)

1. A sealant film for packaging liquid contents, including at least an odor adsorption layer, wherein the sealant film is formed from a resin composition containing low-elution polyethylene, the odor adsorption layer is formed from a resin composition containing the low-elution polyethylene and an odor adsorbent, a concentration of eluting TOC contained in a film formed from the low-elution polyethylene is 1.5 ppm or higher and 250 ppm or lower, and the odor adsorbent is an inorganic porous material carrying a chemical adsorbent thereon.

2. The sealant film for packaging liquid contents according to the above item 1, wherein a density of the low-elution polyethylene is 0.90 g/cm³ or higher and 0.94 g/cm³ or lower.

3. The sealant film for packaging liquid contents according to the above item 1 or 2, wherein the low-elution polyethylene is LLDPE.

4. The sealant film for packaging liquid contents according to any one of the above items 1 to 3, wherein the low-elution polyethylene is one or two or more selected from the group consisting of C4-LLDPE, C6-LLDPE and C8-LLDPE.

5. The sealant film for packaging liquid contents according to any one of the above items 1 to 4, wherein in a film formed from a simple body of the low-elution polyethylene and having a thickness of 50 μm, the number of pinholes generated after 5000 times of Gelbo Flex at 23° C. is zero, or one or more and 160 or less.

6. The sealant film for packaging liquid contents according to any one of the above items 1 to 5, wherein the odor adsorbent is melt-kneaded with a thermoplastic resin in advance, at a mass ratio of odor adsorbent/thermoplastic resin of 0.5/99.5 to 40/60.

7. The sealant film for packaging liquid contents according to the above item 6, wherein a melt flow rate of the thermoplastic resin is 0.2 to 10.0 g/10 minutes.

8. The sealant film for packaging liquid contents according to any one of the above items 1 to 7, wherein a content of the odor adsorbent is 0.3% by mass or more and 15% by mass or less in the whole sealant film.

9. The sealant film for packaging liquid contents according to any one of the above items 1 to 8, wherein the sealant film includes a non-odor adsorption layer on a front surface and/or a back surface of the odor adsorption layer.

10. The sealant film for packaging liquid contents according to any one of the above items 1 to 9, wherein the chemical adsorbent has a functional group having a reactivity with one or two or more selected from the group consisting of aldehydes, ketones and carboxylic acids.

11. The sealant film for packaging liquid contents according to any one of the above items 1 to 10, wherein the chemical adsorbent has an amino group.

12. A packaging material for liquid contents, produced using the sealant film for packaging liquid contents according to any one of the above items 1 to 11.

13. A package for liquid contents, formed from the packaging material for liquid contents according to the above item 12.

(Sealant Film for Packaging Liquid Contents, in Aspect 3)

1. A sealant film for packaging liquid contents, including at least an odor adsorption layer, wherein the sealant film is formed from a resin composition containing low-elution polyethylene, the odor adsorption layer is formed from a resin composition containing the low-elution polyethylene and an odor adsorbent, a concentration of eluting TOC contained in a film formed from the low-elution polyethylene is 1.5 ppm or higher and 250 ppm or lower, and the odor adsorbent includes a hydrophobic zeolite of which a molar ratio of SiO2/Al2O3 is 30/1 to 10000/1.

2. The sealant film for packaging liquid contents according to the above item 1, wherein the odor adsorbent further includes an inorganic porous material carrying a chemical adsorbent thereon.

3. The sealant film for packaging liquid contents according to the above item 1 or 2, wherein a density of the low-elution polyethylene is 0.90 g/cm³ or higher and 0.94 g/cm³ or lower.

4. The sealant film for packaging liquid contents according to any one of the above items 1 to 3, wherein the low-elution polyethylene is LLDPE.

5. The sealant film for packaging liquid contents according to any one of the above items 1 to 4, wherein the low-elution polyethylene is one or two or more selected from the group consisting of C4-LLDPE, C6-LLDPE and C8-LLDPE.

6. The sealant film for packaging liquid contents according to any one of the above items 1 to 5, wherein in a film formed from a simple body of the low-elution polyethylene and having a thickness of 50 μm, the number of pinholes generated after 5000 times of Gelbo Flex at 23° C. is zero, or one or more and 160 or less.

7. The sealant film for packaging liquid contents according to any one of the above items 1 to 6, wherein the odor adsorbent is melt-kneaded with a thermoplastic resin in advance, at a mass ratio of odor adsorbent/thermoplastic resin of 0.5/99.5 to 40/60.

8. The sealant film for packaging liquid contents according to the above item 7, wherein a melt flow rate of the thermoplastic resin is 0.2 to 10.0 g/10 minutes.

9. The sealant film for packaging liquid contents according to any one of the above items 1 to 8, wherein a content of the odor adsorbent is 0.3% by mass or more and 15% by mass or less in the whole sealant film.

10. The sealant film for packaging liquid contents according to any one of the above items 1 to 9, wherein the sealant film includes a non-odor adsorption layer on a front surface and/or a back surface of the odor adsorption layer.

11. The sealant film for packaging liquid contents according to any one of the above items 1 to 10, wherein the chemical adsorbent has a functional group having a reactivity with one or two or more selected from the group consisting of aldehydes, ketones and carboxylic acids.

12. The sealant film for packaging liquid contents according to any one of the above items 1 to 11, wherein the chemical adsorbent has an amino group.

13. The sealant film for packaging liquid contents according to any one of the above items 1 to 12, wherein a content of the hydrophobic zeolite is 0.3% by mass or more and 15% by mass or less in the whole odor adsorption layer.

14. A packaging material for liquid contents, produced using the sealant film for packaging liquid contents according to any one of the above items 1 to 13.

15. A package for liquid contents, formed from the packaging material for liquid contents according to the above item 14.

(Laminate for Packaging Liquid Contents, in Aspect 1)

The present invention has the following features.

1. A laminate for packaging liquid contents, including a substrate layer and a sealant layer, wherein the sealant layer includes at least a low-elution polyethylene-containing layer, the low-elution polyethylene-containing layer is formed from a resin composition containing low-elution polyethylene, and a concentration of eluting TOC contained in a film formed from the low-elution polyethylene is 1.5 ppm or higher and 250 ppm or lower.

2. The laminate for packaging liquid contents according to the above item 1, wherein a density of the low-elution polyethylene is 0.90 g/cm³ or higher and 0.94 g/cm³ or lower.

3. The laminate for packaging liquid contents according to the above item 1 or 2, wherein the low-elution polyethylene is LLDPE.

4. The laminate for packaging liquid contents according to any one of the above items 1 to 3, wherein the low-elution polyethylene is one or two or more selected from the group consisting of C4-LLDPE, C6-LLDPE and C8-LLDPE.

5. The laminate for packaging liquid contents according to any one of the above items 1 to 4, wherein in a film formed from a simple body of the low-elution polyethylene and having a thickness of 50 μm, the number of pinholes generated after 5000 times of Gelbo Flex at 23° C. is zero, or one or more and 160 or less.

6. A packaging material for liquid contents, produced using the laminate for packaging liquid contents according to any one of the above items 1 to 5.

7. A package for liquid contents, formed from the packaging material for liquid contents according to the above item 6.

(Laminate for Packaging Liquid Contents, in Aspect 2)

1. A laminate for packaging liquid contents, including a sealant film, which includes a substrate layer and a sealant layer, wherein the sealant layer includes at least an odor adsorption layer, the sealant layer is formed from a resin composition containing low-elution polyethylene, the odor adsorption layer is formed from a resin composition containing the low-elution polyethylene and an odor adsorbent, a concentration of eluting TOC contained in a film formed from the low-elution polyethylene is 1.5 ppm or higher and 250 ppm or lower, and the odor adsorbent is an inorganic porous material carrying a chemical adsorbent thereon.

2. The laminate for packaging liquid contents, including a sealant film according to the above item 1, wherein a density of the low-elution polyethylene is 0.90 g/cm$^3$ or higher and 0.94 g/cm$^3$ or lower.

3. The laminate for packaging liquid contents, including a sealant film according to the above item 1 or 2, wherein the low-elution polyethylene is LLDPE.

4. The laminate for packaging liquid contents, including a sealant film according to any one of the above items 1 to 3, wherein the low-elution polyethylene is one or two or more selected from the group consisting of C4-LLDPE, C6-LLDPE and C8-LLDPE.

5. The laminate for packaging liquid contents, including a sealant film according to any one of the above items 1 to 4, wherein in a film formed from a simple body of the low-elution polyethylene and having a thickness of 50 μm, the number of pinholes generated after 5000 times of Gelbo Flex at 23° C. is zero, or one or more and 160 or less.

6. The laminate for packaging liquid contents, including a sealant film according to any one of the above items 1 to 5, wherein the odor adsorbent is melt-kneaded with a thermoplastic resin in advance, at a mass ratio of odor adsorbent/thermoplastic resin of 0.5/99.5 to 40/60.

7. The laminate for packaging liquid contents, including a sealant film according to the above item 6, wherein a melt flow rate of the thermoplastic resin is 0.2 to 10.0 g/10 minutes.

8. The laminate for packaging liquid contents, including a sealant film according to any one of the above items 1 to 7, wherein a content of the odor adsorbent is 0.3% by mass or more and 15% by mass or less in the whole sealant film.

9. The laminate for packaging liquid contents, including a sealant film according to any one of the above items 1 to 8, wherein the sealant film includes a non-odor adsorption layer on a front surface and/or a back surface of the odor adsorption layer.

10. The laminate for packaging liquid contents, including a sealant film according to any one of the above items 1 to 9, wherein the chemical adsorbent has a functional group having a reactivity with one or two or more selected from the group consisting of aldehydes, ketones and carboxylic acids.

11. The laminate for packaging liquid contents, including a sealant film according to any one of the above items 1 to 10, wherein the chemical adsorbent has an amino group.

12. A packaging material for liquid contents, produced using the laminate for packaging liquid contents including a sealant film according to any one of the above items 1 to 11.

13. A package for liquid contents, formed from the packaging material for liquid contents according to the above item 12.

(Laminate for Packaging Liquid Contents, in Aspect 3)

1. A laminate for packaging liquid contents, including a substrate layer and a sealant layer, wherein the sealant layer includes at least an odor adsorption layer, the sealant layer is formed from a resin composition containing low-elution polyethylene, the odor adsorption layer is formed from a resin composition containing the low-elution polyethylene and an odor adsorbent, a concentration of eluting TOC contained in a film formed from the low-elution polyethylene is 1.5 ppm or higher and 250 ppm or lower, and the odor adsorbent includes a hydrophobic zeolite of which a molar ratio of SiO2/Al2O3 is 30/1 to 10000/1.

2. The laminate for packaging liquid contents according to the above item 1, wherein the odor adsorbent further includes an inorganic porous material carrying a chemical adsorbent thereon.

3. The laminate for packaging liquid contents according to the above item 1 or 2, wherein a density of the low-elution polyethylene is 0.90 g/cm$^3$ or higher and 0.94 g/cm$^3$ or lower.

4. The laminate for packaging liquid contents according to any one of the above items 1 to 3, wherein the low-elution polyethylene is LLDPE.

5. The laminate for packaging liquid contents according to any one of the above items 1 to 4, wherein the low-elution polyethylene is one or two or more selected from the group consisting of C4-LLDPE, C6-LLDPE and C8-LLDPE.

6. The laminate for packaging liquid contents according to any one of the above items 1 to 5, wherein in a film formed from a simple body of the low-elution polyethylene and having a thickness of 50 μm, the number of pinholes generated after 5000 times of Gelbo Flex at 23° C. is zero, or one or more and 160 or less.

7. The laminate for packaging liquid contents according to any one of the above items 1 to 6, wherein the odor adsorbent is melt-kneaded with a thermoplastic resin in advance, at a mass ratio of odor adsorbent/thermoplastic resin of 0.5/99.5 to 40/60.

8. The laminate for packaging liquid contents according to the above item 7, wherein a melt flow rate of the thermoplastic resin is 0.2 to 10.0 g/10 minutes.

9. The laminate for packaging liquid contents according to any one of the above items 1 to 8, wherein a content of the odor adsorbent is 0.3% by mass or more and 15% by mass or less in a whole sealant film.

10. The laminate for packaging liquid contents according to any one of the above items 1 to 9, wherein the sealant film includes a non-odor adsorption layer on a front surface and/or a back surface of the odor adsorption layer.

11. The laminate for packaging liquid contents according to any one of the above items 1 to 10, wherein the chemical adsorbent has a functional group having a reactivity with one or two or more selected from the group consisting of aldehydes, ketones and carboxylic acids.

12. The laminate for packaging liquid contents according to any one of the above items 1 to 11, wherein the chemical adsorbent has an amino group.

13. The laminate according to any one of the above items 1 to 12, wherein a content of the hydrophobic zeolite is 0.3% by mass or more and 15% by mass or less in the whole odor adsorption layer.

14. A packaging material for liquid contents, produced using the laminate for packaging liquid contents according to any one of the above items 1 to 13.

15. A package for liquid contents, formed from the packaging material for liquid contents according to the above item 14.

(Laminate for Packaging Liquid Contents, in Aspect 4)

1. A laminate for packaging liquid contents, including a sealant layer on each of both surfaces, wherein the sealant layer on one side of the laminate is a low-friction sealant layer containing low-elution polyethylene and a frictional resistance reducing agent, the sealant layer on the other side of the laminate is an odor adsorption sealant layer containing the low-elution polyethylene and an odor adsorbent, a concentration of eluting TOC contained in the low-elution polyethylene is 1.5 ppm or higher and 250 ppm or lower, the frictional resistance reducing agent includes a slip agent and an anti-blocking agent, and the odor adsorbent includes a hydrophobic zeolite of which a molar ratio of $SiO_2/Al_2O_3$ is 30/1 to 10000/1, and/or an inorganic porous material carrying a chemical adsorbent thereon.

2. The laminate for packaging liquid contents according to the above item 1, wherein a content of the slip agent in the low-friction sealant layer is 0.01% by mass or more and 0.2% by mass or less.

3. The laminate for packaging liquid contents according to the above item 1 or 2, wherein a content of the anti-blocking agent in the low-friction sealant layer is 0.05% by mass or more and 1% by mass or less.

4. The laminate for packaging liquid contents according to any one of the above items 1 to 3, wherein the slip agent is one or two or more selected from the group consisting of erucic acid amide, stearic acid amide, oleic acid amide, a fatty acid ester, hydrocarbon-based wax, higher fatty acid-based wax and metal soap.

5. The laminate for packaging liquid contents according to any one of the above items 1 to 4, wherein the anti-blocking agent is one or two or more selected from the group consisting of a synthetic zeolite, a natural zeolite, talc, silica, diatomaceous earth, kaolin and PMMA.

6. The laminate for packaging liquid contents according to any one of the above items 1 to 5, further including an intermediate layer including a resin film.

7. The laminate for packaging liquid contents according to the above item 6, wherein the resin film of the intermediate layer contains a polyamide-based resin.

8. The laminate for packaging liquid contents according to the above item 7, wherein the polyamide-based resin is a polyamide 6/66 copolymer.

9. The laminate for packaging liquid contents according to any one of the above items 1 to 8, wherein a density of the low-elution polyethylene is 0.90 g/cm$^3$ or higher and 0.94 g/cm$^3$ or lower.

10. The laminate for packaging liquid contents according to any one of the above items 1 to 9, wherein the low-elution polyethylene is LLDPE.

11. The laminate for packaging liquid contents according to any one of the above items 1 to 9, wherein the low-elution polyethylene is one or two or more selected from the group consisting of C4-LLDPE, C6-LLDPE and C8-LLDPE.

12. The laminate for packaging liquid contents according to any one of the above items 1 to 11, wherein the odor adsorbent is melt-kneaded with a thermoplastic resin in advance, at a mass ratio of odor adsorbent/thermoplastic resin of 0.5/99.5 to 40/60.

13. The laminate for packaging liquid contents according to the above item 12, wherein a melt flow rate of the thermoplastic resin is 0.2 to 10 g/10 minutes.

14. The laminate for packaging liquid contents according to any one of the above items 1 to 13, wherein a content of the odor adsorbent in the odor adsorption sealant layer is 0.3% by mass or more and 15% by mass or less.

15. The laminate for packaging liquid contents according to any one of the above items 1 to 14, wherein the odor adsorption sealant layer has: a multilayer structure that includes an odor adsorption layer and a non-odor adsorption layer, wherein the odor adsorption layer contains the odor adsorbent and the low-elution polyethylene, and the non-odor adsorption layer does not contain the odor adsorbent, but contains the low-elution polyethylene, and the non-odor adsorption layer on one or both sides of the odor adsorption layer.

16. The laminate for packaging liquid contents according to any one of the above items 1 to 15, wherein the chemical adsorbent has a functional group having a reactivity with one or two or more selected from the group consisting of aldehydes, ketones and carboxylic acids.

17. The laminate for packaging liquid contents according to any one of the above items 1 to 16, wherein the chemical adsorbent has an amino group or a hydroxyl group.

18. The laminate for packaging liquid contents according to any one of the above items 1 to 17, wherein a content of the hydrophobic zeolite is 0.3% by mass or more and 15% by mass or less, in the odor adsorption sealant layer.

19. The laminate for packaging liquid contents according to any one of the above items 1 to 18, wherein the number of pinholes generated after 5000 times of Gelbo Flex at 23° C. is zero, or one or more and 160 or less.

20. A packaging material for liquid contents, produced using the laminate for packaging liquid contents according to any one of the above items 1 to 19.

21. A package for liquid contents, produced from the packaging material for liquid contents according to the above item 20.

Advantageous Effects of Invention

The sealant film for packaging liquid contents of the present invention has the low-elution polyethylene-containing layer formed from the resin composition containing the particular low-elution polyethylene; accordingly, an eluting organic substance and odors are reduced which the packaging material inherently contains; and the odors are also reduced that are generated by the decomposition and/or the like of a laminate-constituting resin, at the time of sterilization/disinfection treatment by UV irradiation, γ-ray irradiation, EB irradiation, hot pack, boil or the like.

When the package for the liquid contents is produced using the packaging material for liquid contents according to the present invention, the package reduces the amount of organic substances which elute into the liquid contents filling the package, and can suppress a change in odor and taste.

The sealant film for packaging liquid contents of the present invention has an odor adsorption layer having a particular structure, and contains particular low-elution polyethylene; accordingly reduces the eluting organic substance and odors which the packaging material inherently contains; and has an effect of efficiently adsorbing the odors generated by the decomposition and/or the like of the laminate-constituting resin, at the time of sterilization/disinfection treatment by UV irradiation, γ-ray irradiation, EB irradiation, hot pack, boil or the like, for a long period of time.

The sealant layer of the laminate for packaging liquid contents of the present invention has the low-elution polyethylene-containing layer formed from the resin composition containing the particular low-elution polyethylene; accordingly, the eluting organic substance and odors are reduced which the packaging material inherently contains; and the odors are also reduced that are generated by the decomposition and/or the like of the laminate-constituting resin, at the time of sterilization/disinfection treatment by UV irradiation, γ-ray irradiation, EB irradiation, hot pack, boil or the like.

The sealant layer of the laminate for packaging liquid contents including the sealant film and the same of the present invention has an odor adsorption layer having a particular structure, and contains particular low-elution polyethylene; accordingly reduces the eluting organic substance and odors which the packaging material inherently contains; and has an effect of efficiently adsorbing odors generated by the decomposition and/or the like of the laminate-constituting resin, at the time of sterilization/disinfection treatment by UV irradiation, γ-ray irradiation, EB irradiation, hot pack, boil or the like, for a long period of time.

The sealant layer of the laminate for packaging liquid contents of the present invention has an odor adsorption layer having a particular structure, and contains particular low-elution polyethylene; accordingly reduces the eluting organic substance and odors which the packaging material inherently contains; and has an effect of efficiently adsorbing odors generated by the decomposition and/or the like of the laminate-constituting resin, at the time of sterilization/disinfection treatment by UV irradiation, γ-ray irradiation, EB irradiation, hot pack, boil or the like, for a long period of time.

Due to these effects, when the package for the liquid contents is produced using the packaging material for liquid contents of the present invention, the package can reduce the amount of organic substances which elute into the liquid contents filling the package, and suppress a change in odor and taste.

Accordingly, the packaging material for liquid contents of the present invention is suitable as a packaging material for liquid food products, pharmaceuticals and medical products which are subjected to sterilization/disinfection treatment.

In addition, the laminate of the present invention can provide a laminate that is excellent in manufacture suitability; exhibits a high effect of adsorbing odorous organic substances which the laminate inherently contains, and the odors generated by decomposition and/or the like of a laminate-constituting resin, at the time of sterilization/disinfection treatment by UV irradiation, hot pack, boil, γ-ray irradiation, EB irradiation or the like, or deodorizing odorous organic substances and odors by a decomposing action for a long period of time; is excellent in long-term resistance to an odor-taste change for the liquid contents; and is excellent in film-forming properties, sealing strength, slidability and pinhole resistance; and can provide a packaging material and a package using the laminate.

In addition, the laminate of the present invention has the odor adsorption sealant layer that contains the low-elution polyethylene and the odor adsorbent, on one surface, and has the low-friction sealant layer that contains the frictional resistance reducing agent on the other surface; and accordingly is excellent in the manufacture suitability though having a few-layers structure, can exhibit the deodorizing effect for the liquid contents, heat sealability for both surfaces, and slidability of one surface, at the same time, and can suppress the change in odor and taste of the liquid content.

BRIEF DESCRIPTION OF DRAWINGS (Sealant Film for Packaging Liquid Contents, in Aspect 1)

FIG. 1 shows a schematic cross-sectional view showing one example of a layer structure of a sealant film for packaging liquid contents of the present invention.

FIG. 2 shows a schematic cross-sectional view showing one example of a layer structure of a sealant film for packaging liquid contents of the present invention.

FIG. 3 shows a schematic cross-sectional view showing one example of a layer structure of a sealant film for packaging liquid contents of the present invention.

(Sealant Film for Packaging Liquid Contents, in Aspect 2)

FIG. 4 shows a schematic cross-sectional view showing one example of a layer structure of a sealant film for packaging liquid contents of the present invention.

FIG. 5 shows a schematic cross-sectional view showing one example of a layer structure of a sealant film for packaging liquid contents of the present invention.

FIG. 6 shows a schematic cross-sectional view showing one example of a layer structure of a sealant film for packaging liquid contents of the present invention.

FIG. 7 shows a view showing an adsorption mechanism of an odor adsorbent for odorous substances.

(Sealant Film for Packaging Liquid Contents, in Aspect 3)

FIG. 8 shows a schematic cross-sectional view showing one example of a layer structure of a sealant film for packaging liquid contents of the present invention.

FIG. 9 shows a schematic cross-sectional view showing one example of a layer structure of a sealant film for packaging liquid contents of the present invention.

FIG. 10 shows a schematic cross-sectional view showing one example of a layer structure of a sealant film for packaging liquid contents of the present invention.

FIG. 11 shows a view showing an adsorption mechanism of an inorganic porous material carrying a chemical adsorbent thereon, for odorous substances.

(Laminate for Packaging Liquid Contents, in Aspect 1)

FIG. 12 shows a schematic cross-sectional view showing one example of a layer structure of a laminate for packaging liquid contents of the present invention.

FIG. 13 shows a schematic cross-sectional view showing one example of a layer structure of a laminate for packaging liquid contents of the present invention.

FIG. 14 shows a schematic cross-sectional view showing one example of a layer structure of a laminate for packaging liquid contents of the present invention.

(Laminate for Packaging Liquid Contents, in Aspect 2)

FIG. 15 shows a schematic cross-sectional view showing one example of a layer structure of a laminate for packaging liquid contents including a sealant film and the same of the present invention.

FIG. 16 shows a schematic cross-sectional view showing one example of a layer structure of a laminate for packaging liquid contents including a sealant film and the same of the present invention.

FIG. 17 shows a schematic cross-sectional view showing one example of a layer structure of a laminate for packaging liquid contents including a sealant film and the same of the present invention.

FIG. 18 shows a view showing an adsorption mechanism of an odor adsorbent for odorous substances.

(Laminate for Packaging Liquid Contents, in Aspect 3)

FIG. 19 shows a schematic cross-sectional view showing one example of a layer structure of a laminate for packaging liquid contents of the present invention.

FIG. 20 shows a schematic cross-sectional view showing one example of a layer structure of a laminate for packaging liquid contents of the present invention.

FIG. 21 shows a schematic cross-sectional view showing one example of a layer structure of a laminate for packaging liquid contents of the present invention.

FIG. 22 shows a view showing an adsorption mechanism of an inorganic porous material carrying a chemical adsorbent thereon, for odorous substances.

(Laminate for Packaging Liquid Contents, in Aspect 4)

FIG. 23 shows a schematic cross-sectional view showing one example of a layer structure of a laminate of the present invention.

FIG. 24 shows a schematic cross-sectional view showing one example of another embodiment of a layer structure of a laminate of the present invention.

FIG. 25 shows a view showing an adsorption mechanism of an inorganic porous material carrying a chemical adsorbent thereon, for odorous substances.

FIG. 26 shows a schematic overhead view showing a weight for measuring a coefficient of static friction.

FIG. 27 shows an overhead view showing a state in which a laminate of the present invention is fixed to the weight.

FIG. 28 shows a view showing a method for measuring the coefficient of static friction.

DESCRIPTION OF EMBODIMENTS

The followings in the present invention will be described in further detail below: a sealant film for packaging liquid contents; a laminate including the same; and a package for liquid contents, which is produced using the laminate. The present invention will be described with reference to specific examples, but the present invention is not limited thereto.

Layer Structure of a Laminate for Packaging Liquid Contents Including Sealant Film and Same of the Present Invention (Sealant Film for Packaging Liquid Contents, in Aspect 1)

A sealant film for packaging liquid contents of the present invention is a sealant film for packaging liquid contents, which has at least a low-elution polyethylene-containing layer that is formed from a resin composition containing low-elution polyethylene; and may be only a layer that functions as a sealant, may be a layer consisting of only the low-elution polyethylene-containing layer 3, and may include a substrate layer and an adhesive agent layer.

Furthermore, the sealant film 1 may have a multilayer structure including a low-elution polyethylene-containing layer 3 and a non-low-elution polyethylene-containing layer 2 that does not contain the low-elution polyethylene, as is shown in FIGS. 1 and 2.

In addition, as is shown in FIG. 3, the low-elution polyethylene-containing layer 3 may have a multilayer structure such as 3a, 3b or the like, in which the type and content of the low-elution polyethylene that becomes a main constituent are the same as or different from each other.

When a package for liquid contents is produced of a packaging material that uses a sealant film for packaging liquid contents of the present invention, the innermost layer which comes in contact with the liquid contents in the package may be the low-elution polyethylene-containing layer 3 or also be the non-low-elution polyethylene-containing layer 2.

Furthermore, the low-elution polyethylene-containing layer 3 may be composed of three or more layers having the same or different types and contents of the low-elution polyethylene which becomes the main constituent, though being not illustrated.

(Sealant Film for Packaging Liquid Contents, in Aspect 2)

A sealant film for packaging liquid contents of the present invention is a sealant film for packaging liquid contents, which has at least an odor adsorption layer; and may be only a layer that functions as a sealant, may be a layer consisting of only the odor adsorption layer 3, and may also include a substrate layer and an adhesive agent layer.

Furthermore, the sealant film 1 may have a multilayer structure including the odor adsorption layer 3 and a non-odor adsorption layer 2 which does not contain an odor adsorbent, as is shown in FIGS. 4 and 5; and in the case of FIG. 5, can improve the sealing strength and the interlayer adhesive strength.

In addition, as is shown in FIG. 6, the odor adsorption layer 3 may have a multilayer structure such as 3a, 3b and the like, in which the type of the low-elution polyethylene that becomes a main constituent and/or the type and content of the odor adsorbent are the same as or different from each other.

When a package for liquid contents is produced of a packaging material that uses a sealant film for packaging liquid contents of the present invention, the innermost layer which comes in contact with the liquid content in the package may be an odor adsorption layer 3 or also be a non-odor adsorption layer 2. When the non-odor adsorption layer 2 is the innermost layer, the sealant film can improve the sealing strength of the package, and when the odor adsorption layer 3 is the innermost layer, the sealant film can improve the interlayer adhesive strength in the package.

Furthermore, the odor adsorption layer 3 may be composed of three or more layers in which the type of the low-elution polyethylene that becomes a main constituent and/or the type and content of the odor adsorbent are the same as or different from each other, though being not illustrated.

(Sealant Film for Packaging Liquid Contents, in Aspect 3)

A sealant film for packaging liquid contents of the present invention is a sealant film for packaging liquid contents, which has at least an odor adsorption layer; and may be only a layer that functions as a sealant, may be a layer consisting of only the odor adsorption layer 3, and may include a substrate layer and an adhesive agent layer.

Furthermore, the sealant film 1 may have a multilayer structure including the odor adsorption layer 3 and a non-odor adsorption layer 2 which does not contain an odor adsorbent, as is shown in FIGS. 8 and 9; and in the case of FIG. 9, can improve the sealing strength and the interlayer adhesive strength.

In addition, as is shown in FIG. 10, the odor adsorption layer 3 may have a multilayer structure such as 3a, 3b and the like, in which the type of the low-elution polyethylene that becomes a main constituent and/or the type and content of the odor adsorbent are the same as or different from each other.

When a package for liquid contents is produced of a packaging material that uses a sealant film for packaging liquid contents of the present invention, the innermost layer which comes in contact with the liquid content in the package may be an odor adsorption layer 3 or also be a non-odor adsorption layer 2. When the non-odor adsorption layer 2 is the innermost layer, the sealant film can improve the sealing strength for the package, and when the odor adsorption layer 3 is the innermost layer, the sealant film can improve the interlayer adhesive strength in the package.

Furthermore, the odor adsorption layer 3 may be composed of three or more layers in which the type of the low-elution polyethylene that becomes a main constituent and/or the type and content of the odor adsorbent are the same as or different from each other, though being not illustrated.

(Laminate for Packaging Liquid Contents, in Aspect 1)

A laminate for packaging liquid contents of the present invention has a substrate layer and a sealant layer.

The sealant layer has at least a low-elution polyethylene-containing layer that is formed from a resin composition containing low-elution polyethylene; and may be only a layer that functions as a sealant, may be a layer consisting of only the low-elution polyethylene-containing layer 3, and may include a substrate layer and an adhesive agent layer.

Furthermore, the sealant layer 1 may have a multilayer structure including a low-elution polyethylene-containing layer 3 and a non-low-elution polyethylene-containing layer 2 that does not contain the low-elution polyethylene, as is shown in FIGS. 12 and 13.

In addition, as is shown in FIG. 14, the low-elution polyethylene-containing layer 3 may have a multilayer structure such as 3a, 3b or the like, in which the type and content of the low-elution polyethylene that becomes a main constituent are the same as or different from each other.

When a package for liquid contents is produced of a packaging material that uses a laminate for packaging liquid contents of the present invention, the innermost layer which comes in contact with the liquid contents in the package may be the low-elution polyethylene-containing layer 3 or also be the non-low-elution polyethylene-containing layer 2.

Furthermore, the low-elution polyethylene-containing layer 3 may be composed of three or more layers having the same or different types and contents of the low-elution polyethylene which becomes the main constituent, though being not illustrated.

(Laminate for Packaging Liquid Contents, in Aspect 2)

A laminate for packaging liquid contents including a sealant film and the same of the present invention has a substrate layer and a sealant layer.

The sealant layer is a sealant layer for packaging liquid contents, which has at least an odor adsorption layer; and may be only a layer that functions as a sealant, may be a layer consisting of only the odor adsorption layer 3, and may include a substrate layer and an adhesive agent layer.

Furthermore, the sealant layer 1 may have a multilayer structure including the odor adsorption layer 3 and a non-odor adsorption layer 2 which does not contain an odor adsorbent, as is shown in FIGS. 15 and 16; and in the case of FIG. 16, can improve the sealing strength and the interlayer adhesive strength.

In addition, as is shown in FIG. 17, the odor adsorption layer 3 may have a multilayer structure such as 3a, 3b and the like, in which the type of the low-elution polyethylene that becomes a main constituent and/or the type and content of the odor adsorbent are the same as or different from each other.

When a package for liquid contents is produced of a packaging material that uses a laminate for packaging liquid contents including a sealant film and the same of the present invention, the innermost layer which comes in contact with the liquid content in the package may be an odor adsorption layer 3 or also be a non-odor adsorption layer 2. When the non-odor adsorption layer 2 is the innermost layer, the sealing strength of the package can be improved, and when the odor adsorption layer 3 is the innermost layer, the interlayer adhesive strength in the package can be improved.

Furthermore, the odor adsorption layer 3 may be composed of three or more layers in which the type of the low-elution polyethylene that becomes a main constituent and/or the type and content of the odor adsorbent are the same as or different from each other, though being not illustrated.

(Laminate for Packaging Liquid Contents, in Aspect 3)

A laminate for packaging liquid contents of the present invention has a substrate layer and a sealant layer.

The sealant layer is a sealant layer for packaging liquid contents, which has at least an odor adsorption layer; and may be only a layer that functions as a sealant, may be a layer consisting of only the odor adsorption layer 3, and may include a substrate layer and an adhesive agent layer.

Furthermore, the sealant layer 1 may have a multilayer structure including the odor adsorption layer 3 and a non-odor adsorption layer 2 which does not contain an odor adsorbent, as is shown in FIGS. 19 and 20; and in the case of FIG. 20, can improve the sealing strength and the interlayer adhesive strength.

In addition, as is shown in FIG. 21, the odor adsorption layer 3 may have a multilayer structure such as 3a, 3b and the like, in which the type of the low-elution polyethylene that becomes a main constituent and/or the type and content of the odor adsorbent are the same as or different from each other.

When a package for liquid contents is produced of a packaging material that uses a laminate for packaging liquid contents of the present invention, the innermost layer which comes in contact with the liquid content in the package may be an odor adsorption layer 3 or also be a non-odor adsorption layer 2. When the non-odor adsorption layer 2 is the innermost layer, the sealing strength of the package can be improved, and when the odor adsorption layer 3 is the innermost layer, the interlayer adhesive strength in the package can be improved.

Furthermore, the odor adsorption layer 3 may be composed of three or more layers in which the type of the low-elution polyethylene that becomes a main constituent and/or the type and content of the odor adsorbent are the same as or different from each other, though being not illustrated.

(Laminate for Packaging Liquid Contents, in Aspect 4)

A laminate of the present invention is a laminate for packaging liquid contents, and has sealant layers on both of the surfaces, as is shown in FIG. 23, where a sealant layer on one side is a low-friction sealant layer containing low-elution polyethylene and a frictional resistance reducing agent, and a sealant layer on the other side is an odor adsorption sealant layer containing low-elution polyethylene and an odor adsorbent; and furthermore, can also include another layer such as an intermediate layer, as needed.

It is preferable that the laminate has excellent pinhole resistance. Specifically, it is preferable that the number of pinholes which are generated after 5000 times of Gelbo Flex at 23° C. is zero, or one or more and 160 or less.

When packaging materials and packages are produced of a laminate having the above pinhole resistance, even if fatigue fracture progresses due to local repeated bending by vibration during a packaging process or during transportation, the packaging materials and the packages can suppress the generation of the pin hole.

[Low-Friction Sealant Layer]

The low-friction sealant layer is a layer that contains at least the low-elution polyethylene and a frictional resistance reducing agent.

The low-friction sealant layer contains the low-elution polyethylene, and thereby suppresses the elution of an organic substance from the laminate, and the laminate can exhibit excellent heat sealability; and the low-friction sealant layer can contain the frictional resistance reducing agent, and can reduce the frictional resistance of one side of the laminate surface.

In the present invention, the frictional resistance reducing agent includes a slip agent and an anti-blocking agent.

The content of the slip agent in the low-friction sealant layer is preferably 0.01% by mass or more and 0.2% by mass or less. When the content is less than the above range, the effect of adding the slip agent resists being exhibited, and when the content is more than the above range, bleeding becomes apt to occur.

The content of the anti-blocking agent in the low-friction sealant layer is preferably 0.05% by mass or more and 1% by mass or less. When the content is less than the above range, the effect of adding the anti-blocking agent resists being exhibited, and when the content is more than the above range, there is a risk that the film-forming properties are deteriorated, or that a whitening phenomenon occurs when the laminates, the packaging materials and the packages each rub against each other.

The low-friction sealant layer may contain arbitrarily other additives in such a range as not to remarkably impair the effects of the present invention. The additives include various additives for resin, which are generally used for adjusting the formability and productivity of films and laminates, and various physical properties; and include, for example, an antioxidant, a pigment, a flow control material, a flame retardant, a filler, an ultraviolet absorber and a surfactant.

In the low-friction sealant layer, the frictional resistance reducing agent may be uniformly dispersed in the layer, or may be dispersed with a concentration gradient.

For example, the frictional resistance reducing agent may be dispersed with an increasing concentration gradient from the inner surface toward the outer surface, when the package is formed; and due to this structure, the heat sealability is enhanced. On the contrary, the frictional resistance reducing agent may be dispersed with a decreasing concentration gradient from the inner surface toward the outer surface, when the package is formed; and due to this structure, the interlayer adhesive strength is enhanced.

Furthermore, the frictional resistance reducing agent may be dispersed with a decreasing concentration gradient from the center to both surfaces in the thickness direction of the low-friction sealant layer; and due to this structure, the heat sealability and the interlayer adhesive strength are enhanced.

The thickness of the low-friction sealant layer is preferably 5 μm or larger and 300 μm or smaller, and is more preferably 10 μm or larger and 200 μm or smaller.

If the thickness is thinner than the above range, it is difficult to obtain a sufficient heat sealing strength, a lamination strength and a low-friction effect, and if the thickness is thicker than the above range, it becomes apt to be difficult to balance the heat sealability of the sealant layer and the rigidity thereof.

The low-friction sealant layer may be composed of one layer, or may have a multilayer structure composed of two or more layers; and in the case of the multilayer structure, each layer may have the same composition, or have different compositions from each other.

When the low-friction sealant layer has the multilayer structure, the low-friction sealant layer may be composed of a low-friction layer which contains the low-elution polyethylene and the frictional resistance reducing agent, and of a non-low-friction layer which contains the low-elution polyethylene but does not contain the frictional resistance reducing agent. In this case, it is preferable that the low-friction layer is laminated on the outermost surface of the laminate, in order to obtain good low friction properties.

The low-friction sealant layer may be formed by attaching a film which contains the low-elution polyethylene and the frictional resistance reducing agent to another layer via an adhesive agent; may be formed by laminating a resin composition containing the low-elution polyethylene and/or the frictional resistance reducing agent onto another layer, by (co)extrusion film formation; or may be formed by coextrusion film formation together with an odor adsorption sealant layer.

In the present invention, a method for forming the low-friction sealant layer or each layer in the low-friction sealant layer and laminating the layers is not particularly limited, and a heretofore known or commonly used film-forming method and laminating method can be applied.

For example, there is a method of laminating a low-friction sealant layer onto a surface to be laminated, by an extrusion coating method, occasionally via an adhesive layer.

In addition, there is a method of forming one or more layers which constitute the low-friction sealant layer, by (co)extrusion by an inflation method or a casting method; and in this case, the one or more layers may be coextruded together with the odor adsorption sealant layer.

Alternatively, it is also acceptable to prepare a sealant film for a low-friction sealant layer once, and laminate the sealant film onto the surface to be laminated via an adhesive layer, by an extrusion coating method, a dry laminating method, a non-solvent laminating method or the like, using the adhesive agent.

Here, it is acceptable to use any of a general-purpose adhesive agent and a low-elution polyethylene, as the adhesive agent.

When the sealant film is laminated by the extrusion coating method, first, the resin composition for forming the low-friction sealant layer is heated to be melted, is expanded and extended in a required width direction by a T-die, and is (co)extruded into a curtain shape; and the molten resin is allowed to flow down onto the surface to be laminated, and is sandwiched between a rubber roll and a cooled metal roll. Thereby, the low-friction sealant layer can be formed, be bonded to and be laminated on the surface to be laminated, at the same time.

<Low-Elution Polyethylene>

The sealant layer of the laminate of the present invention contains a low-elution polyethylene which has heat sealability and of which the amount of organic substances to be eluted is small.

Due to the amount of the organic substances to be eluted being small, the package for liquid contents, which uses the laminate of the present invention, can reduce the concentration of the organic substances that elute into the liquid contents filling the package and can suppress a change in odor and taste.

Here, in the present invention, a concentration of the organic substances in the liquid content is represented by a concentration of total organic carbon (TOC=Total Organic Carbon).

The TOC shows a concentration of the total amount of oxidizable organic substances (organic carbon substances) in water, by a concentration of the amount of carbon, is used as one of representative indices of water quality, and is standardized in JIS K0805 (continuous total organic carbon analyzer) and the like.

A concentration of eluting TOC which is contained in the low-elution polyethylene film is 1.5 ppm or higher and 250 ppm or lower.

Here, a reason for measuring the concentration of the eluting TOC concerning the above low-elution polyethylene of a raw material of an elementary substance, not in a state of a pellet or the like of the raw material, but in a state of being formed into a film is because there is a case where when the low-elution polyethylene is formed into a film such as a sealant layer formation or the like, various heat histories or the like are given thereto, and thereby the amount of eluting TOC results in increasing.

It is preferable for an increment of a concentration of TOC in filling water after a pouch packaging bag with 15 cm×44 cm×50 μm thick, which has been formed from the low-elution polyethylene according to the present invention, has been filled with 1 kg of distilled water that is the filling water and the polyethylene has been eluted, to be 0.01 ppm or higher and 1.5 ppm or lower, is more preferable to be 0.02 ppm or higher and 1.45 ppm or lower, and is further preferable to be 0.025 ppm or higher and 1.4 ppm or lower.

If the increment of the concentration of TOC in the filling water is larger than 1.5 ppm, it is difficult to suppress a change in the odor of the filling water; and in order to obtain the low-elution polyethylene of which the increment of the concentration is less than 0.01 ppm, the cost becomes high, but on the other hand, the effect is limited. From the viewpoint of achieving the balance between the cost and the performance, the above range is preferable.

Here, the increment of the concentration of TOC in the filling water, at the time when the total amount of eluting components contained in the above pouch bag has been eluted in 1000 g of filling water, is calculated as follows.

Specific gravity of pouch bag: S [g/cm$^3$]
Size of pouch bag: 15 cm×44 cm×50 μm thickness
Weight of pouch bag: W=15×44×50×10$^{-4}$×2×S=6.6×S [g]

When the concentration of eluting TOC contained in the pouch bag is represented by C [ppm], the total weight of eluting TOC contained in the pouch bag is equal to C×W [g].

Because the total weight is eluted into 1000 g of water, the increment of the concentration of TOC in the filling water=C×W/1000=C×6.6×S×10$^{-3}$ [ppm] For example, when the specific gravity of the low-elution polyethylene film constituting the pouch bag is 0.92 and the concentration of contained eluting TOC is 1.7 ppm, the increment of the concentration of TOC in the filling water is calculated as 1.7×6.6×0.92×10$^{-3}$=0.01 [ppm].

Specifically, the increment of the concentration of TOC can be determined, for example, by filling the above pouch packaging bag with 1000 g of distilled water which is filling water at 40° C. to 80° C.; storing the resultant pouch packaging bag at 25° C. to 50° C. for several days to 4 weeks; measuring the concentration of TOC in the filling water with a total organic carbon meter or HS-GC; and subtracting the concentration of TOC in the distilled water as a blank from the measured concentration.

In the present invention, the increment of the concentration of TOC is determined by a standard method which includes producing a package of a pouch bag (15 cm×44 cm) using the sealant film; filling the package with 1000 g of water (distilled water for high performance liquid chromatography, Junsei Chemical Co., Ltd.) at 65° C. to prepare a liquid-filled package; storing the liquid-filled package at 35° C. for 2 weeks; then measuring the concentration of TOC in the filling water using a TOC-L total organic carbon meter manufactured by Shimadzu Corporation.

Then, the concentration of eluting TOC is calculated which has been contained in the sealant film, from the obtained increment of the TOC concentration in the filling water, and the mass part of the filling water and the mass part of the sealant film.

Specific examples of the low-elution polyethylene include, but are not limited to, low-elution resins such as low-density polyethylene (LDPE), medium-density polyethylene (MDPE), high-density polyethylene (HDPE), linear low-density polyethylene (LLDPE), an ethylene-vinyl acetate copolymer, an ethylene-ethyl acrylate copolymer, an ethylene-acrylic acid copolymer, an ethylene-methacrylic acid copolymer, an ethylene-methyl methacrylic acid copolymer, and an ethylene-propylene copolymer; and mixtures thereof.

Examples of a method for reducing the amount of organic substances to be eluted from the low-elution polyethylene film include, but are not limited to, the following methods.

When polyethylene is produced, it is effective to reduce a residual amount of unreacted raw materials, and the amounts of products with low molecular weight and by-products, and to remove a polymerization catalyst. Specifically, there are methods of: enhancing the purity of raw materials; precisely controlling conditions such as a reaction temperature and pressure; removing unreacted raw materials, products with low molecular weight, by-products and polymerization catalysts by distillation or washing; and preventing oxidation to be caused by contact with oxygen in the air at a high temperature.

When the produced polyethylene is pelletized, there is a method of restricting the use of a lubricant, an antioxidant and other additives which are likely to increase the amount of organic substances to be eluted.

When polyethylene is formed into a film, there are methods of: limiting the use of lubricants, antioxidants, solvents and other additives which are likely to increase the amount of organic substances to be eluted; and preventing oxidation due to a high temperature.

The sealant film of the laminate of the present invention has heat sealability and contains low-elution polyethylene; and thereby a packaging material containing the laminate has excellent heat sealability, contains a small amount of organic substances to be eluted, and can lower the increment of the concentration of TOC in liquid contents in the package.

In addition, polyethylene is suitable in a point that the polyethylene has resistance to disinfection/sterilization treatment such as UV and has a property of resisting being decomposed.

Among these low-elution polyethylenes, LLDPE is preferable as the type, and furthermore because LLDPE having C4, C6 and C8 side chains tends to be capable of reducing the amount of organic substances to be eluted, C4-LLDPE, C6-LLDPE, C8-LLDPE and the like are further preferable.

Here, C4, C6 and C8 mean that monomers each having the described number of carbon atoms exist in the side chain, in a form of partially copolymerizing with LLDPE. For example, C4 represents a side chain of a structure of butene-1, C6 represents the side chain of the structure of hexene-1 or 4-methylpentene-1, and C8 represents the side chain of the structure of octene-1.

Alternatively, a low-elution polyethylene having a density of 0.90 g/cm$^3$ or higher and 0.94 g/cm$^3$ or lower is preferable, and a low-elution polyethylene having a density of 0.905 g/cm$^3$ or higher and 0.933 g/cm$^3$ or lower is more preferable. The low-elution polyethylene having the density in this range tends to be capable of reducing the amount of organic substances to be eluted.

In addition, the low-elution polyethylene can also contain small amounts of additives such as an antioxidant and an anti-blocking agent.

Still furthermore, it is preferable that the low-elution polyethylene in the present invention is excellent in resistance to a pinhole which is caused by bending, when its simple body has been formed into a film.

In a package, the pinhole resistance is important, particularly for packaging materials for foods and medical supplies, because there is a case where fatigue fracture progresses due to the repetition of local bending, which is caused by vibration during a packaging process and transportation, and the pinhole is generated.

As for the pinhole resistance of the low-elution polyethylene in the present invention, for example, in a 50 μm thick film which is formed of a simple body of the low-elution polyethylene, it is preferable that the number of pinholes that are generated after 5000 times of Gelbo Flex at 23° C. is zero, or one or more and 160 or less.

When the number of pinholes which are generated in the film of the sealant layer is in the above range, a packaging material can be produced that can withstand practical use in the case of applications to which the pinhole resistance is required.

<Low-Elution Polyethylene-Containing Layer>

The low-elution polyethylene-containing layer in the present invention is formed from a resin composition containing the above low-elution polyethylene.

The low-elution polyethylene-containing layer can further include a high-elution polyethylene, polypropylene, a methylpentene polymer, an acid-modified polyolefin-based resin, and a mixture of these thermoplastic resins, in such a range as not to impair the low-elution properties and heat sealability of the sealant film, but resins which can be contained are not limited to these resins.

<Non-Low-Elution Polyethylene-Containing Layer>

The non-low-elution polyethylene-containing layer in the present invention is a layer that does not contain the low-elution polyethylene, and is a layer which the sealant film has as needed.

The non-low-elution polyethylene-containing layer can include a general-purpose polyethylene, polypropylene, a methylpentene polymer, an acid-modified polyolefin-based resin, and a mixture of these thermoplastic resins, in such a range as not to impair the low-elution properties and heat sealability of the sealant film, but resins which can be contained are not limited to these resins.

<Odor Adsorption Layer>

The odor adsorption layer in the present invention is formed from a resin composition containing the above low-elution polyethylene and an odor adsorbent.

The odor adsorption layer can further include a general-purpose polyethylene, polypropylene, a methylpentene polymer, an acid-modified polyolefin-based resin, and a mixture of these thermoplastic resins, in such a range as not to impair the low-elution properties and heat sealability of the sealant film, but resins which can be contained are not limited to these resins.

[Odor Adsorbent (1)]

In the present invention, the odor adsorbent is an inorganic porous material carrying a chemical adsorbent thereon, and has a function of adsorbing eluting organic substances, and odorous substances which are generated from the package during the sterilization/disinfection treatment such as UV irradiation, γ-ray irradiation, EB irradiation, hot pack and boil.

As the carrying method, a heretofore known or commonly used carrying method can be applied, and for example, the chemical adsorbent can be carried by the inorganic porous material, by impregnating the inorganic porous material with a solution containing the chemical adsorbent which will be described below; and drying the resultant inorganic porous material.

In the present invention, the odor adsorption layer contains the odor adsorbent which is the inorganic porous material carrying the chemical adsorbent thereon, thereby can greatly increase the adsorption capacity per unit mass of the chemical adsorbent, and can reduce the contents of the chemical adsorbent and odor adsorbent in the package. In addition, physical adsorption characteristics in porous portions of the inorganic porous material can also be expected.

Due to these characteristics, high sealing strength can be obtained, and the sealant layer can keep excellent heat sealability and film-forming properties which are required for the sealant layer.

The odor adsorbent can exhibit a sufficient adsorption effect as long as the content of the odor adsorbent is 0.1% by mass or more in the whole sealant layer, but in order to obtain a good adsorption effect as a package, it is preferable for the content of the odor adsorbent to be 0.3% by mass or more and is more preferable to be 0.5% by mass or more.

On the other hand, in order to obtain sufficient film-forming properties when the laminate is produced, and in addition, achieve a good heat sealability, it is preferable for the content of the odor adsorbent in the whole sealant layer is preferably 15% by mass or less, and is more preferable to be 10% by mass or less.

In addition, an external shape of the odor adsorbent may be an arbitrary shape such as a spherical shape, a rod shape and an elliptical shape, and may be any form such as a powder form, a lump form and a granule form, but the powder form is preferable from the viewpoint of film-forming properties of the odor adsorption layer, uniform dispersion in a thermoplastic resin, kneading characteristics and the like.

The odor adsorbent that has an arbitrary average particle size can be appropriately selected according to the application, and in the present invention, in particular, it is preferable for the average particle size to be 0.01 μm to 10 μm, is more preferable to be 0.1 μm to 8 μm, and is further preferable to be 1 μm to 7 μm. Here, the average particle size is a value measured by a dynamic light scattering method.

If the average particle size is smaller than 0.01 μm, the odor adsorbent is apt to cause aggregation, and the dispersibility of the odor adsorbent in low-elution polyethylene tends to decrease.

In addition, if the average particle size is larger than 10 μm, the odor adsorption layer is inferior in the film-forming properties, and accordingly tends to resist containing a large amount of odor adsorbents; and there occurs a possibility that a sufficient adsorption effect cannot be obtained.

Specific examples of commercially available products which can be used as suitable odor adsorbents in the present invention include: NS-241 and NS-231 (inorganic porous material carrying amino group-containing compound thereon) produced by Toagosei Co., Ltd.; and Dushlite M (inorganic porous material carrying amino group-containing compound thereon, produced by Sinanen Zeomic Co., Ltd.)

(Hydrophobic Zeolite)

In general, the higher the molar ratio of SiO2/Al2O3, the higher the hydrophobicity of the zeolite; and in the present invention, it is preferable that the hydrophobic zeolite which is contained in the odor adsorption layer has a molar ratio of $SiO_2$/Al2O3 of 30 to 10000.

The hydrophobic zeolites exhibit the adsorption effect on the odor component, particularly when the sealant film or the packaging material which uses the sealant film is exposed to 230° C. or higher.

The external shape of the hydrophobic zeolite may be an arbitrary shape such as a spherical shape, a rod shape and an elliptical shape, and may be any form such as a powder form, a lump form and a granule form, but the powder form is preferable from the viewpoint of film-forming properties of the odor adsorption layer, uniform dispersion in polyethylene, kneading characteristics and the like.

In the present invention, as for the average particle size of the hydrophobic zeolite, the hydrophobic zeolite having an arbitrary average particle size can be appropriately selected according to applications, but it is preferable that the hydrophobic zeolite has an average particle size of 0.01 µm to 10 µm. Here, the average particle size is a value measured by a dynamic light scattering method.

If the average particle size is smaller than 0.01 µm, the hydrophobic zeolite is apt to cause aggregation, and tends to decrease the dispersibility in polyethylene. In addition, if the average particle size is larger than 10 µm, the odor adsorption layer tends to become inferior in the film-forming properties, and accordingly tends to resist containing a large amount of hydrophobic zeolite; and the surface area also decreases, and accordingly there occurs a possibility that a sufficient deodorizing effect cannot be obtained.

It is preferable that the content of the hydrophobic zeolite is 0.3% by mass or more and 15% by mass or less in the above whole odor adsorption layer.

In the present invention, the hydrophobic zeolite can exhibit a sufficient effect of odor adsorption properties as long as 0.1% by mass or more of the hydrophobic zeolite is contained in the odor adsorption layer, but in order to obtain a good effect of odor adsorption properties as a package, the amount of the hydrophobic zeolite to be added is preferably 0.3% by mass or more, and is more preferably 0.5% by mass or more.

On the other hand, in order to obtain good film-forming properties when the laminate is produced, and in addition, achieve a good heat sealability, the content of the hydrophobic zeolite is preferably 15% by mass or less, and is more preferably 10% by mass or less.

Furthermore, in the hydrophobic zeolite of the present invention, the molar ratio of SiO2/Al2O3 is adjusted to 30 to 10000, and thereby the hydrophobic zeolite can suppress the adsorption of moisture, and can exhibit high odor adsorption capability.

(Inorganic Porous Material Carrying Chemical Adsorbent Thereon)

In the present invention, the inorganic porous material carrying a chemical adsorbent thereon is an inorganic porous material carrying the chemical adsorbent thereon, and has a function of adsorbing eluting organic substances, and odorous substances which are generated from the package during the sterilization/disinfection treatment such as UV irradiation, γ-ray irradiation, EB irradiation, hot pack and boil.

As the carrying method, a heretofore known or commonly used carrying method can be applied, and for example, the chemical adsorbent can be carried by the inorganic porous material, by impregnating the inorganic porous material with a solution containing the chemical adsorbent which will be described below; and drying the resultant inorganic porous material.

In the present invention, the odor adsorption layer contains the odor adsorbent which is the inorganic porous material carrying the chemical adsorbent thereon, thereby can greatly increase the adsorption capability per unit mass of the chemical adsorbent, and can reduce the contents of the chemical adsorbent and the odor adsorbent in the package. In addition, physical adsorption characteristics of porous portions of the inorganic porous material can also be expected.

Due to these characteristics, high sealing strength can be obtained, and the sealant layer can keep excellent heat sealability and film-forming properties which are required for the sealant layer.

The odor adsorbent can exhibit a sufficient adsorption effect as long as the content of the odor adsorbent is 0.1% by mass or more in the whole sealant layer, but in order to obtain a good adsorption effect as a package, it is preferable for the content of the odor adsorbent to be 0.3% by mass or more and is more preferable to be 0.5% by mass or more.

On the other hand, in order to obtain good film-forming properties when the laminate is produced, and in addition, achieve a good heat sealability, it is preferable for the content of the odor adsorbent in the whole sealant layer to be 15% by mass or less, and is more preferable to be 10% by mass or less.

In addition, an external shape of the odor adsorbent may be an arbitrary shape such as a spherical shape, a rod shape and an elliptical shape, and may be any form such as a powder form, a lump form and a granule form, but the powder form is preferable from the viewpoint of film-forming properties of the odor adsorption layer, uniform dispersion in a thermoplastic resin, kneading characteristics and the like.

The odor adsorbent that has an arbitrary average particle size can be appropriately selected according to the application, and in the present invention, in particular, it is preferable for the average particle size to be 0.01 µm to 10 µm, is more preferable to be 0.1 µm to 8 µm, and is further preferable to be 1 µm to 7 µm. Here, the average particle size is a value measured by a dynamic light scattering method.

If the average particle size is smaller than 0.01 µm, the odor adsorbent is apt to cause aggregation, and the dispersibility of the odor adsorbent in the low-elution polyethylene tends to decrease.

In addition, if the average particle size is larger than 10 µm, the odor adsorption layer is inferior in the film-forming properties, and accordingly tends to resist containing a large amount of odor adsorbents; and there occurs a possibility that a sufficient adsorption effect cannot be obtained.

Specific examples of commercially available products which can be used as suitable odor adsorbents in the present invention include: NS-241 and NS-231 (inorganic porous material carrying amino group-containing compound thereon) produced by Toagosei Co., Ltd.; and Dushlite M (inorganic porous material carrying amino group-containing compound thereon, produced by Sinanen Zeomic Co., Ltd.)

[Inorganic Porous Material]

In the present invention, an arbitrary inorganic compound that has a large number of pores on its surface can be used as the inorganic porous material, and the examples include zeolite, silicon dioxide, silicate, activated carbon, titania, inorganic phosphates such as calcium phosphate, alumina, aluminum hydroxide, magnesium hydroxide, and mixtures thereof.

In particular, it is preferable to apply aluminum hydroxide, zeolite and a silicate, from the viewpoint of having a porous state of which the pore size is effective for a molecular size or a cluster size of a substance to be adsorbed, and of a safety aspect.

In addition, an external shape of these inorganic compounds may be an arbitrary shape such as a spherical shape, a rod shape and an elliptical shape, and may be any form such as a powder form, a lump form and a granule form, but the powder form is preferable from the viewpoint of film-forming properties of the odor adsorption layer, uniform dispersion in a thermoplastic resin, kneading characteristics and the like, after the inorganic compound has become the odor adsorbent by carrying the chemical adsorbent thereon.

The inorganic porous material that has an arbitrary average particle size can be appropriately selected according to the application, and in the present invention, in particular, it is preferable for the average particle size to be 0.01 µm to 10 µm, is more preferable to be 0.1 µm to 8 µm, and is further preferable to be 1 µm to 7 µm.

If the average particle size is smaller than 0.01 µm, the odor adsorbent is apt to cause aggregation, and the dispersibility of the odor adsorbent in the thermoplastic resin tends to decrease; and in addition, if the average particle size is larger than 10 µm, the odor adsorption layer tends to become inferior in the film-forming properties, and accordingly tends to resist containing a large amount of odor adsorbents, and accordingly there occurs a possibility that a sufficient deodorizing effect cannot be obtained.

[Frictional Resistance Reducing Agent]

In the present invention, the frictional resistance reducing agent is formed of a slip agent and an anti-blocking agent.

(Slip Agent)

In the present invention, as the slip agent, a heretofore known slip agent can be used without particular limitation.

The examples of the slip agent include: fatty acid amides such as erucic acid amide, stearic acid amide, oleic acid amide, behenic acid amide, ethylene bis oleic acid amide and ethylene bis stearic acid amide; fatty acid esters such as glycerin fatty acid ester; hydrocarbon-based wax; higher fatty acid-based wax; metal soaps; hydrophilic silicone; acrylic grafted with silicone; an epoxy resin grafted with silicone; polyether grafted with silicone; polyester grafted with silicone; a block-type silicone acrylic copolymer; polyglycerol-modified silicone; and paraffin. These slip agents may be used singly or in combinations of two or more.

Furthermore, in order to increase the dispersibility of the slip agent in the polyethylene-based resin composition, it is preferable to melt-mix the slip agent with a thermoplastic resin such as a polyethylene resin at high concentration in advance, and to use the mixture as a masterbatch.

Among the above chemical compounds, it is more preferable to use one or two or more selected from the group consisting of erucic acid amide, stearic acid amide, oleic acid amide, a fatty acid ester, glyceric acid ester, hydrocarbon-based wax, higher fatty acid-based wax and metal soap, in combination with each other, and is further preferable to use erucic acid amide.

(Anti-Blocking Agent)

In the present invention, a heretofore known anti-blocking agent can be used for anti-blocking, without any particular limitation.

Examples thereof include synthetic zeolite, natural zeolite, talc, silica, diatomaceous earth, kaolin and PMMA; and one or two or more selected from the group consisting of those materials can be used.

Among the above materials, it is preferable to use a combination of the synthetic zeolite and the talc.

Furthermore, in order to increase the dispersibility of the anti-blocking agent in the polyethylene-based resin composition, it is preferable to melt-mix the anti-blocking agent with a thermoplastic resin such as a polyethylene resin at high concentration in advance, and to use the mixture as a masterbatch.

[Odor Adsorption Sealant Layer]

An odor adsorption sealant layer is a layer that contains at least the low-elution polyethylene and an odor adsorbent.

The odor adsorption sealant layer contains the low-elution polyethylene, and thereby, suppresses the elution of organic substances from the laminate, and the laminate can exhibit excellent heat sealability. The odor adsorption sealant layer contains the odor adsorbent, and thereby can suppress the migration of odorous substances from the laminate to liquid contents.

In the present invention, the odor adsorbent contains hydrophobic zeolite of which the molar ratio of $SiO_2/Al_2O_3$ is 30/1 to 10000/1, and/or an inorganic porous material carrying a chemical adsorbent thereon.

The content of the odor adsorbent in the odor adsorption sealant layer is preferably 0.3% by mass or more and 15% by mass or less, and is more preferably 1% by mass or more and 14% by mass or less.

When the content is less than the above range, the odor adsorption sealant layer resists exhibiting an effect of adsorbing odors, and when the content is more than the above range, there is a possibility that the film-forming properties deteriorate.

As the odor adsorbent, the above hydrophobic zeolite or the inorganic porous material carrying the chemical adsorbent thereon may be each used alone, or may be used in combination.

The content of the above hydrophobic zeolite in the odor adsorption sealant layer is preferably 0.3% by mass or more and 15% by mass or less, and is more preferably 0.5% by mass or more and 14% by mass or less.

Furthermore, the content of the inorganic porous material carrying the chemical adsorbent thereon in the odor adsorption sealant layer may be 0% by mass, but is preferably 0.1% by mass or more and 10% by mass or less, and is more preferably 0.2% by mass or more and 5% by mass or less.

When the above hydrophobic zeolite is used in combination with the inorganic porous material carrying the chemical adsorbent thereon, a synergetic effect can be obtained.

The odor adsorption sealant layer may contain arbitrary other additives in such a range as not to remarkably impair the effects of the present invention. The additives include various resin additives which are generally used for adjusting the formability and productivity of a film and a laminate, and adjusting various physical properties; and the examples thereof include a slip agent, an anti-blocking agent, an antioxidant, a pigment, a flow control material, a flame retardant, a filler, an ultraviolet absorber, and a surface active agent.

In the odor adsorption sealant layer, the odor adsorbent may be uniformly dispersed in the layer, or may be dispersed with a concentration gradient.

For example, the odor adsorbent may be dispersed with an increasing concentration gradient from the inner surface toward the outer surface, when the package is formed; and due to this structure, the heat sealability is enhanced. On the contrary, the odor adsorbent may be dispersed with a decreasing concentration gradient from the inner surface toward the outer surface, when the package is formed; and due to this structure, the interlayer adhesive strength is enhanced.

Furthermore, the odor adsorbent may be dispersed with a decreasing concentration gradient from the center to both surfaces in the thickness direction of the odor adsorption sealant layer; and due to this structure, the heat sealability and the interlayer adhesive strength are enhanced.

The thickness of the odor adsorption sealant layer is preferably 5 μm or larger and 300 μm or smaller, and is more preferably 10 μm or larger and 200 μm or smaller. In order to obtain the interlayer adhesive strength and deodorant properties, the thickness is preferably 10 μm or larger and 200 μm or smaller.

If the thickness is thinner than the above range, it is difficult to obtain a sufficient heat sealing strength, lamination strength and effect of adsorbing odors, and if the thickness is thicker than the above range, it becomes apt to be difficult to balance the heat sealability of the sealant layer and the rigidity thereof.

The odor adsorption sealant layer may be composed of one layer, or may have a multilayer structure composed of two or more layers; and in the case of the multilayer structure, each layer may have the same composition, or have different compositions from each other.

When the odor adsorption sealant layer has the multilayer structure, the odor adsorption sealant layer may be composed of the odor adsorption layer which contains the low-elution polyethylene and the odor adsorbent, and of a non-odor adsorption layer which contains the low-elution polyethylene but does not contain the odor adsorbent. In this case, it is preferable that the non-odor adsorption layer is laminated on one surface or both surfaces of the odor adsorption layer. When the non-odor adsorption layer is laminated on the outermost surface of the laminate, a good heat sealability can be obtained, and when the non-odor adsorption layer is laminated on the interface with a layer other than the odor adsorption sealant layer, a good interlayer adhesive strength (lamination strength) can be obtained.

The odor adsorption sealant layer may be formed by attaching a film which contains the low-elution polyethylene and the odor adsorbent to another layer via an adhesive agent; may be formed by laminating a resin composition containing the low-elution polyethylene and/or the odor adsorbent onto another layer, by (co)extrusion coating; or may be formed by coextrusion coating together with a low-friction sealant layer.

In the present invention, a method for forming the odor adsorption sealant layer or each layer in the odor adsorption sealant layer and laminating the layers is not particularly limited, and a heretofore known or commonly used film-forming method and laminating method can be applied.

For example, there is a method of laminating the odor adsorption sealant layer onto a surface to be laminated, by an extrusion coating method, occasionally via an adhesive layer.

In addition, there is a method of forming one or more layers which constitute the odor adsorption sealant layer, by (co)extrusion by an inflation method or a casting method; and in this case, the one or more layers may be coextruded together with the low-friction sealant layer.

Alternatively, it is also acceptable to prepare a sealant film for the odor adsorption sealant layer once, and laminate the sealant film onto the surface to be laminated via an adhesive layer, by an extrusion coating method, a dry laminating method, a non-solvent laminating method or the like, using the adhesive agent.

Here, it is acceptable to use any of a general-purpose adhesive agent and a low-elution polyethylene, as the adhesive agent.

When the sealant film is laminated by the extrusion coating method, first, the resin composition for forming the odor adsorption sealant layer is heated to be melted, is expanded and extended in a required width direction by a T-die, and is (co)extruded into a curtain shape; and the molten resin is allowed to flow down onto the surface to be laminated, and is sandwiched between a rubber roll and a cooled metal roll. Thereby, the odor adsorption sealant layer can be formed, be bonded to and be laminated on the surface to be laminated, at the same time.

[Odor Adsorbent (2)]

The odor adsorbent contains hydrophobic zeolite of which the molar ratio of $SiO_2/Al_2O_3$ is 30/1 to 10000/1, and/or an inorganic porous material carrying a chemical adsorbent thereon.

It is preferable that the odor adsorbent is melt-kneaded with a thermoplastic resin in advance, at a mass ratio of odor adsorbent/thermoplastic resin of 0.5/99.5 to 40/60. Thereby, the odor adsorbent is apt to obtain a better dispersion state in the odor adsorption sealant layer.

It is preferable that a melt flow rate (MFR) of the thermoplastic resin which is melt-mixed with the odor adsorbent is 0.2 to 10 g/10 minutes. When the MFR is in this range, the thermoplastic resin is easily melt-kneaded with the odor adsorbent, the odor adsorbent is apt to be dispersed in the odor adsorption sealant layer, and the film-forming properties of the odor adsorption sealant layer is also apt to be maintained.

(Method for Dispersing Odor Adsorbent in Thermoplastic Resin)

To a method for kneading the odor adsorbent and the thermoplastic resin, a heretofore known or commonly used kneading method can be applied.

It is also possible to mix and knead the odor adsorbent directly with the thermoplastic resin; or alternatively it is also possible to mix and knead the materials by so-called a masterbatch method which mixes the odor adsorbent with the thermoplastic resin at a high concentration, then melt-kneads (melt blending) the mixture to produce a masterbatch, and mixes and melt-kneads the masterbatch with the thermoplastic resin at a ratio according to a target content ratio.

Even when an odor adsorbent is used which is apt to cause aggregation, by the masterbatch method being employed, the odor adsorbent can be efficiently and uniformly dispersed in the odor adsorption sealant layer.

As the thermoplastic resin to be used in the masterbatch, the resin is preferable that has high compatibility with and has the same degree of heat sealability as the low-eluting polyethylene which is contained in the odor adsorption sealant layer; and examples thereof include, but are not limited to, general-purpose polyethylene, polypropylene, a methylpentene polymer, polyolefin-based resins such as acid-modified polyolefin-based resins, and mixtures of these resins; and various thermoplastic resins can be used in such a range as not to greatly give a detrimental effect on the heat sealability and film-forming properties of the whole odor adsorption sealant layer.

At this time, the thermoplastic resin in the masterbatch may be the same as or different from the thermoplastic resin in the odor adsorption sealant layer, and the type of the thermoplastic resin can be selected according to the purpose.

For example, when the low-elution polyethylene is selected, the odor adsorption sealant layer can efficiently obtain good film-forming properties, homogeneity, heat sealability, interlayer adhesive strength, and odor adsorption properties.

The content of the above hydrophobic zeolite in the masterbatch is preferably 0.5% by mass or more and 40% by mass or less, and is more preferably 1% by mass or more and 20% by mass or less.

The content of the inorganic porous material carrying the chemical adsorbent thereon in the masterbatch is preferably 0.5% by mass or more and 40% by mass or less, and is more preferably 1% by mass or more and 20% by mass or less.

[Chemical Adsorbent]

In the present invention, the chemical adsorbent is a chemical compound that has a reactive functional group which causes a chemical reaction with an eluting organic substance or an odorous substance that is generated by the decomposition of a resin or the like at the time of the sterilization/disinfection treatment, and can be carried on the above inorganic porous material.

More specifically, the chemical adsorbent is a chemical compound that has a functional group having such reactivity as to bond to various aldehydes, ketones and carboxylic acids which are generated at the time of the sterilization/disinfection treatment such as UV irradiation, γ-ray irradiation, EB irradiation, hot pack and boil.

Such chemical compounds include: chemical compounds that contain an amino group, for example, such as polyamines like an alkyl amine and tetramethylenediamine, ethanolamine and piperidine; chemical compounds that have a basic functional group such as a hydroxyl group; for example, hydroxides such as sodium hydroxide, potassium hydroxide, magnesium hydroxide and iron hydroxide; carbonates and hydrogen carbonates such as sodium carbonate, sodium hydrogen carbonate and calcium carbonate; and amide group-containing compounds such as 2-acrylamido-2-methylpropanesulfonic acid.

In the present invention, examples of the chemical adsorbent that exhibits a particularly excellent adsorption effect include, but are not limited to, chemical compounds having an amino group, for example, polyamine, for example, ethylenediamine, diethylenetriamine, triethylenetriamine, tetraethylenepentamine, piperazine and meta-phenylenediamine.

A mechanism through which the odor adsorbent adsorbs the substances to be adsorbed such as eluting organic substances and odorous substances will be described in more detail with reference to the specific examples of FIGS. 7(a) to (b), but the present invention is not limited to these.

For example, when the substance to be adsorbed is an acid-based odorous substance, as is shown in FIG. 4(a), an odor adsorbent can be used as the odor adsorbent, which is a chemical compound having a hydroxyl group carried on an inorganic porous material, for example. Thereby, the carboxyl group and the hydroxyl group cause a chemical reaction and bond to each other, and the substance to be adsorbed is adsorbed.

In addition, when the substance to be adsorbed is aldehydes, as is shown in FIG. 4(b), an odor adsorbent can be used as the odor adsorbent, which is a chemical compound having an amino group carried on an inorganic porous material, for example. Thereby, the aldehyde group and the amino group cause a chemical reaction and bond to each other, and the substance to be adsorbed is adsorbed.

The adsorption at this time is chemical adsorption. Thereby, the substance to be adsorbed which has been adsorbed once does not desorb, and odors can be efficiently adsorbed.

Furthermore, the chemical adsorbent of the present invention is different from physical adsorbents in which odor and water vapor are adsorbed on the same adsorption site, and the substance to be adsorbed bonds to a particular functional group of the chemical adsorbent; and accordingly resists being affected by various substances that lower the odor adsorption capability, for example, water vapor and the like.

In one embodiment of the present invention, the odor adsorption layer has a single-layer structure that is formed using a resin composition which has been obtained by kneading the odor adsorbent and the low-elution polyethylene. Here, the odor adsorbent may be uniformly dispersed in the layer, or may be dispersed with a concentration gradient.

For example, the odor adsorbent may be dispersed with an increasing concentration gradient from the inner surface toward the outer surface, when the package is formed; and due to this structure, the heat sealability is enhanced. On the contrary, the odor adsorbent may be dispersed with a decreasing concentration gradient from the inner surface toward the outer surface, when the package is formed; and due to this structure, the interlayer adhesive strength is enhanced.

Furthermore, the odor adsorbent may be dispersed with a decreasing concentration gradient from the center to both surfaces in the thickness direction of the odor adsorption layer; and due to this structure, the heat sealability and the interlayer adhesive strength are enhanced.

In another embodiment, the odor adsorption layer may have a multilayer structure in which two or more layers are laminated; and here, each layer may be composed of a resin composition in which the type of low-elution polyethylene that becomes the main constituent and the type and content of odor adsorbent are different from each other.

As long as a thickness of the whole odor adsorption layer is 5 μm or larger, the film can be formed, but the thickness is preferably 10 μm to 200 μm, in order to obtain good film-forming properties, heat sealability, interlayer adhesive strength and odor adsorption properties.

<Non-Odor Adsorption Layer>

The non-odor adsorption layer in the present invention is a layer which is composed of low-elution polyethylene or a resin composition containing the low-elution polyethylene (hereinafter, both are collectively referred to as "resin composition containing low-elution polyethylene" in some cases), and is a layer that does not contain the odor adsorbent.

Furthermore, the non-odor adsorption layer can include a general-purpose polyethylene, polypropylene, a methylpentene polymer, an acid-modified polyolefin-based resin, and a mixture of these thermoplastic resins, in such a range as not to impair the low-elution property and heat sealability of the sealant layer, but resins which can be contained are not limited to these resins.

<Substrate Layer>

In the present invention, various materials can be applied to the substrate layer, according to the type of contents to be packaged, and to the mechanical strength, chemical resistance, solvent resistance, manufacturability and the like which are required in physical distribution. It is preferable to use a thermoplastic resin.

Examples of the resin include various resins such as a polyethylene-based resin, a polypropylene-based resin, a cyclic polyolefin-based resin, a fluorine-based resin, a polystyrene-based resin, an acrylonitrile-styrene copolymer (AS resin), an acrylonitrile-butadiene-styrene copolymer (ABS resin), a polyvinyl chloride-based resin, an ethylene-vinyl alcohol copolymer, a poly(meth)acrylic resin, polyester resins such as a polycarbonate-based resin, polyethylene terephthalate (PET) and polyethylene naphthalate, various polyamide-based resins such as nylon, a polyimide-based resin, a polyamide-imide-based resin, a polyaryl phthalate-based resin, a silicone-based resin, a polysulfone-based resin, a polyphenylene sulfide-based resin, a polyether sulfone-based resin, a polyurethane-based resin, an acetal-based resin and a cellulose-based resin, and films that contain those resins can be used.

Among the films containing the above resins, in the present invention, preferable films for the substrate layer are an non-stretched nylon film, a stretched nylon film, a PET film, a straight-chain low-density polyethylene film and a low-density polyethylene film; and particularly preferable films are the straight-chain low-density polyethylene film and the low-density polyethylene film, which are a polyethylene-based resin film, and the non-stretched nylon film.

In addition, it is preferable to use the low-elution polyethylene resin for the polyethylene-based resin film.

It is preferable that the substrate layer contains a film which uses one or two or more resins selected from the above description, and may be composed of one layer, or be composed of two or more layers having the same composition or different compositions from each other.

In the present invention, the film can be used for the above substrate layer, which has been formed into a single layer or a multilayer using a film forming method such as an extrusion method, a cast molding method, a T-die method, a cutting method and an inflation method. In addition, the thickness of the substrate layer can be appropriately determined by those skilled in the art according to the packaging application, but is preferably 6 to 150 μm, and is more preferably 9 to 130 μm.

In addition, to the substrate layer in the laminate of the present invention, various modifier resins, plastic blending agents, additives and the like can be added, for the purpose of improving and modifying workability, heat resistance, weather resistance, mechanical properties, dimensional stability, antioxidant properties, slip properties, release properties, flame retardancy, anti-fungus properties, electric characteristics, a strength and the like of the laminate.

In this case, these additives may be arbitrarily contained in the substrate layer, from a trace amount to several tens % by mass, according to the purpose.

In the present invention, the substrate layer can arbitrarily contain a lubricant, a crosslinking agent, an antioxidant, an ultraviolet absorbent, a light stabilizer, a filler, an antistatic agent, an anti-blocking agent, a coloring agent such as dye and pigment, and the like, as general additives.

In addition, the substrate layer can have resin layers of various materials, in order to impart high elasticity and pinhole resistance. For example, the substrate layer can have layers of 6 nylon, 66 nylon, a 6/66 nylon copolymer, low-density polyethylene, an ethylene-vinyl alcohol copolymer; and particularly preferably has a layer of the 6/66 nylon copolymer.

<Formation of Odor Adsorption Layer and Non-Odor Adsorption Layer>

(Method for Dispersing Odor Adsorbent)

To a method for kneading the odor adsorbent and the low-elution polyethylene, a heretofore known or commonly used kneading method can be applied.

It is also possible to mix and knead the odor adsorbent directly with the low-elution polyethylene; or alternatively it is also possible to mix and knead the materials by so-called a masterbatch method which mixes the odor adsorbent with the thermoplastic resin at a high concentration, then melt-kneads the mixture to produce a masterbatch, and mixes and melt-kneads the masterbatch with the low-elution polyethylene at a ratio according to a target content ratio.

The mass ratio of odor adsorbent/thermoplastic resin in the masterbatch is preferably 0.5/99.5 to 40/60, and is more preferably 1/99 to 30/70.

In the case of the masterbatch method, even though an odor adsorbent which is apt to cause aggregation is combined with the low-elution polyethylene, the odor adsorbent can be uniformly dispersed.

In this case, the thermoplastic resin in the masterbatch does not need to be the same as the low-elution polyethylene in the odor adsorption layer, but can be combined with the same low-elution polyethylene and other types of thermoplastic resins according to the purpose.

For example, when the odor adsorbent is melt-mixed with the low-elution polyethylene in advance, when the mixture is mixed or melt-kneaded with the low-elution polyethylene again, the resultant mixture is homogeneous, and it is possible to obtain good film-forming properties, heat sealability, interlayer adhesive strength and odor adsorption properties.

Examples of thermoplastic resins other than the low-elution polyethylene in the odor adsorption layer include, but are not limited to, polyolefin-based resins such as general-purpose non-low-elution polyethylene, polypropylene, methylpentene polymer, acid-modified polyolefin-based resin, and mixtures of these resins.

As the thermoplastic resin, a thermoplastic resin is preferable which has a low-elution property equivalent to that of the low-elution polyethylene in the present invention, but a general-purpose thermoplastic resin can be used in such a range as not to greatly give a detrimental effect on the amount of the organic substances to be eluted from the whole sealant layer.

(Film Forming/Laminating Method)

In the present invention, the methods for forming each layer of the sealant layer and the substrate layer and laminating the layers are not particularly limited, and a heretofore known or commonly used film-forming method and laminating method can be applied.

It is possible to laminate the odor adsorption layer or the non-odor adsorption layer on another layer, by extrusion coating occasionally via an adhesive layer, or it is also possible to form, for example, a plurality of odor adsorption layers and non-odor adsorption layers by (co)extruding the layers by an inflation method or a casting method.

In the case of the lamination by the extrusion coating, first, a resin composition for forming the odor adsorption layer and a resin composition for forming the non-odor adsorption layer are heated and melted; and the melt is expanded and extended in a required width direction with a T-die and is extruded into a curtain shape; the molten resin is allowed to flow down onto the surface to be laminated, and is sandwiched by a rubber roll and a cooled metal roll; and thereby, the odor adsorption layer and the non-odor adsorption layer are formed, bonded to and laminated to the surface to be laminated, at the same time.

When layers are laminated by the extrusion coating, the melt flow rates (MFR) of the low-elution polyethylene contained in the odor adsorption layer and the thermoplastic resin contained in the non-odor adsorption layer are preferably 0.2 to 50 g/10 minutes, and are more preferably 0.5 to 30 g/10 minutes. For information, in the present specification, the MFR is a value measured by a method based on JIS K7210.

If the MFR is smaller than 0.2 g/min, or 50 g/min or larger, the low-elution polyethylene and the thermoplastic resin resist being effective in terms of processing suitability.

When the inflation method is used, the melt flow rates (MFR) of the low-elution polyethylene contained in the odor adsorption layer and the thermoplastic resin contained in the non-odor adsorption layer are preferably 0.2 to 10.0 g/10 minutes, and are more preferably 0.2 to 9.5 g/10 minutes.

If the MFR is smaller than 0.2 g/10 minutes, or 10.0 g/10 minutes or larger, the low-elution polyethylene and the thermoplastic resin tend to be inferior in terms of the processing suitability.

Alternatively, it is acceptable to laminate a previously film-formed odor adsorption layer and a non-odor adsorption layer via an adhesive layer, by dry lamination, non-solvent lamination, sand lamination or the like.

<Formation of Low-Elution Polyethylene-Containing Layer and Non-Low-Elution Polyethylene-Containing Layer>

(Film Forming/Laminating Method)

In the present invention, the methods for forming each layer of the sealant layer and the substrate layer and laminating the layers are not particularly limited, and a heretofore known or commonly used film-forming method and laminating method can be applied.

It is possible to laminate the low-elution polyethylene-containing layer or the non-low-elution polyethylene-containing layer on another layer, by extrusion coating occasionally via an adhesive layer, or it is also possible to form, for example, a plurality of low-elution polyethylene-containing layers and non-low-elution polyethylene-containing layers by (co)extruding the layers by an inflation method or a casting method.

In the case of the lamination by the extrusion coating, first, a resin composition for forming the low-elution polyethylene-containing layer and a resin composition for forming the non-low-elution polyethylene-containing layer are heated and melted; and the melt is expanded and extended in a required width direction with a T-die and is extruded into a curtain shape; the molten resin is allowed to flow down onto the surface to be laminated, and is sandwiched by a rubber roll and a cooled metal roll; and thereby, the low-elution polyethylene-containing layer and the non-low-elution polyethylene-containing layer are formed, bonded to and laminated to the surface to be laminated, at the same time.

When layers are laminated by the extrusion coating, the melt flow rates (MFR) of the low-elution polyethylene contained in the low-elution polyethylene-containing layer and the thermoplastic resin contained in the non-low-elution polyethylene-containing layer are preferably 0.2 to 50 g/10 minutes, and are more preferably 0.5 to 30 g/10 minutes. For information, in the present specification, the MFR is a value measured by a method based on JIS K7210.

If the MFR is smaller than 0.2 g/min, or 50 g/min or larger, the low-elution polyethylene and the thermoplastic resin resist being effective in terms of processing suitability.

When the inflation method is used, the melt flow rates (MFR) of the low-elution polyethylene contained in the low-elution polyethylene-containing layer and the thermoplastic resin contained in the non-low-elution polyethylene-containing layer are preferably 0.2 to 10.0 g/10 minutes, and are more preferably 0.2 to 9.5 g/10 minutes.

If the MFR is smaller than 0.2 g/10 minutes, or 10.0 g/10 minutes or larger, the low-elution polyethylene and the thermoplastic resin tend to be inferior in terms of processing suitability.

Alternatively, it is acceptable to laminate a previously film-formed low-elution polyethylene-containing layer and a non-low-elution polyethylene-containing layer via an adhesive layer, by dry lamination, non-solvent lamination, sand lamination or the like.

[Intermediate Layer]

In the present invention, the intermediate layer formed of a resin film is a layer which is included in the laminate as needed.

Various resin films can be applied to the resin film, according to the type of contents to be packaged, and to the mechanical strength, chemical resistance, solvent resistance, manufacturability and the like which are required in physical distribution.

The resin film may be non-stretched, uniaxially stretched, or biaxially stretched.

Examples of the resin include, but are not limited to, various resins are included such as a polyethylene-based resin, a polypropylene-based resin, a cyclic polyolefin-based resin, a fluorine-based resin, a polystyrene-based resin, an acrylonitrile-styrene copolymer (AS resin), an acrylonitrile-butadiene-styrene copolymer (ABS resin), a polyvinyl chloride-based resin, an ethylene-vinyl alcohol copolymer, a poly(meth)acrylic resin, polyester resins such as a polycarbonate-based resin, polyethylene terephthalate (PET) and polyethylene naphthalate, various polyamide-based resins such as nylon, a polyimide-based resin, a polyamide-imide-based resin, a polyaryl phthalate-based resin, a silicone-based resin, a polysulfone-based resin, a polyphenylene sulfide-based resin, a polyether sulfone-based resin, a polyurethane-based resin, an acetal-based resin and a cellulose-based resin.

Among the above resins, the polyamide-based resins such as various nylons are preferable, and a polyamide 6/66 copolymer is more preferable.

Here, the polyamide 6/66 copolymer may be a polymer that is obtained by mixing and copolymerizing a monomer which becomes a raw material of polyamide 6 with a monomer which becomes a raw material of polyamide 66; and may be a polymer that is obtained by polymerizing an oligomer of polyamide 6 with an oligomer of polyamide 66.

In addition, to the above resins, various modifier resins, plastic blending agents, additives and the like such as a lubricant, a crosslinking agent, an antioxidant, an ultraviolet absorbent, a light stabilizer, a filler, an antistatic agent, a lubricant, an anti-blocking agent, a coloring agent such as dye and pigment can be added, for the purpose of improving and modifying workability, heat resistance, weather resistance, mechanical properties, dimensional stability, antioxidant properties, slip properties, release properties, flame retardancy, anti-fungus properties, electric characteristics, a strength and the like.

In this case, these additives may be arbitrarily contained in the resin, from a trace amount to several tens % by mass, according to the purpose.

The intermediate layer contains a film which uses one or two or more resins selected from the above description, and may be composed of one layer, or be composed of two or more layers having the same composition or different compositions from each other.

In the present invention, the film can be used for the intermediate layer, which has been formed into a single layer or a multilayer using a film forming method such as an extrusion method, a cast molding method, a T-die method, a cutting method and an inflation method.

The thickness of the intermediate layer can be appropriately determined by those skilled in the art according to the packaging application, but is preferably 6 to 150 μm, and is more preferably 9 to 130 μm.

<Adhesive Layer>

In the present invention, it is also possible to provide an adhesive layer between the sealant layer and the substrate layer, and between each layer of the sealant films, and thereby to laminate the layers to each other.

The adhesive layer may be formed from an adhesive agent or an arbitrary anchor coating agent.

The adhesive agent may be of a thermosetting type, an ultraviolet curing type, an electron beam curing type or the like, and may have any form such as an aqueous type, a solution type, an emulsion type and a dispersion type; its properties may be any form such as a film/sheet form, a powder form and a solid form; and the adhesive mechanism may be any form of a chemical reaction type, a solvent volatilization type, a hot-melt type, a hot-pressure type and the like.

In addition, the adhesive layer may be an EC (extrusion coat) layer, or a layer which is formed of an adhesive agent for dry lamination, an adhesive agent for non-solvent lamination or the like.

Components that form such adhesive layers include: polyvinyl acetate-based adhesive agents such as polyvinyl acetate and a vinyl acetate-ethylene copolymer; polyacrylic acid-based adhesive agents including copolymers of polyacrylic acid with polystyrene, polyester, polyvinyl acetate or the like; cyanoacrylate-based adhesive agents; ethylene copolymer-based adhesive agents including copolymers of ethylene with monomers such as vinyl acetate, ethyl acrylate, acrylic acid and methacrylic acid; cellulose-based adhesive agents; polyurethane-based adhesive agents; polyester-based adhesive agents; polyamide-based adhesive agents; polyimide-based adhesive agents; polyolefin-based adhesive agents such as LDPE; amino resin-based adhesive agents including an urea resin or a melamine resin; phenolic resin-based adhesive agents; epoxy-based adhesive agents; reactive (meth)acrylic adhesive agents; elastomer-based adhesive agents including a chloroprene rubber, a nitrile rubber and a styrene-butadiene rubber; and inorganic adhesive agents including a silicone-based adhesive agent, an alkali metal silicate and a low-melting glass.

As the anchor coating agent, anchor coating agents, for example, of an organic titanium-base, an isocyanate-base, a polyethyleneimine-base, an acid-modified polyethylene-base, a polybutadiene-base or the like can be used.

A method for laminating the adhesive layer by the extrusion coating is not particularly limited, and the layer to be bonded is extrusion-coated with an adhesive agent, and thereby the adhesive layer can be formed.

In the extrusion coating, first, the adhesive agent is heated to be melted, is expanded and extended in a required width direction by a T-die, and is extruded into a curtain shape; and the melt is allowed to flow down onto the layer to be bonded, and is sandwiched between a rubber roll and a cooled metal roll. Thereby, the adhesive layer is formed, is bonded to and is laminated on the layer to be bonded, at the same time.

When the adhesive agent for dry lamination is used for the adhesive layer, an adhesive agent which has been dispersed or dissolved in a solvent is applied onto one layer, and is dried; the other layer to be bonded is overlapped thereon and is laminated thereon; then, the laminate is aged at 30 to 120° C. for several hours to several days; and thereby the adhesive agent is cured and laminated.

When an adhesive agent for the non-solvent lamination is used, an adhesive agent itself is applied onto one layer, without being dispersed or dissolved in a solvent, and is dried; the other layer to be bonded is overlapped thereon and is laminated; then, the laminate is aged at 30 to 120° C. for several hours to several days; and thereby the adhesive agent is cured and laminated.

The adhesive layer is formed by the application of the above adhesive agent, for example, by a roll coating, a gravure roll coating, a kiss coating or the like; and the coating mass is desirably approximately 0.1 to 10 g/m² (dry state). By the coating mass of the adhesive agent being controlled in the above range, a good adhesiveness can be obtained.

When the sealant layers are laminated on each other by sand lamination, an arbitrary resin can be used for the adhesive layer, which can be applied by an extruder after having been heated and melted. Specifically, the thermoplastic resin to be used for the above non-odor adsorption layer can be preferably used.

<Packaging Material>

A packaging material for packaging liquid contents of the present invention is formed of a sealant film for packaging liquid contents of the present invention and a laminate including the same, may be formed of only a substrate layer and a sealant layer, or can also have a functional material layer, an adhesive layer and the like, as needed. The functional layer, the adhesive agent layer and the like can be used by being laminated on a heretofore known material by a heretofore known method.

<Package>

A package for liquid contents of the present invention is obtained, for example, by forming a packaging material for packaging liquid contents of the present invention, into a bag; and can be produced by folding the packaging material or overlapping two sheets thereof so that the surfaces having a good heat sealability face each other; and heat-sealing the peripheral edge thereof into a heat seal form, for example, such as a side seal type, a two-side seal type, a three-side seal type, a four-side seal type, an envelope seal type, a gas seal sticking type (pillow seal type), a pleated sealing type, a flat bottom sealing type, a square bottom sealing type and a gusset type.

To the heat sealing method, heretofore known methods can be applied, for example, such as a bar seal, a rotating roll seal, a belt seal, an impulse seal, a high-frequency seal and an ultrasonic seal.

<Liquid Contents>

In the present invention, the liquid contents refer to general liquids including: drinking water; juices; an infusion solution for intravenous feeding; seasoning liquids such as soy sauce and sauce; and soup, honey, gravy and dressing.

EXAMPLES

Sealant Film for Packaging Liquid Contents, in Embodiment 1

The details of the raw materials used in Examples are as follows.

[Low-Elution Polyethylene and High-Elution Polyethylene]

TABLE 1

| | | Polyethylene | | | |
|---|---|---|---|---|---|
| Elution property | Polyethylene of raw material of film | Supplier | Type of resin | Density [g/cm$^3$] | MFR [g/10 minutes] |
| Low elution | Ultzex 1520L | Prime Polymer Co., Ltd. | C6-LLDPE | 0.916 | 2.3 |
| | Ultzex 2021L | Prime Polymer Co., Ltd. | C6-LLDPE | 0.920 | 2.0 |
| | Ultzex 3500ZA | Prime Polymer Co,, Ltd. | C6-LLDPE | 0.919 | 2.1 |
| | Kernel KF271 | Mitsubishi Chemical Corporation | Ethylene/α-olefin copolymerization | 0.913 | 2.4 |
| | Kernel KF283 | Mitsubishi Chemical Corporation | Ethylene/α-olefin copolymerization | 0.921 | 2.5 |
| | Umerit 125NF | Ube-Maruzen Polyethylene Co., Ltd. | C6, C8-LLDPE | 0.924 | 2.2 |
| | Ultzex 3520L | Prime Polymer Co., Ltd. | C6-LLDPE | 0.931 | 2.1 |
| | Neo-Zex 3510F | Prime Polymer Co., Ltd. | C4-LLDPE | 0.933 | 1.6 |
| High elution | Evolue SP2020 | Prime Polymer Co., Ltd. | C6-LLDPE | 0.916 | 2.1 |

Example 1

A single-layer sealant film having a thickness of 50 μm was obtained by inflation film formation at a film-forming temperature of 160° C., using Ultzex 1520L shown in Table 1.

Next, pinhole resistance, increment of the TOC concentration and change in odor and taste due to the sealant film were evaluated. The evaluation results are shown in Table 2.

Examples 2 to 8, and Comparative Example 1

Polyethylenes described in Table 1 were selected and used, and films were formed in the same manner as in Example 1; and thereby single-layer sealant films each having a thickness of 50 μm were obtained, and were evaluated, in the same manner.

Example 9

A sealant film was obtained which had a three-layer structure having non-odor adsorption layer of 3 μm/odor adsorption layer of 44 μm/non-odor adsorption layer of 3 μm, by using Evolue SP2020 and Ultzex 3500ZA described in Table 1, and laminating each layer by inflation film formation at a film-forming temperature of 160° C.

Next, the sealant film was evaluated in the same manner as that in Example 1. The structure of the laminate and the evaluation results are shown in Table 2.

<Evaluation>

[Film-Forming Property]

The appearance of the sealant film was observed and was organoleptically evaluated. The evaluation criteria are as follows.

Good: A film could be formed without the occurrence of a crease and/or a rash on the film.

Poor: Many creases and rashes were formed on the film, and film formation was difficult.

[Heat Sealability]

Each of the sealant films that were produced in Examples and Comparative Example and the PET film were laminated on each other by EC (extrusion coating) of a material for an adhesive layer under the following conditions to obtain a film-shaped laminate. This film laminate was cut into 10 cm×10 cm, and the cut laminate was folded in half and overlaid. A region of 1 cm×10 cm was heat-sealed using Heat Seal Tester (manufactured by Tester Sangyo Co., Ltd.: TP-701-A), and a sample was produced that was in a state in which the edges were not bonded to each other without being heat-sealed, and were bifurcated.

This sample was cut into a strip having a width of 15 mm, and each of bifurcated edges was attached to a tensile tester, the tensile strength (N/15 mm) was measured, and the passes and fails were determined.

(Outline of Layer Structure of Laminate)

PET film (12 μm)/EC layer (15 μm)/sealant layer (50 μm)

(Lamination Condition)

Extrusion temperature: 330° C.

Material for adhesive layer: LDPE (Novatec LC520)

Thickness of adhesive layer: 15 μm (Heat-Sealing Condition)

Temperature: 160° C.

Pressure: 1 kgf/cm$^2$

Time period: 1 second (Condition of Tensile Strength Test)

Test speed: 300 mm/min

Load range: 50N (Criteria of Passes and Fails Determination)

Good: 30 N/15 mm or higher, and pass

Poor: Lower than 30 N/15 mm, and failure

[Increment of TOC Concentration]

A pouch bag (15 cm×44 cm) was produced using each of the sealant films obtained in Examples and Comparative Example, and the sealant film was previously subjected to the sterilization treatment by UV irradiation.

Then, 1000 g of water at 65° C. (distilled water for high performance liquid chromatography, Junsei Chemical Co., Ltd.) was hot-packed into each of the obtained packages to produce a liquid-filled package. The liquid-filled package was stored at 35° C. for 2 weeks, and then the concentration of TOC in the filling water was measured with a TOC-L total organic carbon meter manufactured by Shimadzu Corporation.

Next, the TOC concentration of water before filling was also measured in the same manner.

The increment of the TOC concentration in each package was determined from the following expression.

increment of TOC concentration=TOC concentration of filling water after storage−TOC concentration of water before filling TOC concentration of water before filling: 0.02 ppm
Conditions of sterilization treatment by UV irradiation
UV wavelength: 253.7 nm
Irradiation time period: 10 seconds
Temperature: 25° C.

Into the obtained pouch bag, 100 g of water (produced by Suntory Holdings Limited, Natural Water in Japan) heated to 65° C. was hot-packed to produce a liquid-filled package. After that, the liquid-filled package was stored at 10° C. for one week, and then was subjected to organoleptic evaluation.

The evaluation indices are as follows. The number of participants in the organoleptic evaluation experiment was five; and the average value was calculated and was determined to be the evaluation result.

1: Odor and taste are strong.
2: Odor and taste are somewhat reduced.
3: Odor and taste are greatly reduced.
4: Being equivalent to water before filling.

TABLE 2

|  |  |  | Unit | Example | | | | | | | | | Comparative Example |
|---|---|---|---|---|---|---|---|---|---|---|---|---|---|
|  |  |  |  | 1 | 2 | 3 | 4 | 5 | 6 | 7 | 8 | 9 | 1 |
| Sealant film structure | Non-low-elution polyethylene content | Evolue SP2020 | μm |  |  |  |  |  |  |  |  | 3 | 50 |
|  | Low-elution polyethylene content | Ultzex 1520L | μm | 50 |  |  |  |  |  |  |  |  |  |
|  |  | Ultzex 2021L | μm |  | 50 |  |  |  |  |  |  |  |  |
|  |  | Ultzex 3500ZA | μm |  |  | 50 |  |  |  |  |  | 44 |  |
|  |  | Kernel KF271 | μm |  |  |  | 50 |  |  |  |  |  |  |
|  |  | Kernel KF283 | μm |  |  |  |  | 50 |  |  |  |  |  |
|  |  | Umerit 125NF | μm |  |  |  |  |  | 50 |  |  |  |  |
|  |  | Ultzex 3520L | μm |  |  |  |  |  |  | 50 |  |  |  |
|  |  | Neo-Zex 3510F | μm |  |  |  |  |  |  |  | 50 |  |  |
|  | Non-low-elution polyethylene content | Evolue SP2020 | μm |  |  |  |  |  |  |  |  | 3 |  |
| Evaluation results | Film-forming properties |  | — | ○ | ○ | ○ | ○ | ○ | ○ | ○ | ○ | ○ | ○ |
|  | Sealing strength |  | — | ○ | ○ | ○ | ○ | ○ | ○ | ○ | ○ | ○ | ○ |
|  | Pinhole resistance |  | Holes | 5 | 23 | 18 | 14 | 26 | 52 | 125 | 134 | 20 | 22 |
|  | Increment of TOC concentration of filling |  | ppm | 0.68 | 0.47 | 0.29 | 0.72 | 0.66 | 0.55 | 0.31 | 0.38 | 0.65 | 2.36 |
|  | Change in odor and taste |  | — | 3 | 3 | 3.5 | 3 | 3 | 3 | 3.5 | 3.5 | 3 | 1 |

[Pinhole Resistance]

The sealant films produced in Examples and Comparative Example were cut into A4 size (30 cm×21 cm), the cut sealant film was flexed with Gelvo type Flex-Cracking Tester (BE-1005, manufactured by Tester Sangyo Co., Ltd.), and then the number of generated pinholes in a plane of 30 cm×21 cm of each sample was counted.

Temperature: 23° C.
Number of flexings by Gelbo: 5000 times

[Change in Odor and Taste]

A pouch bag (13 cm×17 cm) was produced using each of the sealant films obtained in Examples and Comparative Example. The sealant film was previously subjected to sterilization treatment by UV irradiation. The conditions of the sterilization treatment by UV irradiation are as follows.

Conditions of Sterilization Treatment by UV Irradiation
UV wavelength: 253.7 nm
Irradiation time period: 10 seconds
Temperature: 25° C.

<Summary of Results>

The packages of all Examples which used the low-elution polyethylene showed good film-forming properties, sealing strength, also a small increment of the TOC concentration, and a good change in odor and taste.

Furthermore, Examples 1 to 6 and 9 showed higher pinhole resistance than Examples 7 and 8.

Comparative Example 1 which did not contain the low-elution polyethylene showed good film-forming properties and sealing strength, but showed a large increment of the TOC concentration and a strong change in odor and taste.

Sealant Film for Packaging Liquid Contents, in Embodiment 2

The details of the raw materials used in Examples are as follows.

[Low-Elution Polyethylene and High-Elution Polyethylene]

TABLE 3

| | | | | Polyethane | | | |
|---|---|---|---|---|---|---|---|
| Elution property | Polyethylene used as film material | Supplier | Type of resin | Density [g/cm³] | MFR [g/10 minutes] | Concentration of eluting TOC in film [ppm] | Pinhole resistance [holes] |
| Low elution | Ultzex 1520L | Prime Polymer Co., Ltd. | C6-LLDPE | 0.916 | 2.3 | 96 | 6.5 |
|  | Ultzex 2021L | Prime Polymer Co., Ltd. | C6-LLDPE | 0.920 | 2.0 | 64 | 24.5 |
|  | Ultzex 3500ZA | Prime Polymer Co., Ltd. | C6-LLDPE | 0.919 | 2.1 | 43 | 17.0 |

TABLE 3-continued

| | | | Polyethane | | | | |
|---|---|---|---|---|---|---|---|
| Elution property | Polyethylene used as film material | Supplier | Type of resin | Density [g/cm$^3$] | MFR [g/10 minutes] | Concentration of eluting TOC in film [ppm] | Pinhole resistance [holes] |
| | Kernel KF271 | Mitsubishi Chemical Corporation | Ethylene/α-olefin copolymerization | 0.913 | 2.4 | 96 | 13.0 |
| | Kernel KF283 | Mitsubishi Chemical Corporation | Ethylene/α-olefin copolymerization | 0.921 | 2.5 | 99 | 29.0 |
| | Umerit 125NF | Ube-Maruzen Polyethylene Co., Ltd. | C6, C8-LLDPE | 0.924 | 2.2 | 92 | 59.0 |
| | Ultzex 3520L | Prime Polymer Co., Ltd. | C6-LLDPE | 0.931 | 2.1 | 42 | 132 |
| | Neo-Zex 3510F | Prime Polymer Co., Ltd. | C4-LLDPE | 0.933 | 1.6 | 52 | 150 |
| High elution | Evolue SP2020 | Prime Polymer Co., Ltd. | C6-LLDPE | 0.916 | 2.1 | 263 | 17.5 |

[Odor Adsorbent]

/Kesmon NS-241: inorganic porous material carrying amino group-containing compound thereon, produced by Toagosei Co., Ltd. Average particle size of 3.5 µm.

/Dushlite M: inorganic porous material carrying amino group-containing compound thereon, produced by Sinanen Zeomic Co., Ltd. Average particle size of 6 to 7 µm.

The masterbatch was produced by adjustment in the following way.

[Adjustment of Masterbatch 1]

Ultzex 1520L which is LLDPE of the low-elution polyethylene and Kesmon NS-241 which is an odor adsorbent were melt-blended at the following ratio, and a masterbatch 1 (MB1) was obtained.

| Ultzex 1520L | 90 parts by mass |
|---|---|
| Kesmon NS-241 | 10 parts by mass |

[Adjustment of Masterbatch 2]

Novatec LC600A (produced by Japan Polyethylene Corporation, MFR=7.0 g/10 minutes) which is a general-purpose non-low-elution polyethylene LDPE, and Kesmon NS-241 which is an odor adsorbent were melt-blended at the following ratio, and a masterbatch 2 (MB2) was obtained.

| Novatec LC600A | 90 parts by mass |
|---|---|
| Dash light M | 10 parts by mass |

[Adjustment of Masterbatch 3]

Novatec LC600A and Dushlite M which is an odor adsorbent were melt-blended at the following ratio, and a masterbatch 3 (MB3) was obtained.

| Novatec LC600A | 90 parts by mass |
|---|---|
| Kesmon NS-241 | 10 parts by mass |

Example 1

The masterbatch 1 obtained in the above description and Ultzex 1520L were dry-blended at the following ratio, and a mixture A for an odor adsorption layer was obtained.

| Masterbatch 1 | 16.7 parts by mass |
|---|---|
| Ultzex 1520L | 83.3 parts by mass |

Then, a sealant film was obtained which had a three-layer structure having non-odor adsorption layer of 10 µm/odor adsorption layer of 30 µm/non-odor adsorption layer of 10 µm, by using the mixture A obtained in the above description and Ultzex 1520L for the non-odor adsorption layer, and laminating each layer by inflation film formation at 160° C.

Next, film-forming properties, an adsorption effect, heat sealability and pinhole resistance were evaluated.

The structure of the laminate and the evaluation results are shown in Table 4.

Example 2

The masterbatch 2 obtained in the above description and Ultzex 1520L for the non-odor adsorption layer were dry-blended at the following ratio, and a mixture B for an odor adsorption layer was obtained.

| Masterbatch 2 | 16.7 parts by mass |
|---|---|
| Ultzex 15201L | 83.3 parts by mass |

Then, a sealant film was obtained which had a three-layer structure having non-odor adsorption layer of 10 µm/odor adsorption layer of 30 µm/non-odor adsorption layer of 10 µm, by laminating the mixture B obtained in the above description and Ultzex 1520L on each other by inflation film formation at 160° C.

Next, the sealant film was evaluated in the same manner as that in Example 1. The structure of the laminate and the evaluation results are shown in Table 4.

Examples 3 to 8, 10 and 11 and Comparative Example 2

Sealant films were obtained by changing the Ultzex 1520L to various polyethylenes according to the composition shown in Table 4, and by operating in the same manner as that in Example 2, and were evaluated in the same manner.

Example 9

The masterbatch 3 obtained in the above description and Ultzex 1520L were dry-blended at the following ratio, and a mixture C for an odor adsorption layer was obtained.

| | |
|---|---|
| Masterbatch 3 | 16.7 parts by mass |
| Ultzex 1520L | 83.3 parts by mass |

Then, a sealant film was obtained which had a three-layer structure having non-odor adsorption layer of 10 μm/odor adsorption layer of 30 μm/non-odor adsorption layer of 10 μm, by laminating the mixture C obtained in the above description and Ultzex 1520L for the non-odor adsorption layer on each other by inflation film formation at 160° C.

Next, the sealant film was evaluated in the same manner as that in Example 1. The structure of the laminate and the evaluation results are shown in Table 4.

Comparative Example 1

A sealant film (50 μm) was obtained using Evolue SP2020 of LLDPE which is not the low-elution polyethylene, by inflation film formation at 160° C.

Next, the sealant film was evaluated in the same manner as that in Example 1.
The structure of the laminate and the evaluation results are shown in Table 4.
<Evaluation>
[Film-Forming Property]
The appearance of the sealant film was observed and was organoleptically evaluated. The evaluation criteria are as follows.
   Good: A film could be formed without the occurrence of a crease and/or a rash on the film.
   Poor: Many creases and rashes were formed on the film, and film formation was difficult.
[Heat Sealability]
Each of the sealant films that were produced in Examples and Comparative Examples and the PET film were laminated on each other by EC (extrusion coating) of a material for an adhesive layer under the following conditions to obtain a film-shaped laminate. This film laminate was cut into 10 cm×10 cm, and the cut laminate was folded in half and overlaid. A sample was produced in which a region of 1 cm×10 cm was heat-sealed using Heat Seal Tester (manufactured by Tester Sangyo Co., Ltd.: TP-701-A) (in a state in which the edges were not bonded to each other without being heat-sealed, and were bifurcated).

This sample was cut into a strip having a width of 15 mm, and each of bifurcated edges was attached to a tensile tester, the tensile strength (N/15 mm) was measured, and the passes and fails were determined.

(Outline of Layer Structure of Laminate)
PET film (12 μm)/EC layer (15 μm)/sealant layer (50 μm)
(Lamination Condition)
Extrusion temperature: 330° C.
Material for adhesive layer: LDPE (Novatec LC520)
Thickness of adhesive layer: 15 μm
Heat-Sealing Conditions
Temperature: 160° C.
Pressure: 1 kgf/cm$^2$
Time period: 1 second
Conditions of Tensile Strength Test
Test speed: 300 mm/min
Load range: 50N
Determination of Passes and Fails
Good: 30 N/15 mm or higher, and pass
Poor: Lower than 30 N/15 mm, and failure
[Adsorption Effect]
Two packages of pouch bags (15 cm×44 cm) were produced using each of the sealant films obtained in Examples and Comparative Examples, and one of the packages was previously subjected to sterilization treatment by UV irradiation.

Then, 1000 g of water at 65° C. (distilled water for high performance liquid chromatography, Junsei Chemical Co., Ltd.) was packed into each of the obtained packages to produce a liquid-filled package. The liquid-filled package was stored at 35° C. for 2 weeks, and then the concentration of TOC in the filling water was measured with a TOC-L total organic carbon meter manufactured by Shimadzu Corporation.

Next, the TOC concentration of water before filling was also measured in the same manner.

The increment of the TOC concentration in each package was determined from the following expression.

Increment of TOC concentration=TOC concentration of filling water after storage−TOC concentration of water before filling TOC concentration of water before filling: 0.02 ppm
Conditions of sterilization treatment by UV irradiation
UV wavelength: 253.7 nm
Irradiation time period: 10 seconds
Temperature: 25° C.
[Pinhole Resistance]
The sealant films produced in Examples and Comparative Examples were cut into A4 size (30 cm×21 cm), the cut sealant film was flexed with Gelvo type Flex-Cracking Tester (BE-1005, manufactured by Tester Sangyo Co., Ltd.), and then the number of generated pinholes in a plane of 30 cm×21 cm of each sample was counted.
Temperature: 23° C.
Number of flexings by Gelbo: 5000 times

TABLE 4

| | | Unit | Example 1 | 2 | 3 | 4 | 5 | 6 | 7 | 8 | 9 | 10 | 11 | 12 | Comparative Example 1 | 2 |
|---|---|---|---|---|---|---|---|---|---|---|---|---|---|---|---|---|
| Film structure | Masterbatch Name | — | MB1 | MB2 | MB2 | MB2 | MB2 | MB2 | MB2 | MB2 | MB2 | MB3 | MB2 | MB2 | | MB2 |
| Each layer component | Odor adsorption layer | Polyethylene Ultzex1520L | Parts by mass | 90 | 90 | 90 | 90 | 90 | 90 | 90 | 50 | 50 | 50 | 90 | 90 | | 90 |
| | | NovatecLC500A | Parts by mass | | | | | | | | | | | | | | |
| | Odor adsorbent KesimonN524 | Parts by mass | 10 | 10 | 10 | 10 | 10 | 10 | 10 | 10 | 10 | 10 | 10 | 10 | | 10 |
| | | DushliteM | Parts by mass | | | | | | | | | | | | | | |
| | Masterbatch | Parts by mass | 16.7 | 16.7 | 16.7 | 16.7 | 16.7 | 16.7 | 16.7 | 16.7 | 16.7 | 16.7 | 6.35 | 83.5 | | 16.7 |
| | Polyethylene Ultzex1520L | Parts by mass | 83.3 | 83.3 | | | | | | | | | | | | |
| | Ultzex2021L | Parts by mass | | | 83.3 | | | | | | | | | | | |
| | Ultzex3500ZA | Parts by mass | | | | 83.3 | | | | | | | | | | |
| | KernelKF271 | Parts by mass | | | | | 83.3 | | | | | | | | | |
| | KernelKF283 | Parts by mass | | | | | | 83.3 | | | | | | | | |
| | Umerit125NF | Parts by mass | | | | | | | 83.3 | | | | | | | |
| | Ultzex3520L | Parts by mass | | | | | | | | 83.3 | | | | | | |
| | Non-Zex3510F | Parts by mass | | | | | | | | | 83.3 | | | | | 83.3 |
| | EvolueSP2020 | Parts by mass | | | | | | | | | | | | | | |
| | Non-odor adsorption layer | Polyethylene Ultzex1520L | Parts by mass | 100 | | | | | | | | | | | 100 | 100 | |
| | | Ultzex2021L | Parts by mass | | 100 | | | | | | | | | 100 | | | |
| | | Ultzex3500ZA | Parts by mass | | | 100 | | | | | | | | | | | |
| | | KernelKF271 | Parts by mass | | | | 100 | | | | | | | | | | |
| | | KernelKF283 | Parts by mass | | | | | 100 | | | | | | | | | |
| | | Umerit125NF | Parts by mass | | | | | | 100 | | | | | | | | |
| | | Ultzex3520L | Parts by mass | | | | | | | 100 | | | | | | | |
| | | Non-Zex3510F | Parts by mass | | | | | | | | 100 | | | | | | |
| | | EvolueSP2020 | Parts by mass | | | | | | | | | 100 | | | | | |
| Layer thickness | Odor adsorption layer | | μm | 10 | 10 | 10 | 10 | 10 | 10 | 10 | 10 | 10 | 10 | 10 | 10 | 100 | 100 |
| | Non-odor adsorption layer | | μm | 30 | 30 | 30 | 30 | 30 | 30 | 30 | 30 | 30 | 30 | 30 | 30 | 50 | 30 |
| | Sealant film | | μm | 10 | 10 | 10 | 10 | 10 | 10 | 10 | 10 | 10 | 10 | 10 | 10 | — | 10 |
| Characteristics | Increment of TOC concentration of filling water | Article unirradiated with UV | ppm | 0.59 | 0.56 | 0.39 | 0.24 | 0.60 | 0.55 | 0.46 | 0.26 | 0.32 | 0.56 | 0.56 | 0.56 | 1.57 | 1.57 |
| | | Article irradiated with UV | ppm | 0.72 | 0.68 | 0.47 | 0.29 | 0.72 | 0.56 | 0.55 | 0.31 | 0.38 | 0.68 | 0.68 | 0.68 | 2.36 | 2.36 |
| Evaluation results | Pinhole resistance | | Holes | 6.5 | 7.0 | 24.5 | 17.0 | 13.0 | 29.0 | 59.0 | 132.0 | 150.0 | 7.0 | 3.0 | 15.0 | 17.5 | 20.0 |
| | Content in whole sealant film | | % by mass | 1.0 | 1.0 | 1.0 | 1.0 | 1.0 | 1.0 | 1.0 | 1.0 | 1.0 | 1.0 | 0.5 | 5.0 | 0.0 | 1.0 |
| | Average particle size | | μm | 3.5 | 3.5 | 3.5 | 3.5 | 3.5 | 3.5 | 3.5 | 3.5 | 3.5 | 6–7 | 3.5 | 3.5 | | 3.5 |
| | Film-forming properties | | — | ○ | ○ | ○ | ○ | ○ | ○ | ○ | ○ | ○ | ○ | ○ | ○ | ○ | ○ |
| | Sealing strength | | — | ○ | ○ | ○ | ○ | ○ | ○ | ○ | ○ | ○ | ○ | ○ | ○ | ○ | ○ |
| | Pinhole resistance | | Holes | 8 | 9 | 27 | 20 | 18 | 35 | 86 | 140 | 160 | 9 | 5 | 20 | 18 | 22 |
| | Increment of TOC concentration of filling water | | ppm | 0.55 | 0.51 | 0.35 | 0.22 | 0.54 | 0.49 | 0.41 | 0.23 | 0.29 | 0.55 | 2.60 | 0.32 | 2.36 | 1.77 |

Summary of Results

The packages of all Examples which used the low-elution polyethylene showed good film-forming properties and sealing strength, and also a small increment of the TOC concentration.

Furthermore, Examples 1 to 7 and 10 to 12 all of which used low-elution polyethylene excellent in the pinhole resistance showed higher pinhole resistance than Examples 8 and 9 both of which used low-elution polyethylene inferior in the pinhole resistance.

Comparative Example 1 which did not contain the odor adsorbent and the low-elution polyethylene and Comparative Example 2 which did not contain the low-elution polyethylene showed good film-forming properties and sealing strength, but showed a large increment of the TOC concentration.

Sealant Film for Packaging Liquid Contents, in Embodiment 3

The details of the raw materials used in Examples are as follows.

[Low-Elution Polyethylene and High-Elution Polyethylene]

[Odor Adsorbent]
/Kesmon NS-241: inorganic porous material carrying amino group-containing compound thereon, produced by Toagosei Co., Ltd. Average particle size of 3.5 μm.
/Dushlite M: inorganic porous material carrying amino group-containing compound thereon, produced by Sinanen Zeomic Co., Ltd. Average particle size of 6 to 7 μm.
[Hydrophobic Zeolite]
/Mizukasieves EX-122: produced by Mizusawa Industrial Chemicals, Ltd. Molar ratio of $SiO_2/AL_2O_3=32/1$, and average particle size=2.5 to 5.5 μm.
/Silton MT100: produced by Mizusawa Industrial Chemicals, Ltd. Molar ratio of $SiO_2/AL_2O_3=100/1$, and average particle size=3 to 4.5 μm.
/Silton MT400: produced by Mizusawa Industrial Chemicals, Ltd. Molar ratio of $SiO_2/AL_2O_3=400/1$, and average particle size=5 to 7 μm.
/Silton MT2000: produced by Mizusawa Industrial Chemicals, Ltd. Molar ratio of $SiO_2/AL_2O_3=2000/1$, and average particle size=2 to 4 μm.
/Silton MT-8000: produced by Mizusawa Industrial Chemicals, Ltd. Molar ratio of $SiO_2/AL_2O_3=8000/1$, and average particle size=0.8 μm.

[Adjustment of Masterbatch]

The masterbatch was produced by adjustment in the following way.

(Adjustment of Masterbatch 1)

Ultzex 1520L which is LLDPE of the low-elution polyethylene and Kesmon NS-241 which is an inorganic porous material carrying a chemical adsorbent thereon were melt-blended at the following ratio, and a masterbatch 1 (MB1) was obtained.

TABLE 5

| | | | | | MFR | Concentration | Pinhole |
| Elution property | Polyethylene used as film material | Supplier | Type of resin | Density [g/cm³] | [g/10 minutes] | of eluting TOC in film [ppm] | resistance [holes] |
| --- | --- | --- | --- | --- | --- | --- | --- |
| Low elution | Ultzex 1520L | Prime Polymer Co., Ltd. | C6-LLDPE | 0.916 | 2.3 | 96 | 6.5 |
| | Ultzex 2021L | Prime Polymer Co., Ltd. | C6-LLDPE | 0.920 | 2.0 | 64 | 24.5 |
| | Ultzex 3500ZA | Prime Polymer Co., Ltd. | C6-LLDPE | 0.919 | 2.1 | 43 | 17.0 |
| | Kernel KF271 | Mitsubishi Chemical Corporation | Ethylene/α-olefin copolymerization | 0.913 | 2.4 | 96 | 13.0 |
| | Kernel KF283 | Mitsubishi Chemical Corporation | Ethylene/α-olefin copolymerization | 0.921 | 2.5 | 99 | 29.0 |
| | Umerit 125NF | Ube-Maruzen Polyethylene Co., Ltd. | C6, C8-LLDPE | 0.924 | 2.2 | 92 | 59.0 |
| | Ultzex 3520L | Prime Polymer Co., Ltd. | C6-LLDPE | 0.931 | 2.1 | 42 | 132 |
| | Neo-Zex 3510F | Prime Polymer Co., Ltd. | C4-LLDPE | 0.933 | 1.6 | 52 | 150 |
| High elution | Evolue SP2020 | Prime Polymer Co., Ltd. | C6-LLDPE | 0.916 | 2.1 | 263 | 17.5 |

| Ultzex 1520L | 90 parts by mass |
| --- | --- |
| Kesmon NS-241 | 10 parts by mass |

(Adjustment of Masterbatches 2 to 9)

Thermoplastic resins and odor adsorbents or hydrophobic zeolite were melt-blended according to combinations in Table 6, respectively, and masterbatches 2 to 9 (MB2 to 9) were obtained in the same manner as that in the masterbatch 1.

TABLE 6

| | | | Unit | MB1 | MB2 | MB3 | MB4 | MB5 | MB6 | MB7 | MB8 | MB9 |
| --- | --- | --- | --- | --- | --- | --- | --- | --- | --- | --- | --- | --- |
| Blend ratio | Thermoplastic resin | Ultzex 1520L | Parts by mass | 90 | | | | | | | | |
| | | Novatec LC600A | Parts by mass | | 90 | 90 | 90 | 90 | 90 | 90 | 90 | 80 |

TABLE 6-continued

| | | Unit | MB1 | MB2 | MB3 | MB4 | MB5 | MB6 | MB7 | MB8 | MB9 |
|---|---|---|---|---|---|---|---|---|---|---|---|
| Inorganic porous material carrying chemical adsorbent thereon | Kesmon NS-241 | Parts by mass | 10 | 10 | | | | | | | 20 |
| | Dushlite M | Parts by mass | | | 10 | | | | | | |
| Hydrophobic zeolite | Mizukasieves EX-122 | Parts by mass | | | | 10 | | | | | |
| | Silton MT100 | Parts by mass | | | | | 10 | | | | |
| | Silton MT400 | Parts by mass | | | | | | 10 | | | |
| | Silton MT2000 | Parts by mass | | | | | | | 10 | | |
| | Silton MT8000 | Parts by mass | | | | | | | | 10 | |

Example 1

The masterbatch 1 and the masterbatch 6 which were obtained in the above description and Ultzex 1520L were dry-blended at the following ratio, and a mixture for an odor adsorption layer was obtained.

| | |
|---|---|
| Masterbatch 1 | 4.18 parts by mass |
| Masterbatch 6 | 12.52 parts by mass |
| Ultzex 1520L | 83.3 parts by mass |

Then, a sealant film was obtained which had a three-layer structure having non-odor adsorption layer of 10 μm/odor adsorption layer of 30 μm/non-odor adsorption layer of 10 μm, by laminating the mixture obtained in the above description and Ultzex 1520L for the non-odor adsorption layer on each other by inflation film formation at 160° C.

Next, the film-forming properties, the adsorption effect, the heat sealability and the pinhole resistance were evaluated.

The detailed structure of the laminate and the evaluation results are shown in Table 7.

Examples 2 to 18, and Comparative Example 2

In the same manner as that in Example 1, mixtures for odor adsorption layers were obtained according to combinations described in Tables 7 to 9, respectively, and sealant films were prepared and evaluated.

The detailed structures of the laminates and the evaluation results are shown in Tables 7 to 9.

Comparative Example 1

A sealant film (50 μm) was obtained using Evolue SP2020 of LLDPE which is a high-elution polyethylene, by inflation film formation at 160° C.

Next, the sealant film was evaluated in the same manner as that in Example 1.

The structure of the laminate and the evaluation results are shown in Table 9.

<Evaluation>

[Film-Forming Property]

The appearance of the sealant film was observed and was organoleptically evaluated. The evaluation criteria are as follows.
  Good: A film could be formed without the occurrence of a crease and/or a rash on the film.
  Poor: Many creases and rashes were formed on the film, and film formation was difficult.

[Heat Sealability]

Each of the sealant films produced in Examples and Comparative Examples, a PET film (12 μm in thickness, Espet T4102: produced by Toyobo Co., Ltd.), and an aluminum foil (7 μm in thickness, produced by Toyo Aluminum K.K.) were laminated on each other via an adhesive agent for dry lamination (RU004/H-1: produced by Rock Paint Co., Ltd., coating amount: 3.5 g/m² for each adhesive layer, drying temperature: 70° C.), and a laminate of PET film/adhesive layer/aluminum foil/adhesive layer/sealant film was produced.

Next, this laminate was cut into 10 cm×10 cm, and the cut laminate was folded in half and overlaid so that the sealant portions of the laminate came in contact with each other; and a sample was produced in which a region of 1 cm×10 cm was heat-sealed using Heat Seal Tester (manufactured by Tester Sangyo Co., Ltd.: TP-701-A) (in a state in which the edges were not bonded to each other without being heat-sealed, and were bifurcated). This sample was cut into a strip having a width of 15 mm, and each of bifurcated edges was attached to a tensile tester, and the tensile strength (N/15 mm) was measured.

Heat-Sealing Conditions
  Temperature: 160° C.
  Pressure: 1 kgf/cm²
  Time period: 1 second
  Conditions of Tensile Strength Test
  Test speed: 300 mm/min
  Load range: 50N
  Determination of Passes and Fails
  Good: 30 N/15 mm or higher, and pass
  Poor: Lower than 30 N/15 mm, and failure

[Pinhole Resistance]

The sealant films produced in Examples and Comparative examples were cut into A4 size (30 cm×21 cm), the cut sealant film was flexed with Gelvo type Flex-Cracking Tester (BE-1005, manufactured by Tester Sangyo Co., Ltd.), and then the number of generated pinholes in a plane of 30 cm×21 cm of each sample was counted.
  Temperature: 23° C.
  Number of flexings by Gelbo: 5000 times

[Increment of TOC Concentration of Filling Water]

A pouch bag (15 cm×44 cm) was produced using each of the sealant films obtained in Examples and Comparative Examples, and the inner surface of each of the laminates was previously subjected to sterilization treatment by UV irradiation.

Then, 1000 g of water at 65° C. (distilled water for high performance liquid chromatography, Junsei Chemical Co., Ltd.) was hot-packed into each of the obtained packages to produce a liquid-filled package. The liquid-filled package was stored at 35° C. for 2 weeks, and then the concentration of TOC in the filling water was measured with a TOC-L total organic carbon meter manufactured by Shimadzu Corporation.

Next, the TOC concentration of water before filling was also measured in the same manner.

The increment of the TOC concentration in each package was determined from the following expression.

increment of TOC concentration=TOC concentration of filling water after storage−TOC concentration of water before filling TOC concentration of water before filling: 0.02 ppm
Conditions of Sterilization Treatment by UV Irradiation
UV wavelength: 253.7 nm
Irradiation time period: 10 seconds
Temperature: 25° C.

TABLE 7

| | | | | | Example | | | | | | |
|---|---|---|---|---|---|---|---|---|---|---|---|
| Sealant film | Composition of each layer | Composition of Odor adsorption layer | Material Name | | Unit | 1 | 2 | 3 | 4 | 5 | 6 | 7 |
| | | Masterbatch | Blend ratio of MB | MB1 | Parts by mass | 4.18 | | | | | | |
| | | | | MB2 | Parts by mass | | 4.18 | | 4.18 | 4.18 | 4.18 | 4.18 |
| | | | | MB3 | Parts by mass | | | 4.18 | | | | |
| | | | | MB4 | Parts by mass | | | | 12.52 | | | |
| | | | | MB5 | Parts by mass | | | | | 12.52 | | |
| | | | | MB6 | Parts by mass | 12.52 | 12.52 | 12.52 | | | | |
| | | | | MB7 | Parts by mass | | | | | | 12.52 | |
| | | | | MB8 | Parts by mass | | | | | | | 12.52 |
| | | | | MB9 | Parts by mass | | | | | | | |
| | | Composition of MB after mixing | Low-elution polyethylen LDPE | Ultzex1520L | Parts by mass | 3.76 | | | | | | |
| | | | | NovatecLC600A | Parts by mass | 11.27 | 15.03 | 15.03 | 15.03 | 15.03 | 15.03 | 15.03 |
| | | | Inorganic porous material carrying chemical adsorbent thereon | KesmonNS241 | Parts by mass | 0.42 | 0.42 | 0.42 | 0.42 | 0.42 | 0.42 | 0.42 |
| | | | | DushliteM | Parts by mass | | | | | | | |
| | | | Hydrophobic zeolite | Mizukasieves EX122 | Parts by mass | | | | 1.25 | | | |
| | | | | SiltonMT-100 | Parts by mass | 1.25 | 1.25 | 1.25 | | | | |
| | | | | SiltonMT-400 | Parts by mass | | | | | 1.25 | | |
| | | | | SiltonMT-2000 | Parts by mass | | | | | | 1.25 | |
| | | | | SiltonMT-8000 | Parts by mass | | | | | | | 1.25 |
| | | | | Total | Parts by mass | 16.7 | 16.7 | 16.7 | 16.7 | 16.7 | 16.7 | 16.7 |

TABLE 7-continued

| | Material Name | | Unit | Example 1 | 2 | 3 | 4 | 5 | 6 | 7 |
|---|---|---|---|---|---|---|---|---|---|---|
| | Resin component | Low-elution polyethylene Ultzex1520L | Parts by mass | 83.3 | 83.3 | 83.3 | 83.3 | 83.3 | 83.3 | 83.3 |
| | | Ultzex2021L | Parts by mass | | | | | | | |
| | | Ultzex3500ZA | Parts by mass | | | | | | | |
| | | KernelKF271 | Parts by mass | | | | | | | |
| | | KernelKF283 | Parts by mass | | | | | | | |
| | | Umerit125NF | Parts by mass | | | | | | | |
| | | Ultzex3520L | Parts by mass | | | | | | | |
| | | Neo-Zex3510F | Parts by mass | | | | | | | |
| | | High-elution polyethylene EvolueSP2020 | Parts by mass | | | | | | | |
| Non-odor adsorption layer | Resin component | Low-elution polyethylene Ultzex1520L | Parts by mass | 100 | 100 | 100 | 100 | 100 | 100 | 100 |
| | | Ultzex2021L | Parts by mass | | | | | | | |
| | | Ultzex3500ZA | Parts by mass | | | | | | | |
| | | KernelKF271 | Parts by mass | | | | | | | |
| | | KernelKF283 | Parts by mass | | | | | | | |
| | | Umerit125NF | Parts by mass | | | | | | | |
| | | Ultzex3520L | Parts by mass | | | | | | | |
| | | Neo-Zex3510F | Parts by mass | | | | | | | |
| | | High-elution polyethylene EvolueSP2020 | Parts by mass | | | | | | | |
| Layer thickness | Sealant film | Non-odor adsorption layer | μm | 10 | 10 | 10 | 10 | 10 | 10 | 10 |
| | | Odor adsorption layer | μm | 30 | 30 | 30 | 30 | 30 | 30 | 30 |
| | | Non-odor adsorption layer | μm | 10 | 10 | 10 | 10 | 10 | 10 | 10 |

TABLE 7-continued

| | Material Name | | Unit | Example 1 | 2 | 3 | 4 | 5 | 6 | 7 |
|---|---|---|---|---|---|---|---|---|---|---|
| Characteristics | Odor adsorption layer film of simple body of polyethylene | Increment of TOC concentration of filling water | Article unirradiated with UV ppm | 0.59 | 0.56 | 0.56 | 0.56 | 0.56 | 0.56 | 0.56 |
| | | | Article irradiated with UV ppm | 0.72 | 0.68 | 0.68 | 0.68 | 0.68 | 0.68 | 0.68 |
| | | Pinhole resistance | Holes | 6.5 | 7.0 | 7.0 | 7.0 | 7.0 | 7.0 | 7.0 |
| | Inorganic porous material carrying chemical adsorbent thereon | Content in whole sealant film | % by mass | 0.3 | 0.3 | 0.3 | 0.3 | 0.3 | 0.3 | 0.3 |
| | | Average particle size | μm | 3.5 | 3.5 | 6~7 | 3.5 | 3.5 | 3.5 | 3.5 |
| | Hydrophobic zeolite | Content in whole sealant film | % by mass | 0.8 | 0.8 | 0.8 | 0.8 | 0.8 | 0.8 | 0.8 |
| | | Average particle size | μm | 5~7 | 5~7 | 5~7 | 2.5~5.5 | 3~4.5 | 2~4 | 0.8 |
| Evaluation results | Film-forming properties | | — | ○○ | ○○ | ○○ | ○○ | ○○ | ○○ | ○○ |
| | Sealing strength | | — | ○○ | ○○ | ○○ | ○○ | ○○ | ○○ | ○○ |
| | Pinhole resistance | | Holes | 9.0 | 8.0 | 7.0 | 10.0 | 8.0 | 9.0 | 6.0 |
| | Increment of TOC concentration of filling water | | ppm | 0.36 | 0.34 | 0.39 | 0.45 | 0.4 | 0.33 | 0.29 |

TABLE 8

| | | | | Unit | \multicolumn{7}{c}{Example} |
| --- | --- | --- | --- | --- | --- | --- | --- | --- | --- | --- | --- |
| | | | | | 8 | 9 | 10 | 11 | 12 | 13 | 14 |
| Sealant film | Composition of each layer | Odor adsorption layer | Masterbatch | Blend ratio of MB | MB1 | Parts by mass | | | | | | |
| | | | | MB2 | Parts by mass | 4.18 | 4.18 | 4.18 | 4.18 | 4.18 | 4.18 | 4.18 |
| | | | | MB3 | Parts by mass | | | | | | | |
| | | | | MB4 | Parts by mass | | | | | | | |
| | | | | MB5 | Parts by mass | | | | | | | |
| | | | | MB6 | Parts by mass | 12.52 | 12.52 | 12.52 | 12.52 | 12.52 | 12.52 | 12.52 |
| | | | | MB7 | Parts by mass | | | | | | | |
| | | | | MB8 | Parts by mass | | | | | | | |
| | | | | MB9 | Parts by mass | | | | | | | |
| | | | Composition of MB after mixing | Low-elution polyethylen LDPE | Ultzex1520L | Parts by mass | 15.03 | 15.03 | 15.03 | 15.03 | 15.03 | 15.03 | 15.03 |
| | | | | | NovatecLC600A | Parts by mass | | | | | | | |
| | | | | Inorganic porous material carrying chemical adsorbent thereon | KesmonNS241 | Parts by mass | 0.42 | 0.42 | 0.42 | 0.42 | 0.42 | 0.42 | 0.42 |
| | | | | | DushliteM | Parts by mass | | | | | | | |
| | | | | Hydrophobic zeolite | Mizukasieves EX122 | Parts by mass | 1.25 | 1.25 | 1.25 | 1.25 | 1.25 | 1.25 | 1.25 |
| | | | | | SiltonMT-100 | Parts by mass | | | | | | | |
| | | | | | SiltonMT-400 | Parts by mass | | | | | | | |
| | | | | | SiltonMT-2000 | Parts by mass | | | | | | | |
| | | | | | SiltonMT-8000 | Parts by mass | | | | | | | |
| | | | | Total | | Parts by mass | 16.7 | 16.7 | 16.7 | 16.7 | 16.7 | 16.7 | 16.7 |
| | | Resin component | Low-elution polyethylene | | Ultzex1520L | Parts by mass | 83.3 | | | | | | |
| | | | | | Ultzex2021L | Parts by mass | | 83.3 | | | | | |
| | | | | | Ultzex3500ZA | Parts by mass | | | 83.3 | | | | |
| | | | | | KernelKF271 | Parts by mass | | | | | | | |

TABLE 8-continued

| | | Material Name | Unit | Example 8 | 9 | 10 | 11 | 12 | 13 | 14 |
|---|---|---|---|---|---|---|---|---|---|---|
| | | KernelKF283 | Parts by mass | | | | 83.3 | | | |
| | | Umerit125NF | Parts by mass | | | | | 83.3 | | |
| | | Ultzex3520L | Parts by mass | | | | | | 83.3 | |
| | | Neo-Zex3510F | Parts by mass | | | | | | | 83.3 |
| | High-elution polyethylene | EvolueSP2020 | Parts by mass | | | | | | | |
| Non-odor adsorption layer | Resin component Low-elution polyethylene | Ultzex1520L | Parts by mass | 100 | | | | | | |
| | | Ultzex2021L | Parts by mass | | 100 | | | | | |
| | | Ultzex3500ZA | Parts by mass | | | 100 | | | | |
| | | KernelKF271 | Parts by mass | | | | | | | |
| | | KernelKF283 | Parts by mass | | | | 100 | | | |
| | | Umerit125NF | Parts by mass | | | | | 100 | | |
| | | Ultzex3520L | Parts by mass | | | | | | 100 | |
| | High-elution polyethylene | Neo-Zex3510F | Parts by mass | | | | | | | 100 |
| | | EvolueSP2020 | Parts by mass | | | | | | | |
| Layer thickness | Sealant film | | μm | 10 | 10 | 10 | 10 | 10 | 10 | 10 |
| | Odor adsorption layer film of simple body of polyethylene | Non-odor adsorption layer | μm | 30 | 30 | 30 | 30 | 30 | 30 | 30 |
| | | Odor adsorption layer | μm | 10 | 10 | 10 | 10 | 10 | 10 | 10 |
| Characteristics | Increment of TOC concentration of filling water | Non-odor adsorption layer | | | | | | | | |
| | | Article unirradiated with UV | ppm | 0.39 | 0.24 | 0.60 | 0.55 | 0.46 | 0.26 | 0.32 |
| | | Article irradiated with UV | ppm | 0.47 | 0.29 | 0.77 | 0.66 | 0.55 | 0.31 | 0.38 |
| | Pinhole resistance | | Holes | 24.5 | 17.0 | 13.0 | 29.0 | 59.0 | 132.0 | 150.0 |
| | Inorganic porous material carrying chemical adsorbent thereon | Content in whole sealant film | % by mass | 0.3 | 0.3 | 0.3 | 0.3 | 0.3 | 0.3 | 0.3 |
| | | Average particle size | μm | 3.5 | 3.5 | 3.5 | 3.5 | 3.5 | 3.5 | 3.5 |
| | Hydrophobic zeolite | Content in whole sealant film | % by mass | 0.8 | 0.8 | 0.8 | 0.8 | 0.8 | 0.8 | 0.8 |
| | | Average particle size | μm | 5~7 | 5~7 | 5~7 | 5~7 | 5~7 | 5~7 | 5~7 |
| Evaluation results | Film-forming properties | | — | ○ | ○ | ○ | ○ | ○ | ○ | ○ |
| | Sealing strength | | — | ○ | ○ | ○ | ○ | ○ | ○ | ○ |
| | Pinhole resistance | | Holes | 30.0 | 21.0 | 18.0 | 40.0 | 71.0 | 145.0 | 157.0 |
| | Increment of TOC concentration of filling water | | ppm | 0.24 | 0.14 | 0.36 | 0.33 | 0.27 | 0.15 | 0.19 |

TABLE 9

| Sealant film | Composition of each layer | Material Name | | Blend ratio of MB | Unit | Example 15 | 16 | 17 | 18 | 19 | 20 | 21 |
|---|---|---|---|---|---|---|---|---|---|---|---|---|
| | Odor adsorption layer | Masterbatch | MB1 | | Parts by mass | | | | | | | |
| | | | MB2 | | Parts by mass | 4.18 | 12.5 | 20.83 | 2.08 | | | |
| | | | MB3 | | Parts by mass | | | | | | | |
| | | | MB4 | | Parts by mass | | | | | | | |
| | | | MB5 | | Parts by mass | | | | | | | |
| | | | MB6 | | Parts by mass | 12.52 | 4.18 | 62.47 | 6.25 | 16.7 | 16.7 | 16.7 |
| | | | MB7 | | Parts by mass | | | | | | | |
| | | | MB8 | | Parts by mass | | | | | | | |
| | | | MB9 | | Parts by mass | | | | | | | |
| | | Composition of MB after mixing | Low-elution polyethylene LDPE | Ultzex1520L | Parts by mass | 15.03 | 15.01 | 74.97 | 7.50 | 15.03 | 15.03 | 15.03 |
| | | | | NovatecLC600A | Parts by mass | 0.42 | 1.75 | 2.08 | 0.21 | | | |
| | | | Inorganic porous material carrying chemical adsorbent thereon | KesmonNS241 | Parts by mass | | | | | | | |
| | | | | DushliteM | Parts by mass | | | | | | | |
| | | | Hydrophobic zeolite | Mizukasieves EX122 | Parts by mass | 1.25 | 0.42 | 6.25 | 0.63 | 1.67 | 1.67 | 1.67 |
| | | | | SiltonMT-100 | Parts by mass | | | | | | | |
| | | | | SiltonMT-400 | Parts by mass | | | | | | | |
| | | | | SiltonMT-2000 | Parts by mass | | | | | | | |
| | | | | SiltonMT-8000 | Parts by mass | | | | | | | |
| | | | Total | | Parts by mass | 16.7 | 16.7 | 83.3 | 8.3 | 16.7 | 16.7 | 16.7 |
| | | Resin component | Low-elution polyethylene | Ultzex1520L | Parts by mass | 83.3 | 83.3 | 16.7 | 91.7 | 83.3 | | |
| | | | | Ultzex2021L | Parts by mass | | | | | | | |
| | | | | Ultzex3500ZA | Parts by mass | | | | | | 83.3 | 83.3 |
| | | | | KernelKF271 | Parts by mass | | | | | | | |

TABLE 9-continued

| | | Material Name | Unit | Example 15 | 16 | 17 | 18 | 19 | 20 | 21 |
|---|---|---|---|---|---|---|---|---|---|---|
| | | KernelKF283 | Parts by mass | | | | | | | |
| | | Umerit125NF | Parts by mass | | | | | | | |
| | | Ultzex3520L | Parts by mass | | | | | | | |
| | | Neo-Zex3510F | Parts by mass | | | | | | | |
| | High-elution polyethylene | EvolueSP2020 | Parts by mass | 53.3 | | | | | | |
| Non-odor adsorption layer | Resin component Low-elution polyethylene | Ultzex1520L | Parts by mass | | 100 | | | | | |
| | | Ultzex2021L | Parts by mass | | | 100 | | | | |
| | | Ultzex3500ZA | Parts by mass | | | | | | 100 | |
| | | KernelKF271 | Parts by mass | | | | | | | 100 |
| | | KernelKF283 | Parts by mass | | | | | | | |
| | | Umerit125NF | Parts by mass | | | | | 100 | | |
| | | Ultzex3520L | Parts by mass | | | | 100 | | | |
| | | Neo-Zex3510F | Parts by mass | | | | | | | |
| | High-elution polyethylene | EvolueSP2020 | Parts by mass | 100 | | | | | | |
| Layer thickness | Sealant film | | μm | 10 | 10 | 10 | 10 | 10 | 10 | 10 |
| | Non-odor adsorption layer | | μm | 30 | 30 | 30 | 30 | 30 | 30 | 30 |
| | Odor adsorption layer | | μm | 10 | 10 | 10 | 10 | 10 | 10 | 10 |
| Characteristics | Increment of TOC concentration of filling water | Article unirradiated with UV | ppm | 1.57 | 0.56 | 0.56 | 0.56 | 0.56 | 0.39 | 0.24 |
| | | Article irradiated with UV | ppm | 2.36 | 0.68 | 0.68 | 0.68 | 0.68 | 0.47 | 0.29 |
| | Pinhole resistance | | Holes | 17.5 | 7.0 | 7.0 | 7.0 | 7.0 | 24.5 | 17.0 |
| | Content in whole sealant film | | % by mass | 0.3 | 0.8 | 1.7 | 0.1 | 0.0 | 0.0 | 0.0 |
| | Inorganic porous material carrying chemical adsorbent thereon Average particle size | | μm | 3.5 | 3.5 | 3.5 | 3.5 | — | — | — |
| | Content in whole sealant film | | % by mass | 0.8 | 0.3 | 3.8 | 0.4 | 1.0 | 1.0 | 1.0 |
| | Hydrophobic zeolite Average particle size | | μm | 5~7 | 5~7 | 5~7 | 5~7 | 5~7 | 5~7 | 5~7 |
| Evaluation results | Film-forming properties | | — | ○ | ○ | ○ | ○ | ○ | ○ | ○ |
| | Sealing strength | | — | ○ | ○ | ○ | ○ | ○ | ○ | ○ |
| | Pinhole resistance | | Holes | 24.0 | 8.0 | 15.0 | 4.0 | 7.0 | 28.0 | 20.0 |
| | Increment of TOC concentration of filling water | | ppm | 1.18 | 0.57 | 0.05 | 0.63 | 0.17 | 0.12 | 0.07 |

TABLE 10

| Sealant film | Composition of each layer | Material Name | | Unit | Example 22 | 23 | 24 | 25 | 26 | 27 | Comparative Example 1 | 2 |
|---|---|---|---|---|---|---|---|---|---|---|---|---|
| | Composition of each layer | Masterbatch | Blend ratio of MB | | | | | | | | | |
| | Odor adsorption layer | | MB1 | Parts by mass | | | | | | | | |
| | | | MB2 | Parts by mass | | | | | | | | |
| | | | MB3 | Parts by mass | | | | | | | | |
| | | | MB4 | Parts by mass | | | | | | | | |
| | | | MB5 | Parts by mass | | | | | | | | |
| | | | MB6 | Parts by mass | 18.7 | 16.7 | 16.7 | 16.7 | 16.7 | 16.7 | | |
| | | | MB7 | Parts by mass | | | | | | | | |
| | | | MB8 | Parts by mass | | | | | | | | |
| | | | MB9 | Parts by mass | | | | | | | | 77.5 |
| | | Composition of MB after mixing | Low-elution polyethylene Ultzex1520L | Parts by mass | | | | | | | | |
| | | | LDPE NovatecLC600A | Parts by mass | 15.03 | 15.03 | 15.03 | 15.03 | 15.03 | 15.03 | | 50.00 |
| | | | Inorganic porous material carrying chemical adsorbent thereon KesmonNS241 | Parts by mass | | | | | | | | 17.50 |
| | | | DushliteM | Parts by mass | | | | | | | | |
| | | | Hydrophobic zeolite Mizukasieves EX122 | Parts by mass | | | | | | | | |
| | | | SiltonMT-100 | Parts by mass | | | | | | | | |
| | | | SiltonMT-400 | Parts by mass | 1.67 | 1.67 | 1.67 | 1.67 | 1.67 | 1.67 | | |
| | | | SiltonMT-2000 | Parts by mass | | | | | | | | |
| | | | SiltonMT-8000 | Parts by mass | | | | | | | | |
| | | | Total | Parts by mass | 16.7 | 16.7 | 16.7 | 16.7 | 16.7 | 16.7 | 0.0 | 77.5 |

TABLE 10-continued

| | Material Name | | Unit | Example 22 | 23 | 24 | 25 | 26 | 27 | Comparative Example 1 | 2 |
|---|---|---|---|---|---|---|---|---|---|---|---|
| Resin component | Low-elution polyethylene | Ultzex1520L | Parts by mass | | | | | | | | |
| | | Ultzex2021L | Parts by mass | | | | | | | | |
| | | Ultzex3500ZA | Parts by mass | | | | | | | | |
| | | KernelKF271 | Parts by mass | 83.3 | | | | | | | |
| | | KernelKF283 | Parts by mass | | 83.3 | | | | | | |
| | | Umerit125NF | Parts by mass | | | 83.3 | | | | | |
| | | Ultzex3520L | Parts by mass | | | | 83.3 | | | | |
| | | Neo-Zex3510F | Parts by mass | | | | | 83.3 | | | |
| | High-elution polyethylene | EvolueSP2020 | Parts by mass | | | | | | 83.3 | 100.0 | 22.5 |
| Non-odor adsorption layer Resin component | Low-elution polyethylene | Ultzex1520L | Parts by mass | 100 | | | | | | | |
| | | Ultzex2021L | Parts by mass | | 100 | | | | | | |
| | | Ultzex3500ZA | Parts by mass | | | 100 | | | | | |
| | | KernelKF271 | Parts by mass | | | | 100 | | | | |
| | | KernelKF283 | Parts by mass | | | | | 100 | | | |
| | | Umerit125NF | Parts by mass | | | | | | 100 | | |
| | | Ultzex3520L | Parts by mass | | | | | | | 100 | |
| | | Neo-Zex3510F | Parts by mass | | | | | | | | |
| | High-elution polyethylene | EvolueSP2020 | Parts by mass | | | | | | | | |
| Layer thickness | Sealant film | Non-odor adsorption layer | μm | 10 | 10 | 10 | 10 | 10 | 10 | 50 | — |
| | | Odor adsorption layer | μm | 30 | 30 | 30 | 30 | 30 | 30 | — | 50 |
| | | Non-odor adsorption layer | μm | 10 | 10 | 10 | 10 | 10 | 10 | — | — |

TABLE 10-continued

| | Material Name | | Unit | Example 22 | 23 | 24 | 25 | 26 | 27 | Comparative Example 1 | 2 |
|---|---|---|---|---|---|---|---|---|---|---|---|
| Characteristics | Odor adsorption layer film of simple body of polyethylene | Increment of TOC concentration of filling water | Article unirradiated with UV ppm | 0.60 | 0.55 | 0.46 | 0.26 | 0.32 | 1.57 | 1.57 | 1.57 |
| | | | Article irradiated with UV ppm | 0.72 | 0.66 | 0.55 | 0.31 | 0.38 | 2.36 | 2.36 | 2.38 |
| | | Pinhole resistance | Holes | 13.0 | 29.0 | 59.0 | 132.0 | 150.0 | 17.5 | 17.5 | 17.5 |
| | Inorganic porous material carrying chemical adsorbent thereon | Content in whole sealant film | % by mass | 0.0 | 0.0 | 0.0 | 0.0 | 0.0 | 0.0 | 0.0 | 17.5 |
| | | Average particle size | μm | — | — | — | — | — | — | — | 3.5 |
| | Hydrophobic zeolite | Content in whole sealant film | % by mass | 1.0 | 1.0 | 1.0 | 1.0 | 1.0 | 1.0 | 0.8 | 0.0 |
| | | Average particle size | μm | 5~7 | 5~7 | 5~7 | 5~7 | 5~7 | 5~7 | — | — |
| Evaluation results | | Film-forming properties | — | ○ | ○ | ○ | ○ | ○ | ○ | ○ | X |
| | | Sealing strength | — | ○ | ○ | ○ | ○ | ○ | ○ | ○ | X |
| | | Pinhole resistance | Holes | 15.0 | 38.0 | 68.0 | 141.0 | 152.0 | 22.0 | 23.0 | 205.0 |
| | | Increment of TOC concentration of filling water | ppm | 0.18 | 0.16 | 0.14 | 0.08 | 0.1 | 0.59 | 2.36 | 1.77 |

Summary of Results

The packages of all Examples which used the low-elution polyethylene showed good film-forming properties, sealing strength, piercing strength, and increment of the TOC concentration.

Furthermore, Examples 1 to 12, 15 to 24, and 27 all of which used low-elution polyethylene excellent in the pinhole resistance showed higher pinhole resistance than Examples 13, 14, 25 and 26 all of which used low-elution polyethylene inferior in the pinhole resistance.

Comparative Example 1 which did not have the odor adsorption layer showed a large increment of the TOC concentration. In addition, Comparative Example 2 which contained the odor adsorbent in an amount of more than 15% by mass showed such the results of being capable of reducing the increment of the TOC concentration but being inferior in the film-forming properties, the sealing strength and the pinhole resistance.

Laminate for Packaging Liquid Contents, in Embodiment 1

The details of the raw materials used in the Examples are as follows.

[Substrate Layer Film]

Substrate layer film A: Multitron (produced by Tamapoly Co., Ltd., three-layer film composed of PE layer of 25 μm/non-stretched nylon layer of 20 μm/PE layer of 25 μm)

[Low-Elution Polyethylene and High-Elution Polyethylene]

the time when the laminate was used as a packaging material. The evaluation results are shown in Table 12.

The structure of the laminate is as follows.

PE layer of 25 μm/non-stretched nylon layer of 20 μm/PE layer of 25 μm/EC layer of 15 μm/sealant film A of 50 μm (135 μm thick in total)

(Lamination Condition)

Extrusion temperature: 330° C.

Material for adhesive layer: LDPE (Novatec LC520)

Thickness of adhesive layer: 15 μm

Examples 2 to 8 and Comparative Example 1

Polyethylenes described in Table 11 were selected and used, and films were formed in the same manner as in Example 1; thereby single-layer sealant films each having a thickness of 50 μm were obtained; and laminates were produced, and evaluated in the same manner. The evaluation results are shown in Table 12.

Example 9

A laminate having the following layer structure was obtained which had sealant layers on both surfaces so as to sandwich the substrate layer, using Ultzex 1520L and Ultzex 2021L described in Table 11, a non-stretched nylon (UBE 5033B, polyamide 6/66 copolymer, produced by Ube Industries, Ltd.) as a substrate layer, and modified polyolefin (produced by Mitsui Chemicals Inc., Admer NF557) as an adhesive layer for the non-stretched nylon layer, by inflation film formation (film-forming temperatures: Ultzex 1520L layer and Ultzex 2021L layer: 160° C., and non-stretched

TABLE 11

| | | | Polyethylene | | | | |
|---|---|---|---|---|---|---|---|
| Elution property | Polyethylene used as film material | Supplier | Type of resin | Density [g/cm³] | MFR [g/10 minutes] | Concentration of eluting TOC in film [ppm] | Pinhole resistance [holes] |
| Low Elution | Ultzex1520L | Prime Polymer Co., Ltd. | C6-LLDPE | 0.916 | 2.3 | 96 | 6.5 |
| | Ultzex2021L | Prime Polymer Co., Ltd. | C6-LLDPE | 0.920 | 2.0 | 64 | 24.5 |
| | Ultzex3500ZA | Prime Polymer Co., Ltd. | C6-LLDPE | 0.919 | 2.1 | 43 | 17.0 |
| | KernelKF271 | Mitsubishi Chemical Corportion | Ethylene/α-olefin copolymerization | 0.913 | 2.4 | 96 | 13.0 |
| | KernelKF283 | Mitsubishi Chemical Corportion | Ethylene/α-olefin copolymerization | 0.921 | 2.5 | 99 | 29.0 |
| | Umerit125NF | Ube-Maruzen Polyethylene Co., Ltd. | C6, C8-LLDPE | 0.924 | 2.2 | 92 | 59.0 |
| | Ultzex3520L | Prime Polymer Co., Ltd. | C6-LLDPE | 0.931 | 2.1 | 42 | 132 |
| | Neo-Zex3510F | Prime Polymer Co., Ltd. | C4-LLDPE | 0.933 | 1.6 | 52 | 150 |
| High elution | EvolueSP2020 | Prime Polymer Co., Ltd. | C6-LLDPE | 0.916 | 2.1 | 263 | 17.5 |

Example 1

A single-layer sealant film having a thickness of 50 μm was obtained by inflation film formation at a film-forming temperature of 160° C., using Ultzex 1520L described in Table 11.

Next, the sealant film obtained in the above description and the substrate layer film A were laminated on each other by EC (extrusion coating) of a material for an adhesive layer under the following conditions to obtain a film-shaped laminate: and the obtained laminate was subjected to the evaluation of the film-forming properties, the piercing strength, the pinhole resistance, the concentration of eluted TOC (adsorption effect), and the change in odor and taste, at nylon layer: 240° C.); and was evaluated in the same manner as that in Example 1. The evaluation results are shown in Table 12.

(Layer Structure of Laminate)

Ultzex 1520L layer of 10 μm/Ultzex 2021L layer of 30 μm/adhesive layer of 10 μm/non-stretched nylon layer of 20 μm/adhesive layer of 10 μm/Ultzex 2021L layer of 30 μm/Ultzex 1520L layer of 10 μm (120 μm thick in total)

Example 10

A three-layer sealant film having the following structure with a total thickness of 50 μm was obtained by inflation film formation at a film-forming temperature of 160° C., using non-low-elution polyethylene Evolue SP2020 and Ultzex 3500ZA described in Table 11.

(Layer Structure of Sealant Layer)

Evolue SP2020 layer of 3 μm/Ultzex 3500ZA layer of 44 μm/Evolue SP2020 layer of 3 μm (50 μm thick in total)

Next, the sealant film obtained in the above description and the substrate layer film A were laminated on each other in the same manner as that in Example 1; and a film-shaped laminate was obtained, and was evaluated in the same manner. The evaluation results are shown in Table 12.

<Evaluation>

[Film-Forming Property]

The appearance of the sealant film was observed and was organoleptically evaluated. The evaluation criteria are as follows.

Good: A film could be formed without the occurrence of a crease and/or a rash on the film.

Poor: Many creases and rashes were formed on the film, and film formation was difficult.

[Heat Sealability]

Each of the laminates produced in Examples and Comparative Example was cut into 10 cm×10 cm, and the cut laminate was folded in half and overlaid; and a sample was produced in which a region of 1 cm×10 cm was heat-sealed using Heat Seal Tester (manufactured by Tester Sangyo Co., Ltd.: TP-701-A) (in a state in which the edges were not bonded to each other without being heat-sealed, and were bifurcated).

This sample was cut into a strip having a width of 15 mm, and each of bifurcated edges was attached to a tensile tester, the tensile strength (N/15 mm) was measured, and the passes and fails were determined.

Heat-Sealing Conditions
Temperature: 160° C.
Pressure: 1 kgf/cm²
Time period: 1 second
Conditions of Tensile Strength Test
Test speed: 300 mm/min
Load range: 50N
Determination of passes and fails
Good: 30 N/15 mm or higher, and pass
Poor: Lower than 30 N/15 mm, and failure

[Increment of TOC Concentration]

Two packages of pouch bags (15 cm×44 cm) were produced using each of the sealant films obtained in Examples and Comparative Example, and one of the packages was previously subjected to sterilization treatment by UV irradiation.

Then, 1000 g of water at 65° C. (distilled water for high performance liquid chromatography, Junsei Chemical Co., Ltd.) was packed into each of the obtained packages to produce a liquid-filled package. The liquid-filled package was stored at 35° C. for 2 weeks, and then the concentration of TOC in the filling water was measured with a TOC-L total organic carbon meter manufactured by Shimadzu Corporation.

Next, the TOC concentration of water before filling was also measured in the same manner.

The increment of the TOC concentration in each package was determined from the following expression.

Increment of TOC concentration=TOC concentration of filling water after storage−TOC concentration of water before filling TOC concentration of water before filling: 0.02 ppm
Conditions of Sterilization Treatment by UV Irradiation
UV wavelength: 253.7 nm
Irradiation time period: 10 seconds
Temperature: 25° C.

[Pinhole Resistance]

The sealant films produced in Examples and Comparative Example were cut into A4 size (30 cm×21 cm), the cut sealant film was flexed with Gelvo type Flex-Cracking Tester (BE-1005, manufactured by Tester Sangyo Co., Ltd.), and then the number of generated pinholes in a plane of 30 cm×21 cm of each sample was counted.

Temperature: 23° C.
Number of flexings by Gelbo: 5000 times

[Change in Odor and Taste]

A pouch bag (13 cm×17 cm) was produced using each of the sealant films obtained in Examples and Comparative Example. The sealant film was previously subjected to sterilization treatment by UV irradiation. The conditions of the sterilization treatment by UV irradiation are as follows.

Conditions of Sterilization Treatment by UV Irradiation
UV wavelength: 253.7 nm
Irradiation time period: 10 seconds
Temperature: 25° C.

Into the obtained pouch bag, 100 g of water (produced by Suntory Holdings Limited, Natural Water in Japan) heated to 65° C. was hot-packed to produce a liquid-filled package. After that, the liquid-filled package was stored at 10° C. for one week, and then was subjected to the organoleptic evaluation.

The evaluation indices are as follows. The number of participants in the organoleptic evaluation experiment was five; and the average value was calculated and was determined to be the evaluation result.

1: Odor and taste are strong.
2: Odor and taste are somewhat reduced.
3: Odor and taste are greatly reduced.
4: Being equivalent to water before filling.

TABLE 12

| | | | | | Example | | | | | | | | | | Comparative Example |
|---|---|---|---|---|---|---|---|---|---|---|---|---|---|---|---|
| | | | | Unit | 1 | 2 | 3 | 4 | 5 | 6 | 7 | 8 | 9 | 10 | 1 |
| Laminate structure | Sealant layer | Low-elution polyethylene-containing layer | Ultzex1520L | μm | | | | | | | | | | 10 | |
| | | | Ultzex2021L | μm | | | | | | | | | | 30 | |
| | Ahesive layer | Modified polyolefin | AdmerNF557 | μm | | | | | | | | | | 10 | |
| | Substrate layer | Multitron | PE layer | μm | 25 | 25 | 25 | 25 | 25 | 25 | 25 | 25 | | 25 | 25 |
| | | | Non-stretched nylon layer | μm | 20 | 20 | 20 | 20 | 20 | 20 | 20 | 20 | | 20 | 20 |
| | | | PE layer | μm | 25 | 25 | 25 | 25 | 25 | 25 | 25 | 25 | | 25 | 25 |
| | | Non-stretched nylon layer | UBE50338 | μm | | | | | | | | | 20 | | |

TABLE 12-continued

|  |  |  | Unit | Example 1 | 2 | 3 | 4 | 5 | 6 | 7 | 8 | 9 | 10 | Comparative Example 1 |
|---|---|---|---|---|---|---|---|---|---|---|---|---|---|---|
| Adhesive layer | EC layer | NovatecLC520 | μm | 15 | 15 | 15 | 15 | 15 | 15 | 15 | 15 |  | 15 | 15 |
|  | Modified polyolefin | AdmerNF557 | μm |  |  |  |  |  |  |  |  | 10 |  |  |
| Sealant layer | Non-low-elution polyethylene-containing layer | EvolueSP2020 | μm |  |  |  |  |  |  |  |  |  | 3 | 50 |
|  | Low-elution polyethylene-containing layer | Ultzex2021L | μm |  | 50 |  |  |  |  |  |  | 30 |  |  |
|  |  | Ultzex1520L | μm | 50 |  |  |  |  |  |  |  | 10 |  |  |
|  |  | Ultzex3500ZA | μm |  |  | 50 |  |  |  |  |  |  | 44 |  |
|  |  | KernelKF271 | μm |  |  |  | 50 |  |  |  |  |  |  |  |
|  |  | KernelKF283 | μm |  |  |  |  | 50 |  |  |  |  |  |  |
|  |  | Umerit125NF | μm |  |  |  |  |  | 50 |  |  |  |  |  |
|  |  | Ultzex3520L | μm |  |  |  |  |  |  | 50 |  |  |  |  |
|  |  | Neo-Zex3510F | μm |  |  |  |  |  |  |  | 50 |  |  |  |
|  | Non-low-elution polyethylene-containing layer | EvolueSP2020 | μm |  |  |  |  |  |  |  |  |  | 3 |  |
| Evaluation results | Total |  |  | 135 | 135 | 135 | 135 | 135 | 135 | 135 | 135 | 120 | 135 | 135 |
|  | Film-forming properties |  | — | ○ | ○ | ○ | ○ | ○ | ○ | ○ | ○ | ○ | ○ | ○ |
|  | Sealing strength |  | — | ○ | ○ | ○ | ○ | ○ | ○ | ○ | ○ | ○ | ○ | ○ |
|  | Piercing strength |  | N | 6.2 | 6.7 | 6.6 | 5.9 | 6.4 | 6.8 | 7.3 | 7.5 | 6.5 | 6.5 | 6.6 |
|  | Pinhole resistance |  | Holes | 0 | 3 | 2 | 0 | 5 | 8 | 27 | 35 | 0 | 2 | 3 |
|  | Increment of TOC concentation of filling water |  | ppm | 0.57 | 0.81 | 0.35 | 0.87 | 0.79 | 0.66 | 0.37 | 0.46 | 0.65 | 0.57 | 2.83 |
|  | Change in odor and taste |  | — | 3 | 3 | 3 | 3 | 3 | 3 | 3.5 | 3 | 3.5 | 3 | 1 |

<Summary of Results>

The packages of all Examples which used the low-elution polyethylene showed good film-forming properties, sealing strength, piercing strength and pinhole resistance; and the increment of the TOC concentration was also small, and the change in odor and taste of contents also showed a good result.

Furthermore, Examples 1 to 6, 9 and 10 all of which used low-elution polyethylene excellent in the pinhole resistance showed higher pinhole resistance than Examples 7 and 8 both of which used low-elution polyethylene inferior in the pinhole resistance.

Comparative Example 1 which did not have the low-elution polyethylene-containing layer showed good film-forming properties, sealing strength, piercing strength and pinhole resistance, but showed a large increment of the TOC concentration, and showed a result that the contents were detrimentally affected by the odor.

Laminate for Packaging Liquid Contents, in Embodiment 2

The details of the raw materials used in the Examples are as follows.

[Substrate Layer Film]

Substrate layer film A: Multitron (produced by Tamapoly Co., Ltd., three-layer film composed of PE layer of 25 μm/non-stretched nylon layer of 20 μm/PE layer of 25 μm)

[Low-Elution Polyethylene and High-Elution Polyethylene]

TABLE 13

| Elution property | Polyethylene used as film material | Supplier | Type of resin | Density [g/cm$^3$] | MFR [g/10 minutes] | Concentration of eluting TOC in film [ppm] | Pinhole resistance [holes] |
|---|---|---|---|---|---|---|---|
| Low elution | Ultzex1520L | Prime Polymer Co., Ltd. | C6-LLDPE | 0.916 | 2.3 | 96 | 6.5 |
|  | Ultzex2021L | Prime Polymer Co., Ltd. | C6-LLDPE | 0.920 | 2.0 | 64 | 24.5 |
|  | Ultzex3500ZA | Prime Polymer Co., Ltd. | C6-LLDPE | 0.919 | 2.1 | 43 | 17.0 |
|  | KernelKF271 | Mitsubishi Chemical Corporation | Ethylene/α-olefin copolymerization | 0.913 | 2.4 | 96 | 13.0 |
|  | KernelKF283 | Mitsubishi Chemical Corporation | Ethylene/α-olefin copolymerization | 0.921 | 2.5 | 99 | 29.0 |
|  | Umerit125NF | Ube-Maruzen Polyethylene Co., Ltd. | C6, CB-LLDPE | 0.924 | 2.2 | 92 | 59.0 |
|  | Ultzex3520L | Prime Polymer Co., Ltd. | C6-LLDPE | 0.931 | 2.1 | 42 | 132 |
|  | Neo-Zex3510F | Prime Polymer Co., Ltd. | C4-LLDPE | 0.933 | 1.6 | 52 | 150 |
| High elution | EvolueSP2020 | Prime Polymer Co., Ltd. | C6-LLDPE | 0.916 | 2.1 | 263 | 17.5 |

[Odor Adsorbent]

/Kesmon NS-241: inorganic porous material carrying amino group-containing compound thereon, produced by Toagosei Co., Ltd. Average particle size of 3.5 μm.

/Dushlite M: manufactured by Sinanen Zeomic Co., Ltd., inorganic porous material carrying amino group-containing compound thereon. Average particle size of 6 to 7 μm.

/KD-311: produced by Rasa Industries Ltd., inorganic porous material having an amino group. Particle size of 10 μm or smaller.

The masterbatch was produced by adjustment in the following way.

[Adjustment of Masterbatch 1]

Ultzex 1520L which is LLDPE of the low-elution polyethylene and Kesmon NS-241 which is an odor adsorbent were melt-blended at the following ratio, and a masterbatch 1 (MB1) was obtained.

| | |
|---|---|
| Ultzex 1520L | 90 parts by mass |
| Kesmon NS-241 | 10 parts by mass |

[Adjustment of Masterbatches 2 to 5]

Materials according to combinations in Table 14 were melt-blended in the same manner as that in the masterbatch 1, and masterbatches 2 to 5 (MB2 to MB5) were obtained.

TABLE 14

| | | | Masterbatch | | | | |
|---|---|---|---|---|---|---|---|
| | Name | — | MB1 | MB2 | MB3 | MB4 | MB5 |
| Polyethylene | Ultzex 1520L | Parts by mass | 90 | | | | |
| | Novatec LC600A | Parts by mass | | 90 | 90 | 90 | 80 |
| Odor adsorbent | Kesmon NS241 | Parts by mass | 10 | 10 | | | 20.0 |
| | Dushlite M | Parts by mass | | | 10 | | |
| | KD-311 | Parts by mass | | | | 10 | |

Example 1

The masterbatch 1 obtained in the above description and Ultzex 1520L were dry-blended at the following ratio, and a mixture for an odor adsorption layer was obtained.

| | |
|---|---|
| Masterbatch 1 | 16.7 parts by mass |
| Ultzex 1520L | 83.3 parts by mass |

Then, a sealant film was obtained which had a three-layer structure composed of non-odor adsorption layer of 10 μm/odor adsorption layer of 30 μm/non-odor adsorption layer of 10 μm, by laminating the mixture obtained in the above description and Ultzex 1520L for the non-odor adsorption layer on each other by inflation film formation at 160° C.

Next, the sealant film obtained in the above description and the substrate layer film A were laminated on each other by EC (extrusion coating) of a material for an adhesive layer under the following conditions to obtain a film-shaped laminate: and the obtained laminate was subjected to the evaluation of the film-forming properties, the piercing strength, the pinhole resistance, the concentration of eluted TOC (adsorption effect), and the change in odor and taste, at the time when used as a packaging material. The detailed structure of the laminate and the evaluation results are shown in Table 15.

(Outline of Layer Structure of Laminate)

Substrate layer film A (70 μm)/EC layer (15 μm)/sealant layer (50 μm) (135 μm thick in total)

(Lamination Condition)

Extrusion temperature: 330° C.

Material for adhesive layer: LDPE (Novatec LC520)

Thickness of adhesive layer: 15 μm

Examples 2 to 13 and Comparative Examples 2 and 3

Sealant films were obtained according to the combinations shown in Table 15, in the same manner as that in Example 1, and laminates were produced and evaluated. The detailed structure of the laminate and the evaluation results are shown in Tables 15 and 16.

Example 14

The masterbatch 2 obtained in the above description and Ultzex 1520L for the non-odor adsorption layer were dry-blended at the following ratio, and a mixture for an odor adsorption layer was obtained.

| | |
|---|---|
| Masterbatch 2 | 16.7 parts by mass |
| Ultzex 1520L | 83.3 parts by mass |

A laminate having the following layer structure was obtained using the above mixture, Ultzex 1520L and Ultzex 2021L, a non-stretched nylon (UBE 5033B, polyamide 6/66 copolymer, produced by Ube Industries, Ltd.), and modified polyolefin (produced by Mitsui Chemicals Inc., Admer NF557) as an adhesive layer for the non-stretched nylon layer, by an inflation film method; and the obtained laminate was subjected to the evaluation of the piercing strength, the pinhole resistance, the concentration of eluted TOC, and the change in odor and taste, at the time when the laminate was used as a packaging material. The evaluation results are shown in Table 16.

(Layer Structure of Laminate)

Ultzex 2021L (10 μm)/Ultzex 1520L (30 μm)/adhesive layer of 10 μm/non-stretched nylon layer (20 μm)/adhesive layer of 10 μm/odor adsorption layer (30 μm)/Ultzex 2021L (10 μm) (120 μm thick in total)

Comparative Example 1

A sealant film (50 μm) was obtained with the use of Evolue SP2020 which is a high-elution polyethylene LLDPE, by inflation film formation at 160° C.

Next, this sealant film was laminated with the substrate film A in the same manner as that in Example 1, and thereby a laminate was obtained, and was evaluated in the same manner as that in Example 1. The detailed layer structure of the laminate and the evaluation results are shown in Table 16.

<Evaluation>

[Film-Forming Property]

The appearances of the sealant and the laminate were observed and were organoleptically evaluated. The evaluation criteria are as follows.

Good: The sealant and the laminate could be film-formed without the occurrence of a crease and/or a rash.

Poor: Many creases and rashes were formed on the sealant and the laminate, and film formation was difficult.

[Heat Sealability]

Each of the laminates produced in Examples and Comparative Examples was cut into 10 cm×10 cm, and the cut laminate was folded in half and overlaid so that the sides of the odor adsorption layer faced each other (arbitrarily for Comparative Examples 1 and 2); and a sample was produced in which a region of 1 cm×10 cm was heat-sealed using Heat Seal Tester (manufactured by Tester Sangyo Co., Ltd.: TP-701-A) (in a state in which the edges were not bonded to each other without being heat-sealed, and were bifurcated). This sample was cut into a strip having a width of 15 mm, and each of bifurcated edges was attached to a tensile tester, and the tensile strength (N/15 mm) was measured.

Heat-Sealing Conditions
Temperature: 160° C.
Pressure: 1 kgf/cm$^2$
Time period: 1 second
Conditions of Tensile Strength Test
Test speed: 300 mm/min
Load range: 50N
Determination of Passes and Fails
Good: 30 N/15 mm or higher, and pass
Poor: Lower than 30 N/15 mm, and failure

[Piercing Strength]

The laminates produced in Examples and Comparative Examples were cut, and strips of 120 mm×80 mm were produced and were used as test samples. The piercing strength of each of the test samples was measured using a tensile compression tester (SA-1150 manufactured by Orientec Corporation), by a method according to JISZ17071997.

[Pinhole Resistance]

The laminates produced in Examples and Comparative Examples were cut into A4 size (30 cm×21 cm), the cut film or the cut laminate was flexed with Gelvo type Flex-Cracking Tester (BE-1005, manufactured by Tester Sangyo Co., Ltd.), and then the number of generated pinholes in a plane of 30 cm×21 cm of each sample was counted.

Temperature: 23° C.
Number of flexings by Gelbo: 5000 times

[Adsorption Effect]

(Increment of TOC Concentration of Filling Water)

A package of a pouch bag (15 cm×44 cm) was produced using each of the resin films or the laminates which were produced in Examples and Comparative Examples. The inner surface of the pouch bag was previously subjected to the sterilization treatment by UV irradiation.

Then, 1000 g of water at 65° C. (distilled water for high performance liquid chromatography, Junsei Chemical Co., Ltd.) was packed into each of the obtained packages to produce a liquid-filled package. The liquid-filled package was stored at 35° C. for 2 weeks, and then the concentration of TOC in the filling water was measured with a TOC-L total organic carbon meter manufactured by Shimadzu Corporation.

Next, the TOC concentration of water before filling was also measured in the same manner.

The increment of the TOC concentration in each package was determined from the following expression.

increment of TOC concentration=TOC concentration of filling water after storage−TOC concentration of water before filling TOC concentration of water before filling: 0.02 ppm
Conditions of Sterilization Treatment by UV Irradiation
UV wavelength: 253.7 nm
Irradiation time period: 10 seconds
Temperature: 25° C.

(Change in Odor and Taste)

A pouch bag (13 cm×17 cm) was produced using each of the laminates obtained in Examples and Comparative Example. The inner surface of the pouch bag was previously subjected to the sterilization treatment by UV irradiation. The conditions of the sterilization treatment by UV irradiation were set so as to be the same as the evaluation conditions for the TOC elution concentration.

Into the obtained pouch bag, 100 g of water (produced by Suntory Holdings Limited, Natural Water in Japan) heated to 65° C. was hot-packed to produce a liquid-filled package. After that, the liquid-filled package was stored at 10° C. for one week, and then was subjected to the organoleptic evaluation.

The evaluation indices are as follows. The number of participants in the organoleptic evaluation experiment was five; and the average value was calculated and was determined to be the evaluation result.

1: Odor and taste are strong.
2: Odor and taste are somewhat reduced.
3: Odor and taste are greatly reduced.
4: Being equivalent to natural water before filling.

TABLE 15

| | | | | | Example | | | | | | | |
|---|---|---|---|---|---|---|---|---|---|---|---|---|
| | | | | Unit | 1 | 2 | 3 | 4 | 5 | 6 | 7 | 8 |
| Film structure | Masterbatch component | Name | | — | MB1 | MB2 | MB2 | MB2 | MB2 | MB2 | MB2 | MB2 |
| | | Polyethylene | Ultzex1520L | Parts by mass | 90 | | | | | | | |
| | | | NovatecLC600A | Parts by mass | | 90 | 90 | 90 | 90 | 90 | 90 | 90 |
| | | Odor absorbent | KesmonNS241 | Parts by mass | 10 | 10 | 10 | 10 | 10 | 10 | 10 | 10 |
| | | | DushliteM | Parts by mass | | | | | | | | |
| | | | KD-311 | Parts by mass | | | | | | | | |
| | Odor adsorption layer | Materbatch | | Parts by mass | 16.7 | 16.7 | 16.7 | 16.7 | 16.7 | 16.7 | 16.7 | 16.7 |
| | | Polyethylene | Ultzex1520L | Parts by mass | 83.3 | 83.3 | | | | | | |
| | | | Ultzex2021L | Parts by mass | | | 83.3 | | | | | |
| | | | Ultzex3500ZA | Parts by mass | | | | 83.3 | | | | |
| | | | KernelKF271 | Parts by mass | | | | | 83.3 | | | |
| | | | KernelKF283 | Parts by mass | | | | | | 83.3 | | |
| | | | Umerit125NF | Parts by mass | | | | | | | 83.3 | |

TABLE 15-continued

| | | | | Unit | Example 1 | 2 | 3 | 4 | 5 | 6 | 7 | 8 |
|---|---|---|---|---|---|---|---|---|---|---|---|---|
| Layer thickness | Substrate layer | PE layer | Ultzex3520L | Parts by mass | | | | | | | | 83.3 |
| | | | Neo-Zex3510F | Parts by mass | | | | | | | | |
| | | | EvolueSP2020 | Parts by mass | | | | | | | | |
| | | | Ultzex2021L | μm | | | | | | | | |
| | | | Ultzex1520L | μm | | | | | | | | |
| | | Adhesive layer | AdmerNF557 | μm | | | | | | | | |
| | | Substrate layer film A | PE layer | μm | 25 | 25 | 25 | 25 | 25 | 25 | 25 | 25 |
| | | | non-stretched nylon layer | μm | 20 | 20 | 20 | 20 | 20 | 20 | 20 | 20 |
| | | | PE layer | μm | 25 | 25 | 25 | 25 | 25 | 25 | 25 | 25 |
| | | Non-stretched nylon | UBE50338 | μm | | | | | | | | |
| | Adhesive layer (EC layer) | | NovatecLC520 | μm | 15 | 15 | 15 | 15 | 15 | 15 | 15 | 15 |
| | Adhesive layer | | AdmerNF557 | μm | | | | | | | | |
| | Sealant layer | Non-odor adsorption layer | Ultzex2021L | μm | | | | 10 | | | | |
| | | | Ultzex1520L | μm | 10 | 10 | | | | | | |
| | | | Ultzex3500ZA | μm | | | 10 | | | | | |
| | | | KernelKF271 | μm | | | | | 10 | | | |
| | | | KernelKF283 | μm | | | | | | 10 | | |
| | | | Umerit125NF | μm | | | | | | | 10 | |
| | | | Ultzex3520L | μm | | | | | | | | 10 |
| | | | Neo-Zex3510F | μm | | | | | | | | |
| | | | EvolueSP2020 | μm | | | | | | | | |
| | | Odor adsorption layer | | μm | 30 | 30 | 30 | 30 | 30 | 30 | 30 | 30 |
| | | Non-odor adsorption layer | Ultzex2021L | μm | 10 | 10 | | | | | | |
| | | | Ultzex1520L | μm | | | 10 | | | | | |
| | | | Ultzex3500ZA | μm | | | | 10 | | | | |
| | | | KernelKF271 | μm | | | | | 10 | | | |
| | | | KernelKF283 | μm | | | | | | 10 | | |
| | | | Umerit125NF | μm | | | | | | | 10 | |
| | | | Ultzex3520L | μm | | | | | | | | 10 |
| | | | Neo-Zex3510F | μm | | | | | | | | |
| | | | EvolueSP2020 | μm | | | | | | | | |
| | Total | | | μm | 135 | 135 | 135 | 135 | 135 | 135 | 135 | 135 |
| Characteristics | Odor adsorption layer film of simple body of polyethylene | Increment of TOC concentration of filling water | Article unirradiated with UV | ppm | 0.6 | 0.6 | 0.4 | 0.2 | 0.6 | 0.6 | 0.5 | 0.3 |
| | | | Article irradiated with UV | ppm | 0.7 | 0.7 | 0.5 | 0.3 | 0.7 | 0.7 | 0.6 | 0.3 |
| | | Pinhole resistance | | Holes | 6.5 | 7.0 | 24.5 | 17.0 | 13.0 | 29.0 | 59.0 | 132.0 |
| | Odor adsorbent | Content in whole sealant film | | % by mass | 1.0 | 1.0 | 1.0 | 1.0 | 1.0 | 1.0 | 1.0 | 1.0 |
| | | Average particle size | | μm | 4 | 4 | 4 | 4 | 4 | 4 | 4 | 4 |
| Evaluation results | Film-forming properties | | | — | ○ | ○ | ○ | ○ | ○ | ○ | ○ | ○ |
| | Sealing strength | | | — | ○ | ○ | ○ | ○ | ○ | ○ | ○ | ○ |
| | Piercing strength | | | N | 6.3 | 6.7 | 6 | 6.5 | 6.2 | 6.7 | 6.5 | 7.5 |
| | Pinhole resistance | | | Holes | 1 | 1 | 4 | 3 | 2 | 5 | 8 | 30 |
| | Adsorption effect | Increment of TOC concentration of filling water | | ppm | 0.65 | 0.61 | 0.43 | 0.26 | 0.65 | 0.59 | 0.49 | 0.28 |
| | | Change in odor and taste | | — | 3.0 | 3.0 | 3.0 | 3.5 | 3.0 | 3.0 | 3.0 | 3.5 |

TABLE 16

| | | | | | | Example | | | | | | Comparative Example | | |
|---|---|---|---|---|---|---|---|---|---|---|---|---|---|---|
| | | | | Unit | 9 | 10 | 11 | 12 | 13 | 14 | 1 | 2 | 3 |
| Film structure | Masterbatch component | Name | | — | MB1 | MB3 | MB4 | MB2 | MB5 | MB2 | | MB2 | MB2 |
| | | Polyethylene | Ultzex1520L | Parts by mass | | | | | | | | | |
| | | | Novatec-LC600A | Parts by mass | 90 | 90 | 90 | 90 | 80 | 90 | | 80 | |
| | | Odor absorbent | KesmonNS241 | Parts by mass | 10 | | | 10 | 20 | 10 | | 20 | 10 |

TABLE 16-continued

| | | | | Unit | Example 9 | 10 | 11 | 12 | 13 | 14 | Comparative Example 1 | 2 | 3 |
|---|---|---|---|---|---|---|---|---|---|---|---|---|---|
| Odor adsorption layer | | | DushliteM | Parts by mass | | 10 | | | | | | | |
| | | | KD-311 | Parts by mass | | | 10 | | | | | | |
| | | Masterbatch | | Parts by mass | 16.7 | 16.7 | 16.7 | 8.33 | 83.3 | 13.4 | | 85 | 5.0 |
| | | Poly-ethylene | Ultzex1520L | Parts by mass | | 83.3 | 83.3 | 91.87 | 16.7 | 86.6 | | | |
| | | | Ultzex2021L | Parts by mass | | | | | | | | | |
| | | | Ultzex3500ZA | Parts by mass | | | | | | | | | |
| | | | KernelKF271 | Parts by mass | | | | | | | | | |
| | | | KernelKF283 | Parts by mass | | | | | | | | | |
| | | | Umerit125NF | Parts by mass | | | | | | | | | |
| | | | Ultzex3520L | Parts by mass | | | | | | | | | |
| | | | Neo-Zex3510F | Parts by mass | 83.3 | | | | | | | | |
| | | | EvolueSP2020 | Parts by mass | | | | | | | | 15 | 95.0 |
| Layer thickness | Substrated layer | PE layer | Ultzex2021L | μm | | | | | | 10 | | | |
| | | | Ultzex1520L | μm | | | | | | 30 | | | |
| | | Adhesive layer | AdmerNF557 | μm | | | | | | 10 | | | |
| | | Substrate film A | PE layer | μm | 25 | 25 | 25 | 25 | 25 | | 25 | 25 | 25 |
| | | | non-stretched nylon layer | μm | 20 | 20 | 20 | 20 | 20 | | 20 | 20 | 20 |
| | | | PE layer | μm | 25 | 25 | 25 | 25 | 25 | | 25 | 25 | 25 |
| | | Non-stretched nylon | UBE50338 | μm | | | | | | 20 | | | |
| | Adhesive layer (EC layer) | | NovatecLC520 | μm | 15 | 15 | 15 | 15 | 15 | | 15 | 15 | 15 |
| | Adhesive layer | | AdmerNF557 | μm | | | | | | 10 | | | |
| | Sealant layer | Non-odor adsorption layer | Ultzex2021L | μm | | | | | | | | | |
| | | | Ultzex1520L | μm | | 10 | 10 | 10 | 10 | | | | |
| | | | Ultzex3500ZA | μm | | | | | | | | | |
| | | | KernelKF271 | μm | | | | | | | | | |
| | | | KernelKF283 | μm | | | | | | | | | |
| | | | Umerit125NF | μm | | | | | | | | | |
| | | | Ultzex3520L | μm | | | | | | | | | |
| | | | Neo-Zex3510F | μm | 10 | | | | | | | | |
| | | | EvolueSP2020 | μm | | | | | | | 50 | | 10 |
| | | Odor adsorption layer | | μm | 30 | 30 | 30 | 30 | 30 | 30 | | 50 | 30 |
| | | Non-odor adsorption layer | Ultzex1520L | μm | | | | 10 | | 10 | | | |
| | | | Ultzex2021L | μm | | 10 | 10 | | 10 | | | | |
| | | | Ultzex3500ZA | μm | | | | | | | | | |
| | | | KernelKF271 | μm | | | | | | | | | |
| | | | KernelKF283 | μm | | | | | | | | | |
| | | | Umerit125NF | μm | | | | | | | | | |
| | | | Ultzex3520L | μm | | | | | | | | | |
| | | | Neo-Zex3510F | μm | 10 | | | | | | | | |
| | | | EvolueSP2020 | μm | | | | | | | | | 10 |
| Total | | | | μm | 135 | 135 | 135 | 135 | 135 | 120 | 135 | 135 | 135 |

TABLE 16-continued

|  |  |  |  |  | Example | | | | | | Comparative Example | | |
|---|---|---|---|---|---|---|---|---|---|---|---|---|---|
|  |  |  |  | Unit | 9 | 10 | 11 | 12 | 13 | 14 | 1 | 2 | 3 |
| Characteristics | Odor adsorption layer film of simple body of polyethylene | Increment of TOC concentration of filling water | Article unirradiated with UV | ppm | 0.3 | 0.6 | 0.6 | 0.6 | 0.6 | — | 1.6 | 1.6 | 1.6 |
|  |  |  | Article irradiated with UV | ppm | 0.4 | 0.7 | 0.7 | 0.7 | 0.7 | — | 2.4 | 2.4 | 2.4 |
|  |  | Pinhole resistance | | Holes | 150.0 | 7.0 | 15.0 | 3.0 | 15.0 | 6.5 | 17.5 | 35.0 | 20.0 |
|  | Odor adsorbent | Content in whole sealant film | | % by mass | 1.0 | 1.0 | 1.0 | 0.5 | 10.0 | 1.0 | 0.0 | 17.5 | 0.3 |
|  |  | Average particle size | | μm | 4 | 6~7 | ≤10 | 4 | 4 | 4 |  | 4 | 4 |
| Evaluation results | Film-forming properties | | | — | ○ | ○ | ○ | ○ | ○ | ○ | ○ | x | ○ |
|  | Sealing strength | | | — | ○ | ○ | ○ | ○ | ○ | ○ | ○ | x | ○ |
|  | Piercing strength | | | N | 7.3 | 6.4 | 6.2 | 6.6 | 6.5 | 6.3 | 6.6 | 5 | 6.2 |
|  | Pinhole resistance | | | Holes | 42 | 5 | 7 | 1 | 28 | 3 | 4 | 63 | 8 |
|  | Adsorption effect | Increment of TOC concentration of filling water | | ppm | 0.34 | 0.63 | 0.70 | 0.64 | 0.45 | 0.59 | 2.83 | 0.70 | 2.59 |
|  |  | Change in odor and taste | | — | 3.5 | 3.0 | 3.0 | 3.0 | 3.0 | 3.0 | 1.0 | 3.0 | 1.0 |

Summary of Results

The packages of all Examples which used the low-elution polyethylene showed good film-forming properties, sealing strength, piercing strength, increment of the TOC concentration, and change in odor and taste.

Furthermore, Examples 1 to 7 and 10 to 14 all of which used low-elution polyethylene excellent in the pinhole resistance showed higher pinhole resistance than Examples 8 and 9 both of which used low-elution polyethylene inferior in the pinhole resistance.

In Comparative Example 1 which did not have the odor adsorption layer, the increment of the TOC concentration was large, and the change in odor and taste was also unfavorable.

Comparative Example 3 in which the odor adsorption layer did not contain the low-elution polyethylene showed good film-forming properties and sealing strength, but showed a large increment of the TOC concentration.

Laminate for Packaging Liquid Contents, in Embodiment 3

The details of the raw materials used in the Examples are as follows.

[Substrate Layer Film]

Substrate layer film A: Multitron (produced by Tamapoly Co., Ltd., three-layer film composed of PE layer of 25 μm/non-stretched nylon layer of 20 μm/PE layer of 25 μm)

[Low-Elution Polyethylene and High-Elution Polyethylene]

TABLE 17

| | Polyethylene | | | | | | |
|---|---|---|---|---|---|---|---|
| Elution property | Polyethylene used as film material | Supplier | Type of resin | Density [g/cm3] | MFR [g/10 minutes] | Concentration of eluting TOC in film [ppm] | Pinhole resistance [holes] |
| Low elution | Ultzex 1520L | Prime Polymer Co., Ltd. | C6-LLDPE | 0.916 | 2.3 | 96 | 6.5 |
|  | Ultzex 2021L | Prime Polymer Co., Ltd. | C6-LLDPE | 0.920 | 2.0 | 64 | 24.5 |
|  | Ultzex 3500ZA | Prime Polymer Co., Ltd. | C6-LLDPE | 0.919 | 2.1 | 43 | 17.0 |
|  | Kernel KF271 | Mitsubishi Chemical Corporation | Ethylene/ o-olefin copolymerization | 0.913 | 2.4 | 96 | 13.0 |
|  | Kernel KF283 | Mitsubishi Chemical Corporation | Ethylene/ o-olefin copolymerization | 0.921 | 2.5 | 99 | 29.0 |
|  | Umerit 125NF | Ube-Meruzen Polyethylene Co., Ltd. | C6, CB-LLDPE | 0.924 | 2.2 | 92 | 59.0 |
|  | Ultzex 3520L | Prime Polymer Co., Ltd. | C6-LLDPE | 0.931 | 2.1 | 42 | 132 |
|  | Neo-Zex 3510F | Prime Polymer Co., Ltd. | C6-LLDPE | 0.933 | 1.6 | 52 | 150 |
|  | Evolue SP2020 | Prime Polymer Co., Ltd. | C6-LLDPE | 0.916 | 2.1 | 263 | 17.5 |

[Odor Adsorbent]

/Kesmon NS-241: inorganic porous material carrying amino group-containing compound thereon, produced by Toagosei Co., Ltd. Average particle size of 3.5 μm.

/Dushlite M: produced by Sinanen Zeomic Co., Ltd., inorganic porous material carrying amino group-containing compound thereon. Average particle size of 6 to 7 μm.

/KD-311: produced by Rasa Industries Ltd., inorganic porous material having an amino group. Particle size of 10 μm or smaller.

[Hydrophobic Zeolite]

/Mizukasieves EX-122: produced by Mizusawa Industrial Chemicals, Ltd. Molar ratio of SiO2/AL2O3=32/1, and average particle size=2.5 to 5.5 μm.

/Silton MT100: produced by Mizusawa Industrial Chemicals, Ltd. Molar ratio of SiO2/AL2O3=100/1, and average particle size=3 to 4.5 μm.

/Silton MT400: produced by Mizusawa Industrial Chemicals, Ltd. Molar ratio of SiO2/AL2O3=400/1, and average particle size=5 to 7 μm.

/Silton MT2000: produced by Mizusawa Industrial Chemicals, Ltd. Molar ratio of SiO2/AL2O3=2000/1, and average particle size=2 to 4 μm.

/Silton MT-8000: produced by Mizusawa Industrial Chemicals, Ltd. Molar ratio of SiO2/AL2O3=8000/1, and average particle size=0.8 μm.

[Adjustment of Masterbatch]

The masterbatch was produced by adjustment in the following way.

(Adjustment of Masterbatch 1)

Ultzex 1520L which is LLDPE of the low-elution polyethylene and Kesmon NS-241 which is an inorganic porous material carrying a chemical adsorbent thereon were melt-blended at the following ratio, and a masterbatch 1 (MB1) was obtained.

| | |
|---|---|
| Ultzex 15201L | 90 parts by mass |
| Kesmon NS-241 | 10 parts by mass |

[Adjustment of Masterbatches 2 to 5]

Materials according to combinations in Table 18 were melt-blended in the same manner as that in the masterbatch 1, and masterbatches 2 to 5 (MB2 to MB5) were obtained.

Example 1

The masterbatch 1 and the masterbatch 6 which were obtained in the above description and Ultzex 1520L were dry-blended at the following ratio, and a mixture for an odor adsorption layer was obtained.

| | |
|---|---|
| Masterbatch 1 | 4.18 parts by mass |
| Masterbatch 6 | 12.52 parts by mass |
| Ultzex 1520L | 83.3 parts by mass |

Then, a sealant film was obtained which had a three-layer structure composed of non-odor adsorption layer of 10 μm/odor adsorption layer of 30 μm/non-odor adsorption layer of 10 μm, by laminating the mixture obtained in the above description and Ultzex 1520L for the non-odor adsorption layer on each other, by inflation film formation at 160° C.

Next, the sealant film obtained in the above description and the substrate layer film A were laminated on each other by EC (extrusion coating) of a material for an adhesive layer under the following conditions to obtain a film-shaped laminate: and the obtained laminate was subjected to the evaluation of the film-forming properties, the piercing strength, the pinhole resistance, the concentration of eluted TOC (adsorption effect), and the change in odor and taste, at the time when the laminate was used as a packaging material. The detailed structure of the laminate and the evaluation results are shown in Table 19.

(Outline of Layer Structure of Laminate)

Substrate layer film A (70 μm)/EC layer (15 μm)/sealant layer (50 μm) (135 μm thick in total)

(Lamination Condition)

Extrusion temperature: 330° C.

Material for adhesive layer: LDPE (Novatec LC520)

Thickness of adhesive layer: 15 μm

Examples 2 to 27 and Comparative Examples 2 and 3

Sealant films were obtained according to the combinations shown in Tables 19 to 21, in the same manner as that in Example 1, and laminates were produced and evaluated.

TABLE 18

| | | | Unit | MB1 | MB2 | MB3 | MB4 | MB5 | MB6 | MB7 | MB8 | MB9 |
|---|---|---|---|---|---|---|---|---|---|---|---|---|
| Blend ratio | Thermoplastic resin | Ultzex 1520L | Parts by mass | 90 | | | | | | | | |
| | | Novatec LC600A | Parts by mass | | 90 | 90 | 90 | 90 | 90 | 90 | 90 | 90 |
| | Inorganic porous material carrying chemical adsorbent thereon | Kesmon NS-241 | Parts by mass | 10 | 10 | | | | | | | 20 |
| | | Dushlite M | Parts by mass | | | 10 | | | | | | |
| | Hydrophobic seolite | Mizukasieves EX-122 | Parts by mass | | | | 10 | | | | | |
| | | Silton MT100 | Parts by mass | | | | | 10 | | | | |
| | | Silton MT400 | Parts by mass | | | | | | 10 | | | |
| | | Silton MT2000 | Parts by mass | | | | | | | 10 | | |
| | | Silton MT8000 | Parts by mass | | | | | | | | 10 | |

The detailed structure of the laminate and the evaluation results are shown in Tables 18 to 22.

Example 28

The masterbatch 2 obtained in the above description, masterbatch 6, and Ultzex 1520L for the non-odor adsorption layer were dry-blended at the following ratio, and a mixture for an odor adsorption layer was obtained.

| | |
|---|---|
| Masterbatch 2 | 4.18 parts by mass |
| Masterbatch 6 | 12.52 parts by mass |
| Ultzex 1520L | 83.3 parts by mass |

A laminate having the following layer structure was obtained using the above mixture, Ultzex 1520L and Ultzex 2021L, a non-stretched nylon (UBE 5033B, polyamide 6/66 copolymer, produced by Ube Industries, Ltd.), and modified polyolefin (produced by Mitsui Chemicals Inc., Admer NF557) as an adhesive layer for the non-stretched nylon, by an inflation film method; and the obtained laminate was subjected to the evaluation at the time when the laminate was used as a packaging material, in the same manner as that in Example 1. The evaluation results are shown in Table 22.

(Layer Structure of Laminate)

Ultzex 1520L (10 μm)/Ultzex 2021L (30 μm)/adhesive layer 10 μm/non-stretched nylon layer (20 μm)/adhesive layer 10 μm/odor adsorption layer (30 μm)/Ultzex 1520L (10 μm) (120 μm thick in total)

Comparative Example 1

A sealant film (50 μm) was obtained using Evolue SP2020 which is a high-elution polyethylene LLDPE, by inflation film formation at 160° C.

Next, this sealant film was laminated with the substrate film A, and thereby a laminate was obtained, and was evaluated, in the same manner as that in Example 1. The detailed layer structure of the laminate and the evaluation results are shown in Table 22.

<Evaluation>

[Film-Forming Property]

The appearance of the laminate was observed and was organoleptically evaluated. The evaluation criteria are as follows.

Good: The laminate could be film-formed without the occurrence of a crease and/or a rash.

Poor: Many creases and rashes were formed on the laminate, and film formation was difficult.

[Heat Sealability]

Each of the laminates produced in Examples and Comparative Examples was cut into 10 cm×10 cm, and the cut laminate was folded in half and overlaid so that the sides of the odor adsorption layer faced each other (arbitrarily for Comparative Examples 1 and 2); and a sample was produced in which a region of 1 cm×10 cm was heat-sealed using Heat Seal Tester (manufactured by Tester Sangyo Co., Ltd.: TP-701-A) (in a state in which the edges were not bonded to each other without being heat-sealed, and were bifurcated). This sample was cut into a strip having a width of 15 mm, and each of bifurcated edges was attached to a tensile tester, and the tensile strength (N/15 mm) was measured.

Heat-Sealing Conditions
Temperature: 160° C.
Pressure: 1 kgf/cm$^2$
Time period: 1 second
Conditions of Tensile Strength Test
Test speed: 300 mm/min
Load range: 50 N Determination of Passes and Fails
Good: 30 N/15 mm or higher, and pass
Poor: Lower than 30 N/15 mm, and failure

[Piercing Strength]

The laminates produced in Examples and Comparative Examples were cut, and strips of 120 mm×80 mm were produced and were used as test samples. The piercing strength of each of the test samples was measured using a tensile compression tester (SA-1150 manufactured by Orientec Corporation), by a method according to JISZ17071997.

[Pinhole Resistance]

Resin films or the laminates produced in Examples and Comparative Examples were cut into A4 size (30 cm×21 cm), the cut film or the cut laminate was flexed with a Gelvo type Flex-Cracking Tester (BE-1005, manufactured by Tester Sangyo Co., Ltd.), and then the number of generated pinholes in a plane of 30 cm×21 cm of each sample was counted.

Temperature: 23° C.
Number of flexings by Gelbo: 5000 times

[Adsorption Effect]

(Increment of TOC Concentration of Filling Water) A package of a pouch bag (15 cm×44 cm) was produced using each of the resin films or the laminates which were produced in Examples and Comparative Examples. The inner surface of the pouch bag was previously subjected to the sterilization treatment by UV irradiation.

Then, 1000 g of water at 65° C. (distilled water for high performance liquid chromatography, Junsei Chemical Co., Ltd.) was packed into each of the obtained packages to produce a liquid-filled package. The liquid-filled package was stored at 35° C. for 2 weeks, and then the concentration of TOC in the filling water was measured with a TOC-L total organic carbon meter manufactured by Shimadzu Corporation.

Next, the TOC concentration of water before filling was also measured in the same manner.

The increment of the TOC concentration in each package was determined from the following expression.

increment of TOC concentration=TOC concentration of filling water after storage−TOC concentration of water before filling TOC concentration of water before filling: 0.02 ppm
Conditions of Sterilization Treatment by UV Irradiation
UV wavelength: 253.7 nm
Irradiation time period: 10 seconds
Temperature: 25° C.

(Change in Odor and Taste)

A pouch bag (13 cm×17 cm) was produced using each of the laminates obtained in Examples and Comparative Examples. The inner surface of the pouch bag was previously subjected to the sterilization treatment by UV irradiation. The conditions of the sterilization treatment by UV irradiation were set so as to be the same as the evaluation conditions for the TOC elution concentration.

Into the obtained pouch bag, 100 g of water (produced by Suntory Holdings Limited, Natural Water in Japan) heated to 65° C. was hot-packed to produce a liquid-filled package. After that, the liquid-filled package was stored at 10° C. for one week, and then was subjected to the organoleptic evaluation.

The evaluation indices are as follows. The number of participants in the organoleptic evaluation experiment was five; and the average value was calculated and was determined to be the evaluation result.

1: Odor and taste are strong.
2: Odor and taste are somewhat reduced.
3: Odor and taste are greatly reduced.
4: Being equivalent to natural water before filling.

TABLE 19

| Laminate | | | | Unit | Example 1 | 2 | 3 | 4 | 5 | 6 | 7 | 8 |
|---|---|---|---|---|---|---|---|---|---|---|---|---|
| Odor adsorption layer | Masterbatch | Blend ratio of MB | MB1 | Parts by mass | 4.18 | | | | | | | |
| | | | MB2 | Parts by mass | | 4.18 | | | | | | |
| | | | MB3 | Parts by mass | | | 4.18 | | | | | |
| | | | MB4 | Parts by mass | | | | 4.18 | | | | |
| | | | MB5 | Parts by mass | | | | | 4.18 | | | |
| | | | MB6 | Parts by mass | | | | | | 4.18 | | |
| | | | MB7 | Parts by mass | 12.52 | 12.52 | 12.52 | | | | 4.18 | 4.18 |
| | | | MB8 | Parts by mass | | | | 12.52 | | | 12.52 | 12.52 |
| | | | MB9 | Parts by mass | 3.76 | | | | 12.52 | 12.52 | | |
| | Composition of MB after mixing | Low-elution polyethylene | Ultzex1520L | Parts by mass | 11.27 | 15.03 | 15.03 | 15.03 | 15.03 | 15.03 | 15.03 | 15.03 |
| | | LDPE | NovatecLC600A | Parts by mass | 0.42 | 0.42 | 0.42 | 0.42 | 0.42 | 0.42 | 0.42 | 0.42 |
| | | Inorganic porous material carrying chemical adsorbent thereon | KesmonNS241 | Parts by mass | | | 0.42 | | | | | |
| | | | Dushlite M | Parts by mass | | | | | | | | |
| | | | MizukasievesEX-122 | Parts by mass | | | | 1.25 | | | | |
| | | | SiltonMT-100 | Parts by mass | | | | | 1.25 | | | |
| | | | SiltonMT-400 | Parts by mass | | | | | | 1.25 | | |
| | | | SiltonMT-2000 | Parts by mass | | | | | | | 1.25 | |
| | | | SiltonMT-8000 | Parts by mass | | | | | | | | 1.25 |
| | | Hydrophobic zeolite | | Parts by mass | 1.25 | 1.25 | 1.25 | | | | | |
| | | Total | | Parts by mass | 16.7 | 16.7 | 16.7 | 16.7 | 16.7 | 16.7 | 16.7 | 16.7 |
| Resin component | Low-elution polyethylene | | Ultzex1520L | Parts by mass | 83.3 | 83.3 | 83.3 | 83.3 | 83.3 | 83.3 | 83.3 | 83.3 |
| | | | Ultzex2021L | Parts by mass | | | | | | | | |
| | | | Ultzex3500ZA | Parts by mass | | | | | | | | |
| | | | KernelKF271 | Parts by mass | | | | | | | | |
| | | | KernelKF283 | Parts by mass | | | | | | | | |
| | | | Umerit125NF | Parts by mass | | | | | | | | |
| | | | Ultzex3520L | Parts by mass | | | | | | | | |
| | | | Neo-Zex3510F | Parts by mass | | | | | | | | |
| | High-elution polyethylene | | EvolueSP2020 | Parts by mass | | | | | | | | |
| Layer thickness | Substrate layer | PE layer | Ultzex1520L | μm | | | | | | | | |
| | | | Ultzex2021L | μm | | | | | | | | |
| | | Adhesive layer | AdmerNF557 | μm | | | | | | | | |
| | | Substrate layer film A | PE layer | μm | 25 | 25 | 25 | 25 | 25 | 25 | 25 | 25 |
| | | | non-stretched nylon layer | μm | 20 | 20 | 20 | 20 | 20 | 20 | 20 | 20 |
| | | | PE layer | μm | 25 | 25 | 25 | 25 | 25 | 25 | 25 | 25 |
| | Non-stretched nylon | | UBE5033B | μm | | | | | | | | |
| | Adhesive layer (EC layer) | LDPE | NovatecLC600A | μm | 15 | 15 | 15 | 15 | 15 | 15 | 15 | 15 |
| | Adhesive layer | | AdmerNF557 | μm | | | | | | | | |

TABLE 19-continued

| | | | Unit | Example 1 | Example 2 | Example 3 | Example 4 | Example 5 | Example 6 | Example 7 | Example 8 |
|---|---|---|---|---|---|---|---|---|---|---|---|
| Sealant film | Non-odor adsorption layer | Low-elution polyethylene Ultzex1520L | μm | 10 | 10 | 10 | 10 | 10 | 10 | 10 | 10 |
| | | Ultzex2021L | μm | | | | | | | | |
| | | Ultzex3500ZA | μm | | | | | | | | |
| | | KernelKF271 | μm | | | | | | | | |
| | | KernelKF283 | μm | | | | | | | | |
| | | Umerit125NF | μm | | | | | | | | |
| | | Ultzex3520L | μm | | | | | | | | |
| | | Neo-Zex3510F | μm | | | | | | | | |
| | | EvolueSP2020 | μm | | | | | | | | |
| | | High-elution polyethylene | μm | | | | | | | | |
| | Odor adsorption layer | Non-odor Low-elution polyethylene Ultzex1520L | μm | 30 | 30 | 30 | 30 | 30 | 30 | 30 | 30 |
| | | Ultzex2021L | μm | 10 | 10 | 10 | 10 | 10 | 10 | 10 | 10 |
| | | Ultzex3500ZA | μm | | | | | | | | |
| | | KernelKF271 | μm | | | | | | | | |
| | | KernelKF283 | μm | | | | | | | | |
| | | Umerit125NF | μm | | | | | | | | |
| | | Ultzex3520L | μm | | | | | | | | |
| | | Neo-Zex3510F | μm | | | | | | | | |
| | | EvolueSP2020 | μm | | | | | | | | |
| | | High-elution polyethylene | μm | | | | | | | | |
| | Total | | μm | 135 | 135 | 135 | 135 | 135 | 135 | 135 | 135 |
| Characteristics | Lamination method of laminate | | — | EC | EC | EC | EC | EC | EC | EC | EC |
| | Odor adsorption layer film of simple body of polyethylene | Increment of TOC concentration of filling water | ppm | 0.59 | 0.56 | 0.56 | 0.56 | 0.56 | 0.56 | 0.56 | 0.39 |
| | | Article unirradiated with UV | ppm | 0.72 | 0.88 | 0.68 | 0.68 | 0.68 | 0.68 | 0.68 | 0.47 |
| | | Article irradiated with UV | | | | | | | | | |
| | | Pinhole resistance | Holes | 6.5 | 7.0 | 7.0 | 7.0 | 7.0 | 7.0 | 7.0 | 24.5 |
| | Inorganic porous material carrying chemical adsorbent thereon | Content in whole sealant film | % by mass | 0.3 | 0.3 | 0.3 | 0.3 | 0.3 | 0.3 | 0.3 | 0.3 |
| | | Average particle size | μm | 3.5 | 3.5 | 6~7 | 3.5 | 3.5 | 3.5 | 3.5 | 3.5 |
| | Hydrophobic zeolite | Content in whole sealant film | % by mass | 0.8 | 0.8 | 0.8 | 0.8 | 0.8 | 0.8 | 0.8 | 0.8 |
| | | Average particle size | μm | 5~7 | 5~7 | 5~7 | 2.5~9.9 | 3~4.5 | 2~4 | 0.8 | 5~7 |
| Evaluation results | Film-forming properties | | — | ○ | ○ | ○ | ○ | ○ | ○ | ○ | ○ |
| | Sealing strength | | — | ○ | ○ | ○ | ○ | ○ | ○ | ○ | ○ |
| | Pinhole resistance | | Holes | 2.0 | 3.0 | 3.0 | 4.5 | 4.5 | 3.0 | 3.5 | 11.0 |
| | Increment of TOC concentration of filling water | | ppm | 0.44 | 0.41 | 0.47 | 0.5 | 0.45 | 0.4 | 0.35 | 0.25 |
| | Change in odor and taste | | — | 3 | 3 | 3 | 3 | 3 | 3 | 3 | 3.5 |

TABLE 20

| Laminate | | | | | Unit | Example | | | | | | | |
|---|---|---|---|---|---|---|---|---|---|---|---|---|---|
| | | | | | | 9 | 10 | 11 | 12 | 13 | 14 | 15 | 16 |
| Odor adsorption layer | Masterbatch | Blend ratio of MB | | MB1 | Parts by mass | 4.18 | 4.18 | 4.18 | 4.18 | 4.18 | 4.18 | 4.18 | 12.5 |
| | | | | MB2 | Parts by mass | | | | | | | | |
| | | | | MB3 | Parts by mass | | | | | | | | |
| | | | | MB4 | Parts by mass | | | | | | | | |
| | | | | MB5 | Parts by mass | | | | | | | | |
| | | | | MB6 | Parts by mass | 12.52 | 12.52 | 12.52 | 12.52 | 12.52 | 12.52 | 12.52 | |
| | | | | MB7 | Parts by mass | | | | | | | | |
| | | | | MB8 | Parts by mass | | | | | | | | |
| | | | | MB9 | Parts by mass | | | | | | | | 4.18 |
| | | Composition of MB after mixing | Low-elution polyethylene | Ultzex1520L | Parts by mass | 15.03 | 15.03 | 15.03 | 15.03 | 15.03 | 15.03 | 15.03 | 15.01 |
| | | | LDPE | NovatecLC600A | Parts by mass | 0.42 | 0.42 | 0.42 | 0.42 | 0.42 | 0.42 | 0.42 | 1.25 |
| | | | Inorganic porous material carrying chemical adsorbent thereon | KesmonNS241 | Parts by mass | | | | | | | | |
| | | | | Dushlite M | Parts by mass | | | | | | | | |
| | | | | MizukasievesEX-122 | Parts by mass | | | | | | | | |
| | | | Hydrophobic zeolite | SiltonMT-100 | Parts by mass | 1.25 | 1.25 | 1.25 | 1.25 | 1.25 | 1.25 | 1.25 | 0.42 |
| | | | | SiltonMT-400 | Parts by mass | | | | | | | | |
| | | | | SiltonMT-2000 | Parts by mass | | | | | | | | |
| | | | | SiltonMT-8000 | Parts by mass | | | | | | | | |
| | | Total | | | Parts by mass | 16.7 | 16.7 | 16.7 | 16.7 | 16.7 | 16.7 | 16.7 | 16.7 |
| | Resin component | Low-elution polyethylene | | Ultzex1520L | Parts by mass | 83.3 | | | | | | | 83.3 |
| | | | | Ultzex2021L | Parts by mass | | | | | | | | |
| | | | | Ultzex3500ZA | Parts by mass | | 83.3 | | | | | | |
| | | | | KernelKF271 | Parts by mass | | | 83.3 | | | | | |
| | | | | KernelKF283 | Parts by mass | | | | 83.3 | | | | |
| | | | | Umerit125NF | Parts by mass | | | | | 83.3 | | | |
| | | | | Ultzex3520L | Parts by mass | | | | | | 83.3 | | |
| | | High-elution polyethylene | | Neo-Zex3510F | Parts by mass | | | | | | | 83.3 | |
| | | | | EvolueSP2020 | Parts by mass | | | | | | | | |
| Layer thickness | Substrate layer | PE layer | | Ultzex1520L | μm | | | | | | | | |
| | | | | Ultzex2021L | μm | | | | | | | | |
| | | Adhesive layer | | AdmerNF557 | μm | | | | | | | | |
| | | Substrate layer film A | | PE layer | μm | 25 | 25 | 25 | 25 | 25 | 25 | 25 | 25 |
| | | | | non-stretched nylon layer | μm | 20 | 20 | 20 | 20 | 20 | 20 | 20 | 20 |
| | | | | PE layer | μm | 25 | 25 | 25 | 25 | 25 | 25 | 25 | 25 |
| | | Non-stretched nylon | | UBE5033B | μm | | | | | | | | |
| | Adhesive layer (EC layer) | LDPE | | NovatecLC600A | μm | 15 | 15 | 15 | 15 | 15 | 15 | 15 | 15 |
| | Adhesive layer | | | AdmerNF557 | μm | | | | | | | | |

TABLE 20-continued

| | | | Unit | Example 9 | 10 | 11 | 12 | 13 | 14 | 15 | 16 |
|---|---|---|---|---|---|---|---|---|---|---|---|
| | Sealant film | Non-odor adsorption layer | Low-elution polyethylene | Ultzex1520L | μm | | | | | | | |
| | | | Ultzex2021L | μm | | | | | | | | |
| | | | Ultzex3500ZA | μm | 10 | | | | | | | |
| | | | KernelKF271 | μm | | 10 | | | | | | |
| | | | KernelKF283 | μm | | | 10 | | | | | |
| | | | Umerit125NF | μm | | | | 10 | | | | |
| | | | Ultzex3520L | μm | | | | | 10 | | | |
| | | | Neo-Zex3510F | μm | | | | | | 10 | | |
| | | High-elution polyethylene | EvolueSP2020 | μm | | | | | | | 10 | 10 |
| | Odor adsorption layer | Non-odor adsorption layer | Low-elution polyethylene | Ultzex1520L | μm | 30 | 30 | 30 | 30 | 30 | 30 | 30 | 30 |
| | | | Ultzex2021L | μm | | | | | | | | |
| | | | Ultzex3500ZA | μm | 10 | 10 | | | | | | |
| | | | KernelKF271 | μm | | | 10 | | | | | |
| | | | KernelKF283 | μm | | | | 10 | | | | |
| | | | Umerit125NF | μm | | | | | 10 | | | |
| | | | Ultzex3520L | μm | | | | | | 10 | | |
| | | | Neo-Zex3510F | μm | | | | | | | 10 | |
| | | High-elution polyethylene | EvolueSP2020 | μm | | | | | | | | 10 |
| | Total | | | μm | 135 | 135 | 135 | 135 | 135 | 135 | 135 | 135 |
| | Lamination method of laminate | | | — | EC | EC | EC | EC | EC | EC | EC | EC |
| Characteristics | Odor adsorption layer film of simple body of polyethylene | Increment of TOC concentration of filling water | Article unirradiated with UV | ppm | 0.24 | 0.60 | 0.55 | 0.46 | 0.76 | 0.32 | 1.57 | 0.56 |
| | | | Article irradiated with UV | ppm | 0.29 | 0.72 | 0.56 | 0.55 | 0.31 | 0.38 | 2.36 | 0.68 |
| | | Pinhole resistance | | Holes | 17.0 | 13.0 | 20.0 | 59.0 | 132.0 | 156.0 | 17.5 | 7.0 |
| | Inorganic porous material carrying chemical adsorbent thereon | Content in whole sealant film | | % by mass | 0.3 | 0.3 | 0.3 | 0.3 | 0.3 | 0.3 | 0.3 | 0.8 |
| | | Average particle size | | μm | 3.5 | 3.5 | 3.5 | 3.5 | 3.5 | 3.5 | 3.5 | 3.5 |
| | Hydrophobic zeolite | Content in whole sealant film | | % by mass | 0.8 | 0.8 | 0.8 | 0.8 | 0.8 | 0.8 | 0.8 | 0.3 |
| | | Average particle size | | μm | 5~7 | 5~7 | 5~7 | 5~7 | 5~7 | 5~7 | 5~7 | 5~7 |
| Evaluation results | Film-forming properties | | | — | ○ | ○ | ○ | ○ | ○ | ○ | ○ | ○ |
| | Sealing strength | | | — | ○ | ○ | ○ | ○ | ○ | ○ | ○ | ○ |
| | Pinhole resistance | | | Holes | 10 | 8 | 17 | 35 | 58 | 67 | 11 | 4 |
| | Increment of TOC concentration of filling water | | | ppm | 0.2 | 0.4 | 0.4 | 0.3 | 0.2 | 0.2 | 1.4 | 0.6 |
| | Change in odor and taste | | | — | 3.5 | 3 | 3 | 3.5 | 3.5 | 3.5 | 2.5 | 3 |

TABLE 21

| Laminate | | | | Unit | 17 | 18 | 19 | 20 | 21 | 22 | 23 | 24 |
|---|---|---|---|---|---|---|---|---|---|---|---|---|
| | | | | | | | | | | Example | | |
| Odor adsorption layer | Masterbatch | Blend ratio of MB | MB1 | Parts by mass | 20.83 | | | | | | | |
| | | | MB2 | Parts by mass | | 2.08 | | | | | | |
| | | | MB3 | Parts by mass | | | | | | | | |
| | | | MB4 | Parts by mass | | | | | | | | |
| | | | MB5 | Parts by mass | | | | | | | | |
| | | | MB6 | Parts by mass | 62.47 | 6.25 | 16.7 | 16.7 | 16.7 | 16.7 | 16.7 | 16.7 |
| | | | MB7 | Parts by mass | | | | | | | | |
| | | | MB8 | Parts by mass | | | | | | | | |
| | | | MB9 | Parts by mass | | | | | | | | |
| | | Composition of MB after mixing | Low-elution polyethylene | Ultzex1520L | | | | | | | | |
| | | | LDPE | NovatecLC600A | 74.87 | 7.50 | 15.03 | 15.03 | 15.03 | 15.03 | 15.03 | 15.03 |
| | | | Inorganic porous material carrying chemical adsorbent thereon | KesmonNS241 | 2.08 | 0.23 | | | | | | |
| | | | | Dushlite M | | | | | | | | |
| | | | Hydrophobic zeolite | MizukasievesEX-122 | | | | | | | | |
| | | | | SiltonMT-100 | 6.23 | 0.63 | 1.67 | 1.67 | 1.67 | 1.67 | 1.67 | 1.87 |
| | | | | SiltonMT-400 | | | | | | | | |
| | | | | SiltonMT-2000 | | | | | | | | |
| | | | | SiltonMT-8000 | | | | | | | | |
| | | | Total | | 83.3 | 8.3 | 16.7 | 16.7 | 16.7 | 16.7 | 16.7 | 16.7 |
| | Resin component | Low-elution polyethylene | | Ultzex1520L | 16.7 | 91.7 | 83.3 | | | | | |
| | | | | Ultzex2021L | | | | 83.3 | | | | |
| | | | | Ultzex3500ZA | | | | | 83.3 | | | |
| | | | | KernelKF271 | | | | | | 83.3 | | |
| | | | | KernelKF283 | | | | | | | 83.3 | |
| | | | | Umerit125NF | | | | | | | | 83.3 |
| | | | | Ultzex3520L | | | | | | | | |
| | | | | Neo-Zex3510F | | | | | | | | |
| | | High-elution polyethylene | | EvolueSP2020 | | | | | | | | |
| Layer thickness | Substrate layer | PE layer | | Ultzex1520L | | | | | | | | |
| | | | | Ultzex2021L | | | | | | | | |
| | | Adhesive layer | | AdmerNF557 | | | | | | | | |
| | | Substrate layer film A | PE layer | | 25 | 25 | 25 | 25 | 25 | 25 | 25 | 25 |
| | | | non-stretched nylon layer | μm | 20 | 20 | 20 | 20 | 20 | 20 | 20 | 20 |
| | | | PE layer | μm | 25 | 25 | 25 | 25 | 25 | 25 | 25 | 25 |
| | | Non-stretched nylon | | UBE5033B | 15 | 15 | 15 | 15 | 15 | 15 | 15 | 15 |
| | Adhesive layer (EC layer) | LDPE | | NovatecLC600A | | | | | | | | |
| | Adhesive layer | | | AdmerNF557 | μm | | | | | | | |

TABLE 21-continued

| | | | Unit | Example 17 | 18 | 19 | 20 | 21 | 22 | 23 | 24 |
|---|---|---|---|---|---|---|---|---|---|---|---|
| Sealant film | Non-odor adsorption layer | Low-elution polyethylene | | | | | | | | | |
| | | Ultzex1520L | μm | 10 | | | | | | | |
| | | Ultzex2021L | μm | | 10 | | | | | | |
| | | Ultzex3500ZA | μm | | | 10 | | | | | |
| | | KernelKF271 | μm | | | | 10 | | | | |
| | | KernelKF283 | μm | | | | | 10 | | | |
| | | Umerit125NF | μm | | | | | | 10 | | |
| | | High-elution polyethylene | | | | | | | | | |
| | | Ultzex3520L | μm | | | | | | | 10 | |
| | | Neo-Zex3510F | μm | | | | | | | | 10 |
| | | EvolueSP2020 | μm | | | | | | | | |
| | Odor adsorption layer | Low-elution polyethylene | | | | | | | | | |
| | | Ultzex1520L | μm | 30 | 30 | 30 | 30 | 30 | 30 | 30 | 30 |
| | | Ultzex2021L | μm | 10 | 10 | 10 | | | | | |
| | | Ultzex3500ZA | μm | | | | 10 | | | | |
| | | KernelKF271 | μm | | | | | 10 | | | |
| | | KernelKF283 | μm | | | | | | 10 | | |
| | | Umerit125NF | μm | | | | | | | 10 | |
| | | High-elution polyethylene | | | | | | | | | |
| | | Ultzex3520L | μm | | | | | | | | |
| | | Neo-Zex3510F | μm | | | | | | | | 10 |
| | | EvolueSP2020 | μm | | | | | | | | |
| Total | | | μm | 135 | 135 | 135 | 135 | 135 | 135 | 135 | 135 |
| Lamination method of laminate | | | — | EC | EC | EC | EC | EC | EC | EC | EC |
| Characteristics | Odor adsorption layer film of simple body of polyethylene | Increment of TOC concentration of filling water | ppm | 0.56 | 0.56 | 0.56 | 0.39 | 0.24 | 0.60 | 0.53 | 0.46 |
| | | Article unirradiated with UV | ppm | | | | | | | | |
| | | Article irradiated with UV | ppm | 0.68 | 0.68 | 0.68 | 0.47 | 0.28 | 0.72 | 0.65 | 0.55 |
| | | Pinhole resistance | Holes | 7.0 | 7.0 | 7.0 | 24.5 | 17.0 | 13.0 | 25.0 | 59.0 |
| | Inorganic porous material carrying chemical adsorbent thereon | Content in whole sealant film | % by mass | 1.2 | 0.1 | 0.0 | 0.0 | 0.0 | 0.0 | 0.0 | 0.0 |
| | | Average particle size | μm | 3.5 | 3.5 | — | — | — | — | — | — |
| | Hydrophobic zeolite | Content in whole sealant film | % by mass | 3.8 | 0.4 | 1.0 | 1.0 | 1.0 | 1.0 | 1.0 | 1.0 |
| | | Average particle size | μm | 5~7 | 5~7 | 5~7 | 5~7 | 5~7 | 5~7 | 5~7 | 5~7 |
| Evaluation results | Film-forming properties | | — | ○ | ○ | ○ | ○ | ○ | ○ | ○ | ○ |
| | Sealing strength | | — | ○ | ○ | ○ | ○ | ○ | ○ | ○ | ○ |
| | Pinhole resistance | | Holes | 6 | 1 | 5 | 13 | 9 | 8 | 12 | 26 |
| | Increment of TOC concentration of filling water | | ppm | 0.1 | 0.7 | 0.2 | 0.1 | 0.1 | 0.2 | 0.2 | 0.2 |
| | Change in odor and taste | | — | 3.5 | 3 | 3.5 | 3.5 | 3.5 | 3.5 | 3.5 | 7.5 |

TABLE 22

| Laminate | | | | Unit | Example 25 | Example 26 | Example 27 | Example 28 | Comparative Example 1 | Comparative Example 2 | Comparative Example 3 |
|---|---|---|---|---|---|---|---|---|---|---|---|
| Odor adsorption layer | Masterbatch | Blend ratio of MB | MB1 | Parts by mass | | | | | | | |
| | | | MB2 | Parts by mass | | | | 4.18 | | | |
| | | | MB3 | Parts by mass | | | | | | | |
| | | | MB4 | Parts by mass | | | | | | | |
| | | | MB5 | Parts by mass | | | | | | 16.7 | |
| | | | MB6 | Parts by mass | 16.7 | 16.7 | 16.7 | 12.52 | | | |
| | | | MB7 | Parts by mass | | | | | | | |
| | | | MB8 | Parts by mass | | | | | | | |
| | | | MB9 | Parts by mass | | | | | | | 77.3 |
| | | Composition of MB after mixing | Low-elution polyethylene Ultzex1520L | Parts by mass | | | | | | | |
| | | | LDPE NovatecLC600A | Parts by mass | 15.03 | 15.03 | 15.03 | 12.06 | | 15.03 | 60.00 |
| | | | Inorganic porous material carrying chemical adsorbent thereon KesmonNS-241 | Parts by mass | | | | 0.34 | | | 17.50 |
| | | | Dushlite M | Parts by mass | | | | | | 1.67 | |
| | | | Hydrophobic zeolite MizukasievesEX-122 | Parts by mass | | | | | | | |
| | | | SiltonMT-100 | Parts by mass | | | | | | | |
| | | | SiltonMT-400 | Parts by mass | 1.67 | 1.67 | 1.67 | 1.00 | | | |
| | | | SiltonMT-2000 | Parts by mass | | | | | | | |
| | | | SiltonMT-8000 | Parts by mass | | | | | | | |
| | Resin component | | Low-elution polyethylene Ultzex1520L | Parts by mass | 16.7 | 16.7 | 16.7 | 13.4 | 0.0 | 16.7 | 77.5 |
| | | | Ultzex2021L | Parts by mass | | | | 86.6 | | | |
| | | | Ultzex3500ZA | Parts by mass | | | | | | | |
| | | | KernelKF271 | Parts by mass | | | | | | | |
| | | | KernelKF283 | Parts by mass | | | | | | | |
| | | | Umerit125NF | Parts by mass | | | | | | | |
| | | | Ultzex3520L | Parts by mass | | | | | | | |
| | | | Neo-Zex3510F | Parts by mass | 83.3 | 83.3 | | | | | |
| | | | Total | Parts by mass | | | | | 100.0 | | |
| | | | High-elution polyethylene EvolueSP2020 | Parts by mass | | | 83.3 | | | 83.3 | 22.5 |
| Layer thickness | Substrate layer | | PE layer Ultzex1520L | μm | 25 | 25 | 25 | 10 | 25 | 25 | 25 |
| | | | Ultzex2021L | μm | 20 | 20 | 20 | 30 | 20 | 20 | 20 |
| | | | Adhesive layer AdmerNF557 | μm | 25 | 25 | 25 | 10 | 25 | 25 | 25 |
| | | | Substrate layer film A PE layer | μm | | | | | | | |
| | | | non-stretched nylon layer | μm | | | | 20 | | | |
| | | | PE layer | μm | | | | | | | |
| | Adhesive layer (EC layer) | | Non-stretched nylon UBE5033B | μm | | | | | | | |
| | | | LDPE NovatecLC600A | μm | 15 | 15 | 15 | 10 | 15 | 15 | 15 |
| | Adhesive layer | | AdmerNF557 | μm | | | | | | | |

TABLE 22-continued

| | | | | Unit | Example 25 | 26 | 27 | 28 | Comparative Example 1 | 2 | 3 |
|---|---|---|---|---|---|---|---|---|---|---|---|
| Sealant film | Non-odor adsorption layer | Low-elution polyethylene | Ultzex1520L | μm | | | | | | | |
| | | | Ultzex2021L | μm | | | | | | | |
| | | | Ultzex3500ZA | μm | | | | | 50 | | |
| | | | KernelKF271 | μm | | | | | | | |
| | | | KernelKF283 | μm | | | | | | | |
| | | | Umerit125NF | μm | | | | | | | |
| | | | Ultzex3520L | μm | 10 | 10 | 10 | | | 10 | |
| | | | Neo-Zex3510F | μm | | | | | | | 30 |
| | | | EvolueSP2020 | μm | | | | 30 | | | |
| | Odor adsorption layer | High-elution polyethylene | | μm | 30 | 30 | 30 | | | 30 | |
| | Non-odor adsorption layer | Low-elution polyethylene | Ultzex1520L | μm | | | | | | | |
| | | | Ultzex2021L | μm | | | | | | | |
| | | | Ultzex3500ZA | μm | | | | | | | |
| | | | KernelKF271 | μm | | | | | | | |
| | | | KernelKF283 | μm | | | | | | | |
| | | | Umerit125NF | μm | | | | | | | |
| | | | Ultzex3520L | μm | 10 | 10 | 10 | | | 10 | |
| | | | Neo-Zex3510F | μm | | | | | | | |
| | | High-elution polyethylene | EvolueSP2020 | μm | | | | 10 | | | |
| | Total | | | μm | 135 | 135 | 135 | 120 | 135 | 135 | 135 |
| Characteristics | Lamination method of laminate | | | — | EC | EC | EC | operation method | EC | EC | EC |
| | Odor adsorption layer film of simple body of polyethylene | Increment of TOC concentration of filling water | Article unirradiated with UV | ppm | 0.26 | 0.32 | 1.57 | — | 1.57 | 1.57 | 1.57 |
| | | | Article irradiated with UV | ppm | 0.3 | 0.4 | 2.4 | — | 2.4 | 2.4 | 2.4 |
| | | Pinhole resistance | | Holes | 132.0 | 150.0 | 17.5 | — | 17.5 | 17.5 | 17.5 |
| | | Content in whole sealant film | | % by mass | 0.0 | 0.0 | 0.0 | 0.3 | 0.0 | 1.0 | 17.5 |
| | Inorganic porous material carrying chemical adsorbent thereon | Average particle size | | μm | — | — | — | 3.5 | — | 6~7 | 3.5 |
| | Hydrophobic zeolite | Content in whole sealant film | | % by mass | 1.0 | 1.0 | 1.0 | 0.8 | 0.0 | 0.0 | 0.0 |
| | | Average particle size | | μm | 5~7 | 5~7 | 5~7 | 5~7 | — | — | — |
| Evaluation results | Film-forming properties | | | — | ○ | ○ | ○ | ○ | ○ | ○ | × |
| | Sealing strength | | | — | ○ | ○ | ○ | ○ | ○ | ○ | × |
| | Pinhole resistance | | | Holes | 55 | 69 | 14 | 2 | 10 | 15 | 69 |
| | Increment of TOC concentration of filling water | | | ppm | 0.1 | 0.1 | 0.7 | 0.7 | 2.8 | 2.3 | 0.0 |
| | Change in odor and taste | | | — | 3.5 | 3.5 | 3 | 3.5 | 1 | 1 | 3 |

Summary of Results

The packages of all Examples which used the low-elution polyethylene showed good film-forming properties, sealing strength, piercing strength, increment of the TOC concentration, and change in odor and taste.

Furthermore, Examples 1 to 12, 15 to 24, 27 and 28 all of which used low-elution polyethylene excellent in the pinhole resistance showed higher pinhole resistance than Examples 13, 14, 25 and 26 all of which used low-elution polyethylene inferior in the pinhole resistance.

In Comparative Example 1 which did not have the odor adsorption layer and Comparative Example 2 which did not contain the hydrophobic zeolite and low-elution polyethylene in the odor adsorption layer, the increment of the TOC concentration was large, and the change in odor and taste was also unfavorable.

In addition, Comparative Example 3 in which the odor adsorption layer did not contain hydrophobic zeolite and low-elution polyethylene but contained more than 15% by mass of an odor adsorbent showed the results of being capable of reducing the increment of the TOC concentration but being inferior in the film-forming properties, the sealing strength and the pinhole resistance.

Laminate for Packaging Liquid Contents, in Embodiment 4

The details of the raw materials used in the Examples are as follows.

[Low-Elution Polyethylene]

/Low-elution polyethylene 1: Ultzex 1520L, produced by Prime Polymer Co., Ltd. C6-LLDPE, density of 0.916 g/cm$^3$, and MFR of 2.3 g/10 minutes. Concentration of luting TOC of 0.56 ppm.

/Low-elution polyethylene 2: Ultzex 2021L, produced by Prime Polymer Co., Ltd. C6-LLDPE, density of 0.920 g/cm$^3$, and MFR of 2.0 g/10 minutes. Concentration of eluting TOC of 0.39 ppm.

/Low-elution polyethylene 3: Kernel KF283, produced by Mitsubishi Chemical Corporation. Ethylene/α-olefin copolymer, density of 0.921 g/cm$^3$, and MFR of 2.5 g/10 minutes. Concentration of eluting TOC of 0.55 ppm.

/Low-elution polyethylene 4: Ultzex 3520L, produced by Prime Polymer Co., Ltd. C6-LLDPE, density of 0.931 g/cm$^3$, and MFR of 2.1 g/10 minutes. Concentration of eluting TOC of 0.26 ppm.

/Low-elution polyethylene 5: Neo-Zex 3510F, produced by Prime Polymer Co., Ltd. C4-LLDPE, density of 0.933 g/cm$^3$, and MFR of 1.6 g/10 minutes. Concentration of eluting TOC of 0.32 ppm.

[General-Purpose Polyethylene]

/General-purpose polyethylene 1: Novatec LC600A, produced by Japan Polyethylene Corporation. LDPE. Density of 0.918 g/cm$^3$, and MFR of 7 g/10 minutes.

/General-purpose polyethylene 2: Evolue SP2020, produced by Prime Polymer Co., Ltd. C6-LLDPE, density of 0.916 g/cm$^3$, and MFR of 2.1 g/10 minutes.

[Odor Adsorbent]

/Hydrophobic zeolite 1: Mizukasieves EX-122, hydrophobic zeolite produced by Mizusawa Industrial Chemicals, Ltd. Molar ratio of SiO2/AL2O3=32/1, and average particle size=2.5 to 5.5 μm.

/Hydrophobic zeolite 2: Silton MT400, hydrophobic zeolite produced by Mizusawa Industrial Chemicals, Ltd. Molar ratio of SiO2/AL2O3=400/1, and average particle size=5 to 7 μm.

/Hydrophobic zeolite 3: Silton MT-8000, hydrophobic zeolite produced by Mizusawa Industrial Chemicals, Ltd. Molar ratio of SiO2/AL2O3=8000/1, and average particle size=0.8 μm.

/Inorganic porous material carrying chemical adsorbent 1 thereon: Kesmon NS-241, produced by Toagosei Co., Ltd. Inorganic porous material carrying amino group-containing compound thereon. Average particle size of 3.5 μm.

/Inorganic porous material carrying chemical adsorbent 2 thereon: Kesmon NS-80E, produced by Toagosei Co., Ltd. Inorganic porous material carrying hydroxyl group-containing compound thereon. Average particle size of 2 μm.

[Anti-Blocking Agent]

/Anti-blocking agent 1: PEX-ABT-16, produced by Tokyo Printing Ink Mfg. Co., Ltd. Masterbatch containing synthetic zeolite and talc. Containing 45% by mass of synthetic zeolite, 5% by mass of talc, and 50% by mass of low-density polyethylene.

[Slip Agent]

/Slip agent 1: EMB-10, produced by Sumitomo Mitsui Polyolefin Company, Limited. Masterbatch of slip agent. Containing 4% by mass of erucic acid amide.

[Intermediate Layer]

/Nylon resin 1: UBE5033B, produced by Ube Industries, Ltd. Polyamide 6/66 copolymer.

[Adhesive Agent]

Adhesive agent 1: Admer NF557, produced by Mitsui Chemicals Inc. Modified polyolefin.

[Adjustment of Masterbatch]

The masterbatch which was used for the odor adsorption layer was produced by adjustment in the following way.

(Adjustment of Masterbatch 1)

General-purpose polyethylene 1 and hydrophobic zeolite 1 were melt-blended at the following ratio, and a masterbatch 1 (MB1) was obtained.

| | |
|---|---|
| General-purpose polyethylene 1 | 90 parts by mass |
| Hydrophobic zeolite 1 | 10 parts by mass |

[Adjustment of Masterbatches 2 to 6]

Materials according to combinations in Table 23 were melt-blended in the same manner as that in the masterbatch 1, and masterbatches 2 to 6 (MB2 to MB6) were obtained.

TABLE 23

|  |  | Unit | Masterbatch | | | | | |
|---|---|---|---|---|---|---|---|---|
|  |  |  | MB1 | MB2 | MB3 | MB4 | MB5 | MB6 |
| LDPE resin | General-purpose polyethylene1 | Parts by mass | 90 | 90 | 90 | 90 | 80 | 80 |
| Odor adsorbent | Hydrophobic zoolite 1 | Parts by mass | 10 |  |  |  |  |  |
|  | Hydrophobic zoolite 2 | Parts by mass |  | 10 |  |  |  | 20 |
|  | Hydrophobic zoolite 3 | Parts by mass |  |  | 10 |  |  |  |
|  | Inorganic porous material carrying chemical adsorbent thereon 1 | Parts by mass |  |  |  | 10 |  |  |
|  | Inorganic porous material carrying chemical adsorbent thereon 2 | Parts by mass |  |  |  |  | 10 |  |

[Adjustment of Resin Composition for Low-Friction Sealant Layer]

Resin compositions 1 to 9 for the low-friction sealant layers were obtained, by dry blending of each raw material according to combinations shown in Table 24,

TABLE 24

|  |  | Resin composition for low-friction sealant layer | | | | | | | | |
|---|---|---|---|---|---|---|---|---|---|---|
|  | Unit | 1 | 2 | 3 | 4 | 5 | 6 | 7 | 8 | 9 |
| Anti-blocking agent 1 | Parts by mass | 0.5 | 0.5 | 0.5 | 0.5 | 0.5 | 0.5 | 0.2 | 2 | 0.5 |
| Slip agent 1 | Parts by mass | 1 | 1 | 1 | 1 | 1 | 3 | 0.25 | 3 | 1 |
| Low-elution polyethylene 1 | Parts by mass |  |  |  |  |  | 96.5 | 99.6 | 95.0 |  |
| Low-elution polyethylene 2 | Parts by mass | 98.5 |  |  |  |  |  |  |  |  |
| Low-elution polyethylene 3 | Parts by mass |  | 98.5 |  |  |  |  |  |  |  |
| Low-elution polyethylene 4 | Parts by mass |  |  | 98.5 |  |  |  |  |  |  |
| Low-elution polyethylene 5 | Parts by mass |  |  |  | 98.5 |  |  |  |  |  |
| General-purpose polyethylene 2 | Parts by mass |  |  |  |  | 98.5 |  |  |  | 98.5 |
| Total | Parts by mass | 100 | 100 | 100 | 100 | 100 | 100 | 100 | 100 | 100 |

[Adjustment of Resin Composition for Odor Adsorption Sealant Layer]

Resin compositions 1 to 12 for the odor adsorption sealant layers were obtained, by dry blending of each raw material according to combinations shown in Table 25.

TABLE 25

|  |  | Resin composition for odor adsorption sealant layer | | | | | | | | | | | |
|---|---|---|---|---|---|---|---|---|---|---|---|---|---|
|  | Unit | 1 | 2 | 3 | 4 | 5 | 6 | 7 | 8 | 9 | 10 | 11 | 12 |
| MB1 | Parts by mass | 11.1 |  |  |  |  |  |  |  |  |  |  |  |
| MB2 | Parts by mass |  | 11.1 |  | 8.3 | 8.3 | 8.3 |  |  | 8.3 |  |  |  |
| MB3 | Parts by mass |  |  | 11.1 |  |  |  |  |  |  |  | 11.1 |  |
| MB4 | Parts by mass |  |  |  | 2.8 |  | 1.4 |  | 20.0 | 2.8 |  | 11.1 |  |
| MB5 | Parts by mass |  |  |  |  | 2.8 | 1.4 |  | 20.0 |  |  |  |  |
| MB6 | Parts by mass |  |  |  |  |  |  | 70.0 | 50.0 |  |  |  | 80.0 |
| Low-elution polyethylene 1 | Parts by mass | 88.9 | 88.9 | 88.9 | 88.9 | 88.9 | 88.9 | 30.0 | 10.0 | 88.9 |  |  |  |
| General-purpose polyethylene 2 | Parts by mass |  |  |  |  |  |  |  |  |  | 100.0 | 77.8 | 20.0 |
| Total | Parts by mass | 100.0 | 100.0 | 100.0 | 100.0 | 100.0 | 100.0 | 100.0 | 100.0 | 100.0 | 100.0 | 100.0 | 100.0 |

Example 1

A laminate having the following layer structure was obtained using the resin composition 1 for the low-friction sealant layer, the nylon resin 1, the adhesive agent 1, and the resin composition 1 for the odor adsorption sealant layer which were obtained in the above description, by an inflation method.

Then, the obtained laminates were used as a packaging material, and were subjected to various evaluations. The layer structure and the evaluation results are shown in Table 26.

(Layer Structure of Laminate)

Resin composition 1 for low-friction sealant layer (45 m)/adhesive agent 1 (5 m)/nylon resin 1 (20 μm)/adhesive agent 1 (5 μm)/resin composition 1 for odor adsorption sealant layer (45 μm) (120 μm in total)

Examples 2 to 16, and Comparative Examples 1 to 4

The laminates were obtained using each level of the raw materials shown in Tables 26 to 29, in the same operation as that in Example 1, and were evaluated in the same manner.

<Evaluation Method>

[Film-Forming Property]

The appearance of the laminate was observed and was organoleptically evaluated. The evaluation criteria are as follows.

Good: The laminate could be film-formed without the occurrence of a crease and/or a rash.

Poor: Many creases and rashes were formed on the laminate, and film formation was difficult.

[Coefficient of Static Friction]

A weight 13 shown in FIG. 26 was placed on the surface of the side of the odor adsorption sealant layer of a cut laminate 12, as shown in FIG. 27, the end of the laminate 12 was bent upward, and the laminate was fixed to the weight 13 with a double-sided tape.

Then, the weight 13 to which the laminate 12 was attached was pulled at a constant speed (100 mm/min), under an environment of normal temperature and normal humidity (23° C. and 50% RH), as shown in FIG. 28, and the coefficient of friction between the surface of the low-friction sealant layer of the laminate 10 and a metal plate 14 was measured.

The measurement was individually performed five times, and the average value was obtained.

The detailed conditions are as follows.

Used device: Friction Tester TR-2 by Toyo Seiki Seisaku-sho, Ltd

[Pinhole Resistance]

The laminate was cut into A4 size (30 cm×21 cm), the cut laminate was flexed with Gelvo type Flex-Cracking Tester (BE-1005, manufactured by Tester Sangyo Co., Ltd.), and then the number of generated pinholes in a plane of 30 cm×21 cm of each sample was counted.

Temperature: 23° C.

Number of flexings by Gelbo: 5000 times

[Adsorption Effect]

(Increment of TOC Concentration of Filling Water)

A package of a pouch bag shape (15 cm×44 cm) was produced using the laminate. The inner surface of the pouch bag was previously subjected to the sterilization treatment by UV irradiation.

Then, 1000 g of water at 65° C. (distilled water for high performance liquid chromatography, produced by Junsei Chemical Co., Ltd.) was hot-packed into the obtained pouch bag to produce a liquid-filled package. The liquid-filled package was stored at 35° C. for 2 weeks, and then the TOC concentration in the filling water was measured with a TOC-L total organic carbon meter manufactured by Shimadzu Corporation.

Next, the TOC concentration of water before filling was also measured in the same manner, and the increment of the TOC concentration in each package was determined from the following expression.

Increment of TOC concentration=TOC concentration of filling water after storage−TOC concentration of water before filling TOC concentration of water before filling: 0.02 ppm Conditions of Sterilization Treatment by UV Irradiation UV wavelength: 253.7 nm Irradiation time period: 10 seconds Temperature: 25° C.

(Change in Odor and Taste of Filling Water)

A pouch bag (13 cm×17 cm) was produced using the laminate. The inner surface of the pouch bag was previously subjected to the sterilization treatment by UV irradiation. The sterilization treatment by UV irradiation was performed under the same conditions as those in the increment of the TOC concentration.

Here, into the obtained pouch bag, 100 g of water at 65° C. (produced by Suntory Holdings Limited, Natural Water in Japan) was hot-packed to produce a liquid-filled package; and the liquid-filled package was stored at 10° C. for one week, and then was subjected to the organoleptic evaluation.

The indices of the organoleptic evaluation are as follows. The number of participants in the organoleptic evaluation experiment was five; and the average value was calculated and was determined to be the evaluation result.

1: Odor and taste are strong.

2: Odor and taste are somewhat reduced.

3: Odor and taste are greatly reduced.

4: Being equivalent to natural water before filling.

TABLE 26

|  |  |  |  | Example | | | | |
|---|---|---|---|---|---|---|---|---|
|  |  |  | Unit | 1 | 2 | 3 | 4 | 5 |
| Laminate structure | Low-friction sealant layer | Resin composition for low-friction sealant layer 1 | μm | 45 | 45 | 45 | 45 | 45 |
|  |  | Resin composition for low-friction sealant layer 2 | μm |  |  |  |  |  |
|  |  | Resin composition for low-friction sealant layer 3 | μm |  |  |  |  |  |
|  |  | Resin composition for low-friction sealant layer 4 | μm |  |  |  |  |  |
|  |  | Resin composition for low-friction sealant layer 5 | μm |  |  |  |  |  |
|  |  | Resin composition for low-friction sealant layer 6 | μm |  |  |  |  |  |
|  |  | Resin composition for low-friction sealant layer 7 | μm |  |  |  |  |  |
|  |  | Resin composition for low-friction sealant layer 5 | μm |  |  |  |  |  |

TABLE 26-continued

|  |  |  | Unit | Example 1 | Example 2 | Example 3 | Example 4 | Example 5 |
|---|---|---|---|---|---|---|---|---|
|  |  | Resin composition for low-friction sealant layer 9 | μm |  |  |  |  |  |
|  |  | General-purpose polyethylene 2 | μm |  |  |  |  |  |
|  | Adhesive layer | Adhesive agent 1 | μm | 5 | 5 | 5 | 5 | 5 |
|  | Intermediate layer | Nylon resin 1 | μm | 20 | 20 | 20 | 20 | 20 |
|  | Adhesive layer | Adhesive agent 1 | μm | 5 | 5 | 5 | 5 | 5 |
|  | Odor adsorption sealant layer | Resin composition for odor adsorption sealant layer 1 | μm | 45 |  |  |  |  |
|  |  | Resin composition for odor adsorption sealant layer 2 | μm |  | 45 |  |  |  |
|  |  | Resin composition for odor adsorption sealant layer 3 | μm |  |  | 45 |  |  |
|  |  | Resin composition for odor adsorption sealant layer 4 | μm |  |  |  | 45 |  |
|  |  | Resin composition for odor adsorption sealant layer 5 | μm |  |  |  |  | 45 |
|  |  | Resin composition for odor adsorption sealant layer 6 | μm |  |  |  |  |  |
|  |  | Resin composition for odor adsorption sealant layer 7 | μm |  |  |  |  |  |
|  |  | Resin composition for odor adsorption sealant layer 8 | μm |  |  |  |  |  |
|  |  | Resin composition for odor adsorption sealant layer 9 | μm |  |  |  |  |  |
|  |  | Resin composition for odor adsorption sealant layer 10 | μm |  |  |  |  |  |
|  |  | Resin composition for odor adsorption sealant layer 11 | μm |  |  |  |  |  |
|  |  | Resin composition for odor adsorption sealant layer 12 | μm |  |  |  |  |  |
|  |  | Low-elution polyethylene 2 | μm |  |  |  |  |  |
|  | Total |  | μm | 120 | 120 | 120 | 120 | 120 |
| Characteristics | Content in low-friction sealant layer | Low-elution polyethylene | % by mass | 98.5 | 98.5 | 98.5 | 98.5 | 98.5 |
|  |  | Slip agent | % by mass | 0.04 | 0.04 | 0.04 | 0.04 | 0.04 |
|  |  | Anti-blocking agent | % by mass | 0.25 | 0.25 | 0.25 | 0.25 | 0.25 |
|  | Content in odor adsorption sealant layer | Low-elution polyethylene | % by mass | 88.9 | 88.9 | 88.9 | 88.9 | 88.9 |
|  |  | Odor adsorbent — Hydrophobic recline | % by mass | 1.1 | 1.1 | 1.1 | 0.8 | 0.8 |
|  |  | Odor adsorbent — Inorganic porous material carrying chemical adsorbent thereon | % by mass | 0.0 | 0.0 | 0.0 | 0.3 | 0.3 |
|  |  | Total | % by mass | 1.1 | 1.1 | 1.1 | 1.1 | 1.1 |
| Evaluation results | Film-forming properties |  | — | ○ | ○ | ○ | ○ | ○ |
|  | Coefficient of static friction of low-friction sealant layer |  | — | 0.18 | 0.19 | 0.18 | 0.19 | 0.18 |
|  | Pinhole resistance |  | Holes | 3 | 4 | 4 | 3 | 4 |
|  | Increment of TOC concentration of filling water |  | ppm | 0.50 | 0.52 | 0.53 | 0.51 | 0.51 |
|  | Change in odor and taste |  | — | 3 | 3.5 | 3.5 | 3 | 3.5 |

TABLES 27

|  |  |  | Unit | Example 6 | Example 7 | Example 8 | Example 9 | Example 10 |
|---|---|---|---|---|---|---|---|---|
| Laminate structure | Low-friction sealant layer | Resin composition for low-friction sealant layer 1 | μm | 45 | 45 | 45 |  |  |
|  |  | Resin composition for low-friction sealant layer 2 | μm |  |  |  | 45 |  |
|  |  | Resin composition for low-friction sealant layer 3 | μm |  |  |  |  | 45 |
|  |  | Resin composition for low-friction sealant layer 4 | μm |  |  |  |  |  |
|  |  | Resin composition for low-friction sealant layer 5 | μm |  |  |  |  |  |
|  |  | Resin composition for low-friction sealant layer 6 | μm |  |  |  |  |  |
|  |  | Resin composition for low-friction sealant layer 7 | μm |  |  |  |  |  |
|  |  | Resin composition for low-friction sealant layer 8 | μm |  |  |  |  |  |
|  |  | Resin composition for low-friction sealant layer 9 | μm |  |  |  |  |  |
|  |  | General-purpose polyethylene 2 | μm |  |  |  |  |  |
|  | Adhesive layer | Adhesive agent 1 | μm | 5 | 5 | 5 | 5 | 5 |
|  | Intermediate layer | Nylon resin 1 | μm | 20 | 20 | 20 | 20 | 2.0 |
|  | Adhesive layer | Adhesive agent 1 | μm | 5 | 5 | 5 | 5 | 5 |
|  | Odor adsorption sealant layer | Resin composition for odor adsorption sealant layer 1 | μm |  |  |  |  |  |
|  |  | Resin composition for odor adsorption sealant layer 2 | μm |  |  |  |  |  |
|  |  | Resin composition for odor adsorption sealant layer 3 | μm |  |  |  |  |  |
|  |  | Resin composition for odor adsorption sealant layer 4 | μm |  |  |  |  |  |
|  |  | Resin composition for odor adsorption sealant layer 5 | μm |  |  |  |  |  |
|  |  | Resin composition for odor adsorption sealant layer 6 | μm | 45 |  |  |  |  |
|  |  | Resin composition for odor adsorption sealant layer 7 | μm |  | 45 |  |  |  |
|  |  | Resin composition for odor adsorption sealant layer 8 | μm |  |  | 45 |  |  |

TABLES 27-continued

| | | | Unit | Example 6 | 7 | 8 | 9 | 10 |
|---|---|---|---|---|---|---|---|---|
| | | Resin composition for odor adsorption sealant layer 9 | μm | | | | 45 | 45 |
| | | Resin composition for odor adsorption sealant layer 10 | μm | | | | | |
| | | Resin composition for odor adsorption sealant layer 11 | μm | | | | | |
| | | Resin composition for odor adsorption sealant layer 12 | μm | | | | | |
| | | Low-elution polyethylene 2 | μm | | | | | |
| | Total | | μm | 120 | 120 | 120 | 120 | 120 |
| | Content in low-friction sealant layer | Low-elution polyethylene | % by mass | 98.5 | 98.5 | 98.5 | 98.5 | 98.5 |
| | | Slip agent | % by mass | 0.04 | 0.04 | 0.04 | 0.04 | 0.04 |
| | | Anti-blocking agent | % by mass | 0.25 | 0.25 | 0.25 | 0.25 | 0.25 |
| | Content in odor adsorption sealant layer | Low-elution polyethylene | % by mass | 88.9 | 30.0 | 10.0 | 88.9 | 88.9 |
| | | Odor adsorbent: Hydrophobic zeolite | % by mass | 0.8 | 14.0 | 10.0 | 0.8 | 0.8 |
| | | Inorganic porous material carrying chemical adsorbent thereon | % by mass | 0.3 | 0.0 | 4.0 | 0.3 | 0.3 |
| | | Total | % by mass | 1.1 | 14.0 | 14.0 | 1.1 | 1.1 |
| Evaluation results | Film-forming properties | | — | ○ | ○ | ○ | ○ | ○ |
| | Coefficient of static friction of low-friction sealant layer | | — | 0.18 | 0.18 | 0.18 | 0.19 | 0.18 |
| | Pinhole resistance | | Holes | 3 | 35 | 30 | 4 | 4 |
| | Increment of TOC concentration of filling water | | ppm | 0.52 | 0.10 | 0.11 | 0.53 | 0.55 |
| | Change in odor and taste | | — | 3 | 4 | 4 | 3.5 | 3.5 |

TABLE 28

| | | | Unit | Example 11 | 12 | 13 | 14 | 15 |
|---|---|---|---|---|---|---|---|---|
| Laminate structure | Low-friction sealant layer | Resin composition for low-friction sealant layer 1 | μm | | | | | |
| | | Resin composition for low-friction sealant layer 2 | μm | | | | | |
| | | Resin composition for low-friction sealant layer 3 | μm | | | | | |
| | | Resin composition for low-friction sealant layer 4 | μm | 45 | | | | |
| | | Resin composition for low-friction sealant layer 5 | μm | | 45 | | | |
| | | Resin composition for low-friction sealant layer 6 | μm | | | 45 | | |
| | | Resin composition for low-friction sealant layer 7 | μm | | | | 45 | |
| | | Resin composition for low-friction sealant layer 8 | μm | | | | | 45 |
| | | Resin composition for low-friction sealant layer 9 | μm | | | | | |
| | | General-purpose polyethylene 2 | μm | | | | | |
| | Adhesive layer | Adhesive agent 1 | μm | 5 | 5 | 5 | 5 | 5 |
| | Intermediate layer | Nylon resin 1 | μm | 20 | 20 | 20 | 20 | 20 |
| | Adhesive layer | Adhesive agent 1 | μm | 5 | 5 | 5 | 5 | 5 |
| | Odor adsorption sealant layer | Resin composition for odor adsorption sealant layer 1 | μm | | | | | |
| | | Resin composition for odor adsorption sealant layer 2 | μm | | | | | |
| | | Resin composition for odor adsorption sealant layer 3 | μm | | | | | |
| | | Resin composition for odor adsorption sealant layer 4 | μm | | | | | |
| | | Resin composition for odor adsorption sealant layer 5 | μm | | | | | |
| | | Resin composition for odor adsorption sealant layer 6 | μm | | | | | |
| | | Resin composition for odor adsorption sealant layer 7 | μm | | | | | |
| | | Resin composition for odor adsorption sealant layer 8 | μm | | | | | |
| | | Resin composition for odor adsorption sealant layer 9 | μm | 45 | 45 | 45 | 45 | 45 |
| | | Resin composition for odor adsorption sealant layer 10 | μm | | | | | |
| | | Resin composition for odor adsorption sealant layer 11 | μm | | | | | |
| | | Resin composition for odor adsorption sealant layer 12 | μm | | | | | |
| | | Low-elution polyethylene 2 | μm | | | | | |
| Characteristics | Total | | μm | 120 | 120 | 120 | 120 | 120 |
| | Content in low-friction sealant layer | Low-elution polyethylene | % by mass | 98.5 | 98.5 | 96.5 | 99.6 | 95.0 |
| | | Slip agent | % by mass | 0.04 | 0.04 | 0.12 | 0.01 | 0.12 |
| | | Anti-blocking agent | % by mass | 0.25 | 0.25 | 0.25 | 0.10 | 1.00 |
| | Content in odor adsorption sealant layer | Low-elution polyethylene | % by mass | 88.9 | 88.9 | 88.9 | 88.9 | 88.9 |
| | | Odor adsorbent: Hydrophobic zeolite | % by mass | 0.8 | 0.8 | 0.8 | 0.8 | 0.8 |

TABLE 28-continued

|  |  |  | Unit | Example 11 | Example 12 | Example 13 | Example 14 | Example 15 |
|---|---|---|---|---|---|---|---|---|
|  |  | Inorganic porous material carrying chemical adsorbent thereon | % by mass | 0.3 | 0.3 | 0.3 | 0.3 | 0.3 |
|  |  | Total | % by mass | 1.1 | 1.1 | 1.1 | 1.1 | 1.1 |
| Evaluation results | Film-forming properties |  | — | ○ | ○ | ○ | ○ | ○ |
|  | Coefficient of static friction of low-friction sealant layer |  | — | 0.19 | 0.18 | 0.08 | 0.22 | 0.07 |
|  | Pinhole resistance |  | Holes | 3 | 4 | 5 | 4 | 10 |
|  | Increment of TOC concentration of filling water |  | ppm | 0.56 | 0.52 | 0.55 | 0.56 | 0.52 |
|  | Change in odor and taste |  | — | 3.5 | 3.5 | 3.5 | 3.5 | 3.5 |

TABLE 29

|  |  |  | Unit | Example 16 | Comparative Example 1 | Comparative Example 2 | Comparative Example 3 | Comparative Example 4 |
|---|---|---|---|---|---|---|---|---|
| Laminate structure | Low-friction sealant layer | Resin composition for odor adsorption sealant layer 1 | μm | 45 |  |  |  |  |
|  |  | Resin composition for odor adsorption sealant layer 2 | μm |  |  |  |  |  |
|  |  | Resin composition for odor adsorption sealant layer 3 | μm |  |  |  |  |  |
|  |  | Resin composition for odor adsorption sealant layer 4 | μm |  |  |  |  |  |
|  |  | Resin composition for odor adsorption sealant layer 5 | μm |  |  |  |  |  |
|  |  | Resin composition for odor adsorption sealant layer 6 | μm |  |  |  |  |  |
|  |  | Resin composition for odor adsorption sealant layer 7 | μm |  |  |  |  |  |
|  |  | Resin composition for odor adsorption sealant layer 8 | μm |  |  |  |  |  |
|  |  | Resin composition for odor adsorption sealant layer 9 | μm |  | 45 |  |  |  |
|  |  | General-purpose polyethylene2 | μm |  |  | 45 | 45 | 45 |
|  | Adhesive layer | Adhesive agent 1 | μm |  | 5 | 5 | 5 | 5 |
|  | Intermediate layer | Nylon resin 1 | μm |  | 20 | 20 | 20 | 20 |
|  | Adhesive layer | Adhesive agent 1 | μm |  | 5 | 5 | 5 | 5 |
|  | Odor adsorption sealant layer | Resin composition for odor adsorption sealant layer 1 | μm | 40 |  |  |  |  |
|  |  | Resin composition for odor adsorption sealant layer 2 | μm |  |  |  |  |  |
|  |  | Resin composition for odor adsorption sealant layer 3 | μm |  |  |  |  |  |
|  |  | Resin composition for odor adsorption sealant layer 4 | μm |  |  |  |  |  |
|  |  | Resin composition for odor adsorption sealant layer 5 | μm |  |  |  |  |  |
|  |  | Resin composition for odor adsorption sealant layer 6 | μm |  |  |  |  |  |
|  |  | Resin composition for odor adsorption sealant layer 7 | μm |  |  |  |  |  |
|  |  | Resin composition for odor adsorption sealant layer 8 | μm |  |  |  |  |  |
|  |  | Resin composition for odor adsorption sealant layer 9 | μm |  |  |  |  |  |
|  |  | Resin composition for odor adsorption sealant layer 10 | μm |  |  | 45 |  |  |
|  |  | Resin composition for odor adsorption sealant layer 11 | μm |  | 45 |  | 45 |  |
|  |  | Resin composition for odor adsorption sealant layer 12 | μm |  |  |  |  | 45 |
|  |  | Low-elution polyethylene 2 | μm | 5 |  |  |  |  |
| Characteristics | Total |  | μm | 90 | 120 | 120 | 120 | 130 |
|  | Content in low-friction sealant layer | Low-elution polyethylene | % by mass | 98.5 | 0.0 | 0.0 | 0.0 | 0.0 |
|  |  | Slip agent | % by mass | 0.04 | 0.04 | 0.00 | 0.00 | 0.00 |
|  |  | Anti-blocking agent | % by mass | 0.25 | 0.25 | 0.00 | 0.00 | 0.00 |
|  | Content in odor adsorption sealant layer | Low-elution polyethylene | % by mass | 90.1 | 0.0 | 0.0 | 0.0 | 0.0 |
|  |  | Odor adsorbent: Hydrophobic zeolite | % by mass | 1.0 | 1.1 | 0.0 | 1.1 | 16.0 |
|  |  | Inorganic porous material carrying chemical adsorbent thereon | % by mass | 0.0 | 1.1 | 0.0 | 1.1 | 0.0 |
|  |  | Total | % by mass | 1.0 | 2.2 | 0.0 | 2.2 | 16.0 |
| Evaluation results | Film-forming properties |  | — | ○ | ○ | ○ | ○ | x |
|  | Coefficient of static friction of low-friction sealant layer |  | — | 0.18 | 0.18 | 0.3 | 0.3 | 0.3 |
|  | Pinhole resistance |  | Holes | 37 | 4 | 11 | 16 | 50 |
|  | Increment of TOC concentration of filling water |  | ppm | 0.52 | 2.50 | 2.91 | 2.42 | 0.85 |
|  | Change in odor and taste |  | — | 3.5 | 3.5 | 1 | 1 | 4 |

<Summary of Results>

The packages of all Examples which used the low-elution polyethylene showed good film-forming properties, coefficient of static friction of the low-friction sealant layer, concentration of eluted TOC, and change in odor and taste.

In Comparative Examples 1, 2 and 3, all of which did not use the low-elution polyethylene, the concentration of the eluted TOC was large, and the change in odor and taste was also unfavorable. In Comparative Example 4 in which the low-elution polyethylene was not used, and a high concentration of the odor adsorbent was added, the concentration of the eluted TOC could be suppressed, but such a result was shown that the film-forming properties were inferior.

EXPLANATION OF REFERENCE NUMERALS

Sealant Film for Packaging Liquid Contents, in Embodiment 1

1. sealant film
2. non-low-elution polyethylene-containing layer
3. low-elution polyethylene-containing layer
3a. low-elution polyethylene-containing layer (concentration a)
3b. low-elution polyethylene-containing layer (concentration b)

Sealant Film for Packaging Liquid Contents, in Embodiment 2

1. sealant film
2. non-odor adsorption layer
3. odor adsorption layer
3a. odor adsorption layer (concentration a)
3b. odor adsorption layer (concentration b)

Sealant Film for Packaging Liquid Contents, in Embodiment 3

1. sealant film
2. non-odor adsorption layer
3. odor adsorption layer
3a. odor adsorption layer (concentration a)
3b. odor adsorption layer (concentration b)

Laminate for Packaging Liquid Contents, in Embodiment 1

1. sealant layer
2. non-low-elution polyethylene-containing layer
3. low-elution polyethylene-containing layer
3a. low-elution polyethylene-containing layer (concentration a)
3b. low-elution polyethylene-containing layer (concentration b)
4. substrate layer Laminate for Packaging Liquid Contents, in Embodiment 2

1. sealant layer
2. non-odor adsorption layer
3. odor adsorption layer
3a. odor adsorption layer (concentration a)
3b. odor adsorption layer (concentration b)
4. substrate layer Laminate for Packaging Liquid Contents, in Embodiment 3

1. sealant layer
2. non-odor adsorption layer
3. odor adsorption layer
3a. odor adsorption layer (concentration a)
3b. odor adsorption layer (concentration b)
4. substrate layer Laminate for Packaging Liquid Contents, in Embodiment 4

1 laminate
2 low-friction sealant layer
3 odor adsorption sealant layer
4 adhesive layer
5 intermediate layer 10 inorganic porous material carrying chemical adsorbent thereon
12 laminate (low-friction sealant layer is outside)
13 weight
14 metal plate (mirror brass plate)
15 heater
16 pulley
17 force gauge
18 vertical electric measuring stand

The invention claimed is:

1. A laminate for packaging liquid contents, which comprises a substrate layer and a sealant layer, wherein
    the sealant layer comprises at least an odor adsorption layer, and has a single-layer or multi-layer structure,
    a resin component of a layer furthest from the substrate in the sealant layer consists of low-elution polyethylene and optionally a high-elution thermoplastic resin, the high-elution thermoplastic resin being at least one selected from the group consisting of polyethylene, polypropylene, methylpentene polymer, and an acid-modified polyolefin resin,
    the odor adsorption layer comprises low-elution polyethylene and an odor adsorbent,
    a concentration of eluting Total Organic Carbon (TOC) contained in a film formed from the low-elution polyethylene is 42 ppm or higher and 99 ppm or lower,
    in a film formed from a single layer of the low-elution polyethylene and having a thickness of 50 μm, the number of pinholes generated after 5000 times of Gelbo Flex at 23° C. is 6.5 or more and 150 or less,
    in the laminate, the number of pinholes generated after 5000 times of Gelbo Flex at 23° C. is 1 or more and 48 or less,
    an increment of TOC concentration of filling water (1000 g, 65° C.) filled in a package of a pouch bag (15 cm×44 cm) produced with the laminate, where an inner surface of the pouch bag was previously subjected to sterilization treatment by UV irradiation (wave length 253.7 nm, for 10 seconds at 25° C.), after storage at 35° C. for 2 weeks is 0.26 ppm or more and 0.70 ppm or less, and
    the odor adsorbent is an inorganic porous material carrying a chemical adsorbent thereon.

2. The laminate for packaging liquid contents according to claim 1, wherein a density of the low-elution polyethylene is 0.90 g/cm³ or higher and 0.94 g/cm³ or lower.

3. The laminate for packaging liquid contents according to claim 1, wherein the low-elution polyethylene is linear low-density polyethylene (LLDPE).

4. The laminate for packaging liquid contents according to claim 3, wherein the low-elution polyethylene is one or two or more selected from the group consisting of C4-LLDPE, C6-LLDPE and C8-LLDPE.

5. The laminate for packaging liquid contents according to claim wherein the odor adsorbent is melt-kneaded with a thermoplastic resin, at a mass ratio of odor adsorbent/thermoplastic resin of 0.5/99.5 to 40/60.

6. The laminate for packaging liquid contents according to claim 5, wherein a melt flow rate of the thermoplastic resin is 0.2 to 10.0 g/10 minutes.

7. The laminate for packaging liquid contents according to claim 1, wherein a content of the odor adsorbent is 0.3% by mass or more and 15% by mass or less relative to the mass of the sealant layer as a whole.

8. The laminate for packaging liquid contents according to claim 1, wherein the sealant layer comprises a non-odor adsorption layer on a front surface and/or a back surface of the odor adsorption layer.

9. The laminate for packaging liquid contents according to claim 1, wherein the chemical adsorbent comprises a functional group having a reactivity with one or two or more selected from the group consisting of aldehydes, ketones and carboxylic acids.

10. A packaging material for liquid contents, produced using the laminate for packaging liquid contents according to claim 1.

11. A liquid contents, formed from the packaging material for liquid contents according to claim 10.

* * * * *